(12) United States Patent
Mclachlan et al.

(10) Patent No.: US 12,165,448 B2
(45) Date of Patent: Dec. 10, 2024

(54) USER INTERFACES FOR MANAGING LOCKS

(71) Applicant: Apple Inc., Cupertino, CA (US)

(72) Inventors: Mischa K. Mclachlan, San Francisco, CA (US); Andrew S. Kim, Walnut Creek, CA (US); Matthew C. Sanders, Santa Clara, CA (US); Trevor W. Young, Livermore, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/518,284

(22) Filed: Nov. 22, 2023

(65) Prior Publication Data

US 2024/0087383 A1    Mar. 14, 2024

Related U.S. Application Data

(63) Continuation of application No. 17/897,979, filed on Aug. 29, 2022, now Pat. No. 11,837,038, which is a continuation of application No. 17/484,469, filed on Sep. 24, 2021, now Pat. No. 11,430,276.

(60) Provisional application No. 63/197,462, filed on Jun. 6, 2021.

(51) Int. Cl.
*G07C 9/00* (2020.01)
*G06F 3/04842* (2022.01)
*G06F 3/04847* (2022.01)

(52) U.S. Cl.
CPC ..... *G07C 9/00309* (2013.01); *G06F 3/04842* (2013.01); *G06F 3/04847* (2013.01)

(58) Field of Classification Search
CPC ............ G07C 9/00309; G07C 9/00857; G07C 9/00817; G06F 3/04842; G06F 3/04817; G06F 3/04847
See application file for complete search history.

(56) References Cited

U.S. PATENT DOCUMENTS

| | | |
|---|---|---|
| 7,295,100 B2 | 11/2007 | Denison et al. |
| 10,779,115 B1 | 9/2020 | Bartucci et al. |
| 11,430,276 B1 | 8/2022 | Mclachlan et al. |
| 2011/0074543 A1 | 3/2011 | Kaczmarz et al. |
| 2014/0118107 A1 | 5/2014 | Almomani |
| 2015/0235497 A1 | 8/2015 | Voss |
| 2019/0057566 A1 | 2/2019 | Mlynarczyk et al. |
| 2019/0244448 A1 | 8/2019 | Alamin et al. |
| 2021/0044976 A1 | 2/2021 | Avetisov et al. |
| 2022/0415104 A1 | 12/2022 | Mclachlan et al. |

FOREIGN PATENT DOCUMENTS

| | | |
|---|---|---|
| AU | 2021100511 A4 | 4/2021 |
| CN | 102800140 A | 11/2012 |
| CN | 102864984 A | 1/2013 |

(Continued)

OTHER PUBLICATIONS

International Preliminary Report on Patentability received for PCT Patent Application No. PCT/US2022/030963, mailed on Dec. 21, 2023, 14 pages.

(Continued)

*Primary Examiner* — Vernal U Brown
(74) *Attorney, Agent, or Firm* — DLA Piper LLP (US)

(57) ABSTRACT

An electronic device displays user interfaces for configuring a lock accessory device, such as a short-range communication user interface for enabling an express mode of the lock accessory device.

33 Claims, 31 Drawing Sheets

(56) References Cited

FOREIGN PATENT DOCUMENTS

CN 109391587 A 2/2019

OTHER PUBLICATIONS

"August Smart Keypad FAQ", Available online at: https://support.august.com/august-smart-keypad-faq-S17A8UJ0uf, 2021, 3 pages.
Ex-Parte Quayle Action received for U.S. Appl. No. 17/484,469, mailed on Feb. 2, 2022, 6 pages.
"How to Create, Modify, and Delete Smart Alerts", Available Online at: https://support.yalehome.com/en_us/smart-alerts-BJhlkaMdN, 2021, 3 pages.
How to Find and Use Personal Entry Codes, Available Online at: https://support.august.com/how-to-use-a-personal-entry-code-BkiClLyCdz, 2021, 3 pages.
International Search Report and Written Opinion received for PCT Patent Application No. PCT/US2022/030963, mailed on Sep. 8, 2022, 20 pages.
Live Free, "Changing passcode for electronic keypad deadbolt (defiant castle) "reprogramming electronic code"", Available Online at: https://www.youtube.com/watch?v=vJaUXvCOCFM, Feb. 10, 2020, 3 pages.
Non-Final Office Action received for U.S. Appl. No. 17/897,979, mailed on Jun. 23, 2023, 12 pages.
Notice of Allowance received for U.S. Appl. No. 17/484,469, mailed on Apr. 18, 2022, 6 pages.
Notice of Allowance received for U.S. Appl. No. 17/897,979, mailed on Aug. 3, 2023, 5 pages.
Schlagelocks, "Schlage Sense™ Smart Deadbolt", Available Online at: https://www.youtube.com/watch?v=flrLdGipRcU, Aug. 23, 2017, 3 pages.
"Set up a card in Wallet to ride transit with Apple Pay", Available Online at: https://support.apple.com/en-us/HT209494, Dec. 1, 2020, 5 pages.
"Sharing access is easier than ever with Schlage smart locks", Available Online at: https://www.schlage.com/blog/categories/2019/12/schlage-smart-lock-access-codes.html, Dec. 2, 2019, 17 pages.
"Use your iPhone or Apple Watch as a car key", Available Online at: https://support.apple.com/en-nz/HT211234, Mar. 16, 2021, 5 pages.
"Yale Smart Lock App Full Set-up Guide and Settings Preview", Available Online at: https://www.youtube.com/watch?v=CCOBMLwb_n4, Jan. 31, 2019, 3 pages.
Office Action received for Chinese Patent Application No. 202280040183.2, mailed on Jul. 4, 2024, 14 pages (7 pages of English Translation and 7 pages of Official Copy).

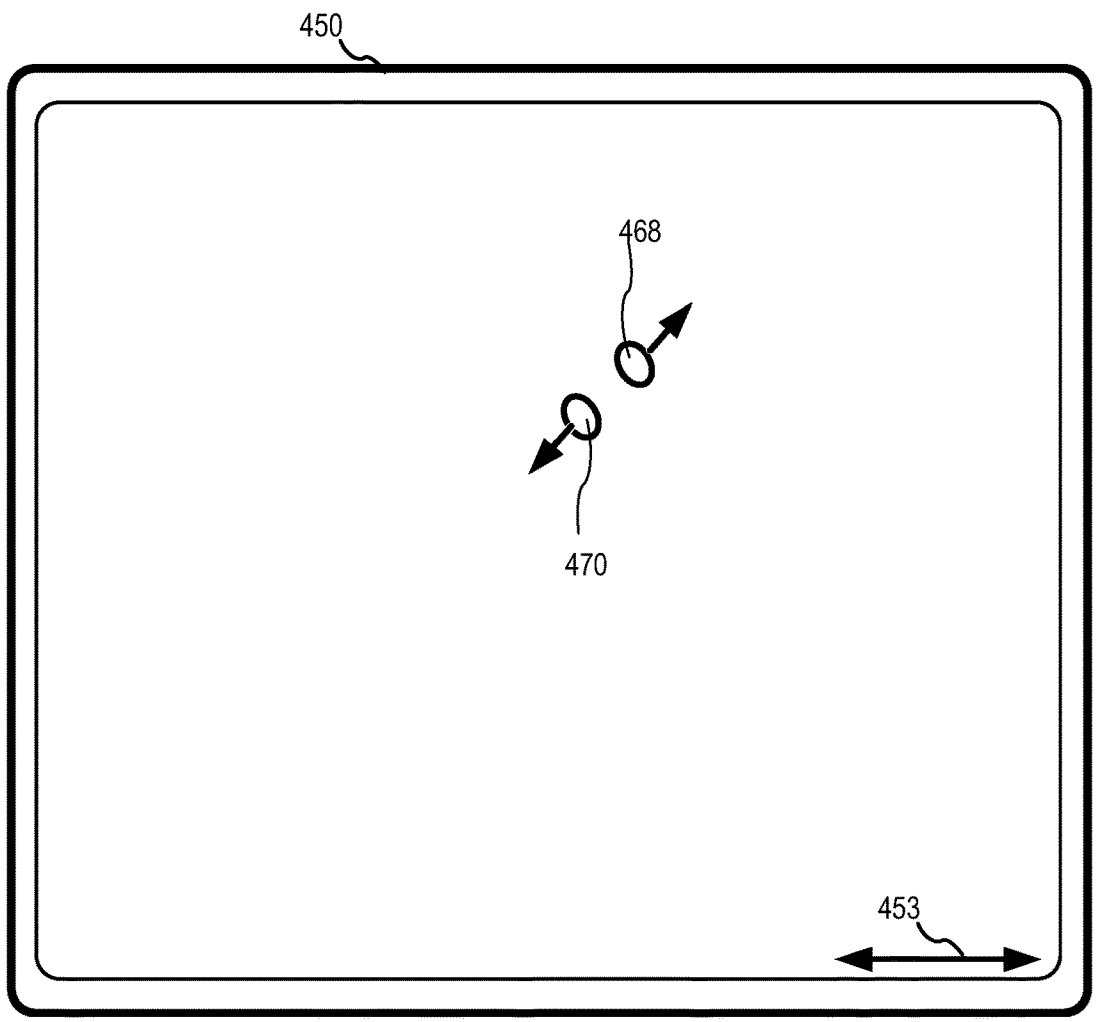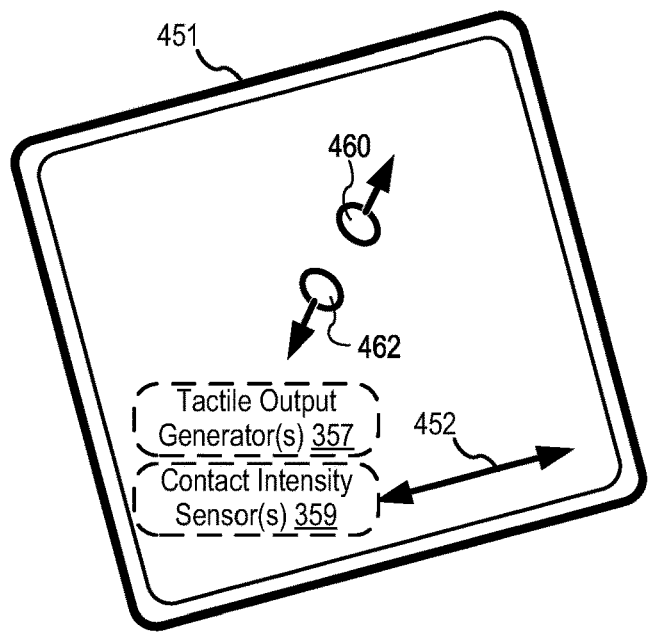
*FIG. 4B*

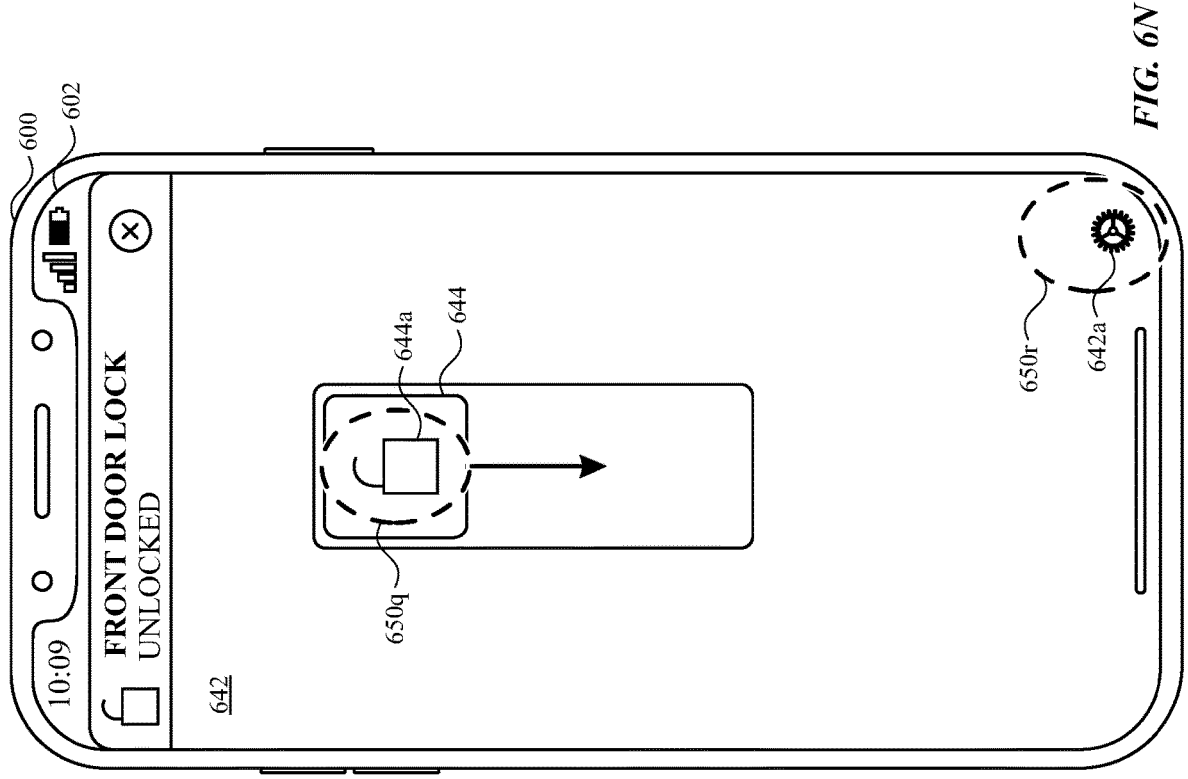
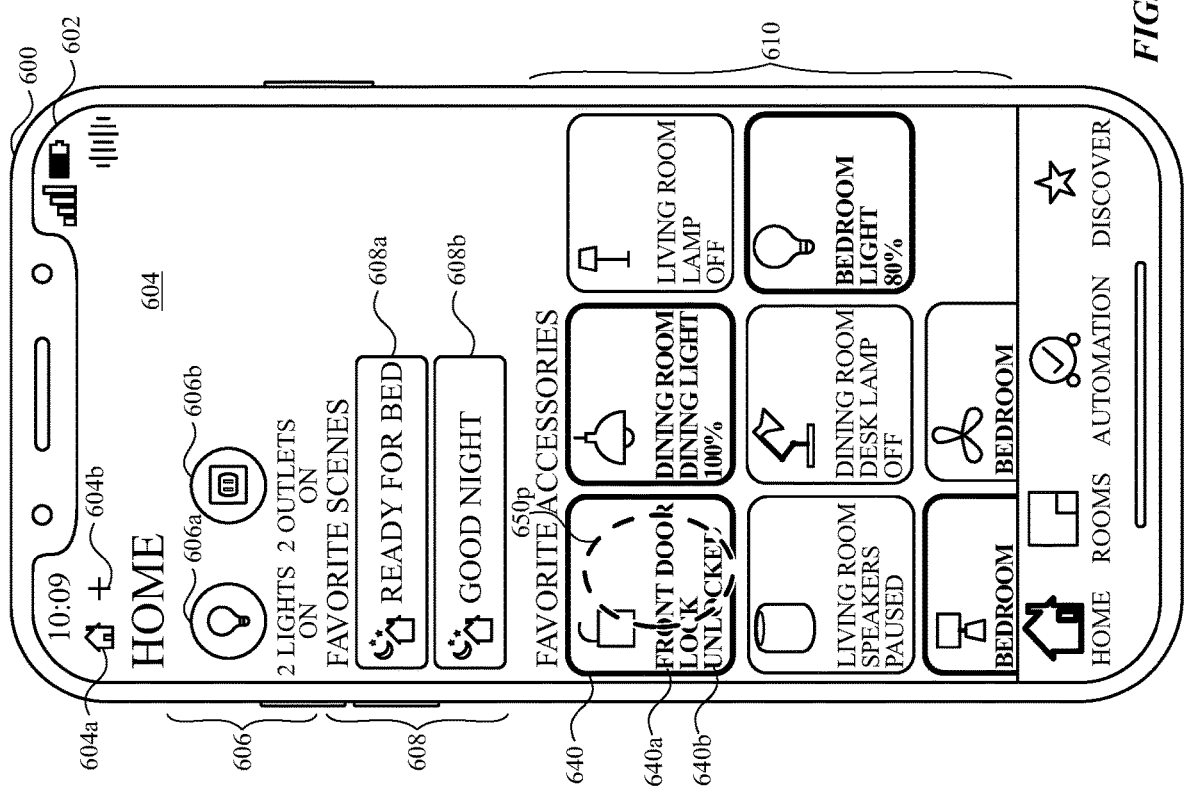
FIG. 6N
FIG. 6M

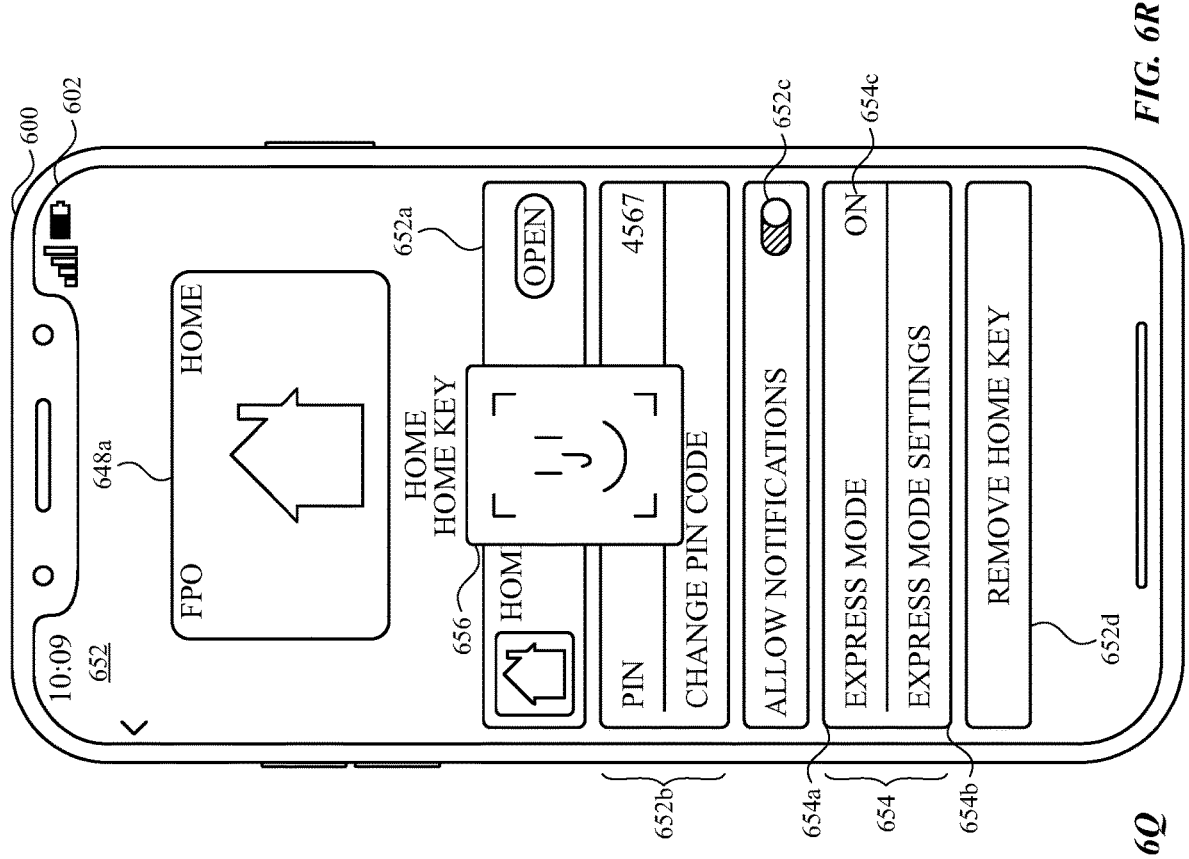
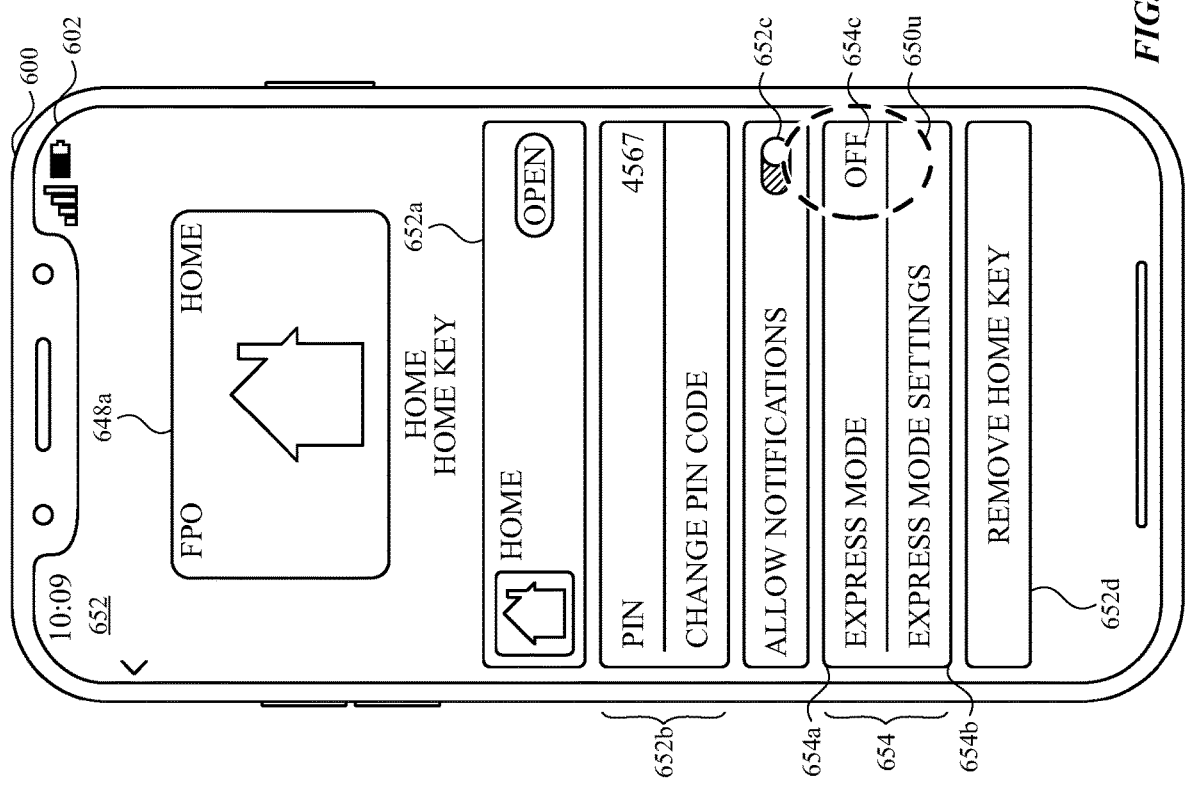
FIG. 6R
FIG. 6Q

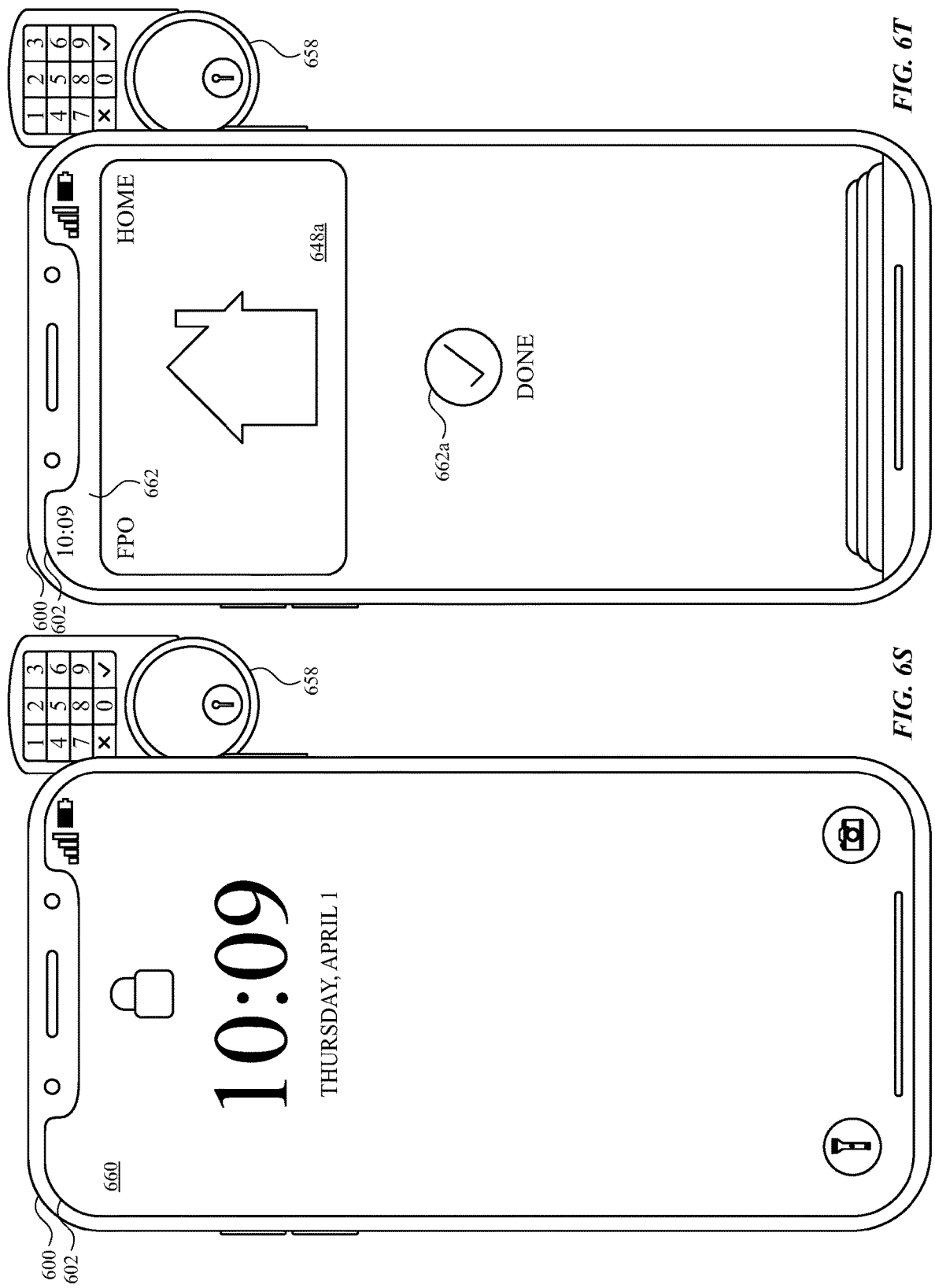

700

702
Receive, via the one or more input devices, a request to configure an electronic lock that is separate from the computer system.

704
In response to receiving the request to configure the electronic lock, start a configuration process for configuring the electronic lock.

706
During the configuration process for configuring the electronic lock:

708
In accordance with a determination that the electronic lock includes a short-range communication feature for communicating via short-range wireless communication, display, via the display generation component, an option to configure a first account of the computer system to provide credentials via short-range communication without requiring authentication.

710
In accordance with a determination that the electronic lock does not include the short-range communication feature, forgo display, via the display generation component, of the option to configure the first account of the computer system to provide credentials without requiring authentication.

712
In accordance with a determination that the electronic lock includes a keypad feature, display, via the display generation component, an option to configure a code of the first account of the computer system to be used for unlocking the electronic lock via the keypad feature of the electronic lock.

714
In accordance with a determination that the electronic lock does not include the keypad feature, forgoing display, via the display generation component, of the option to configure a code of the first account of the computer system to be used for unlocking the electronic lock.

*FIG. 7*

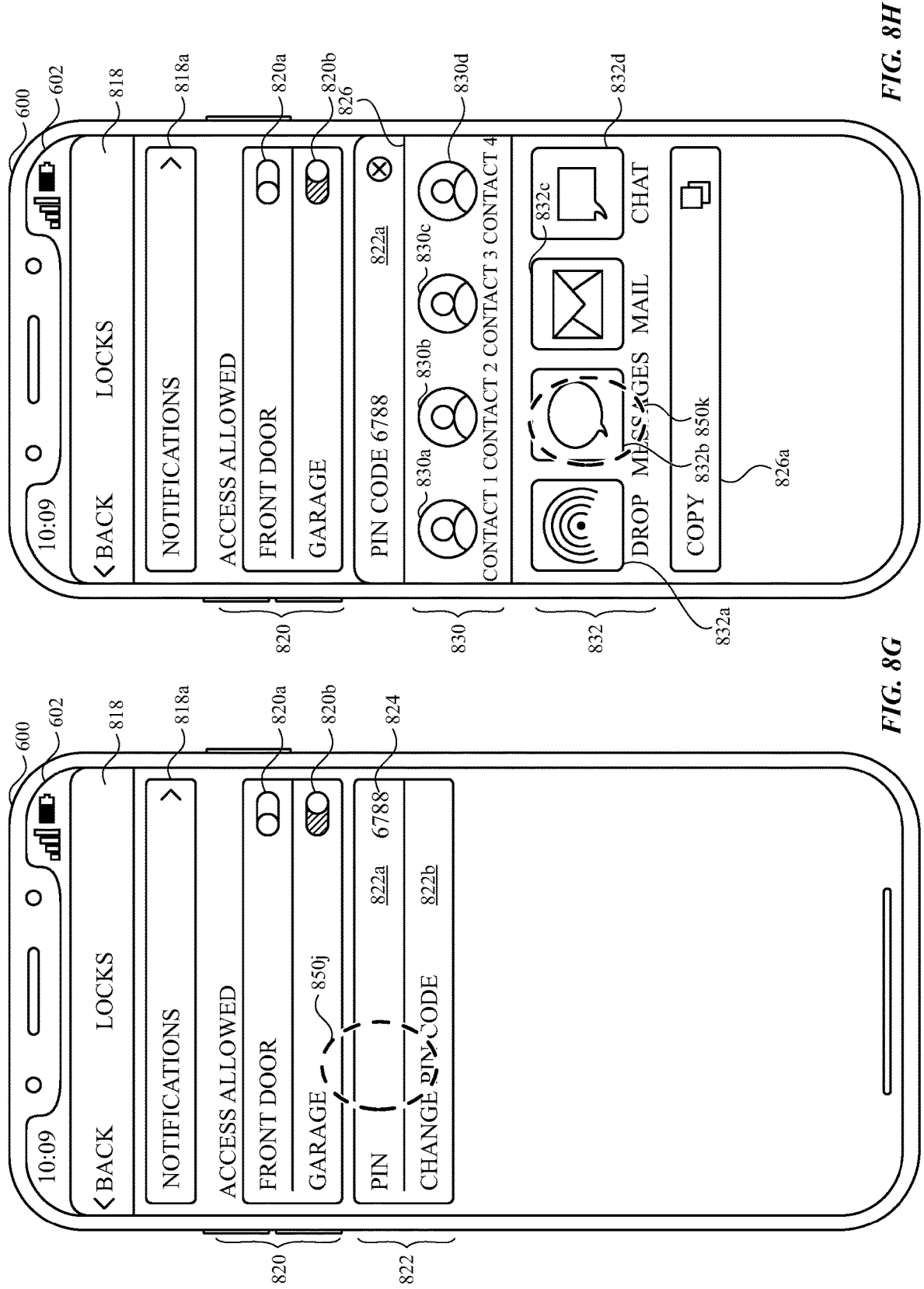

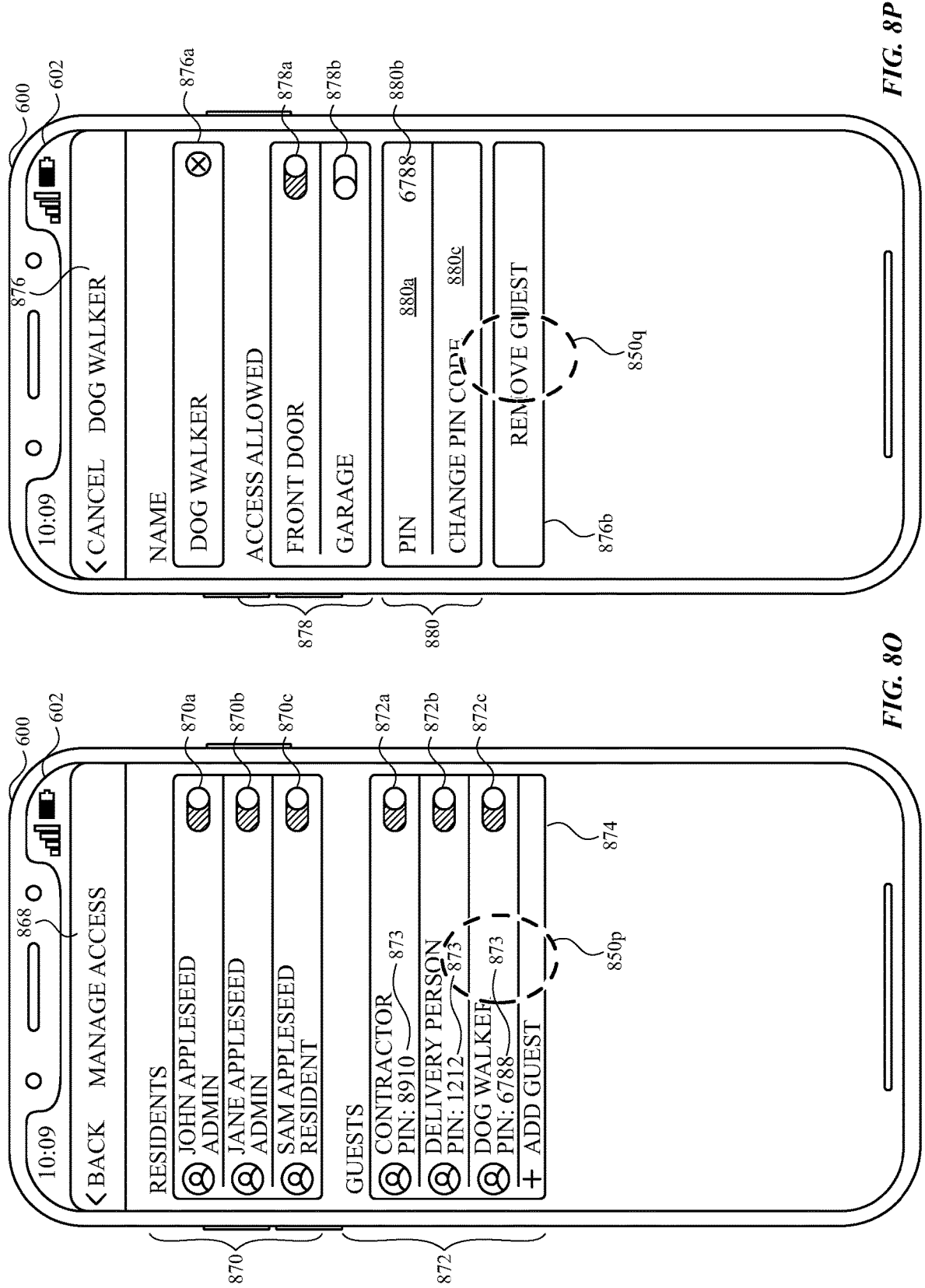

900

902
Display, via the display generation component, an account user interface that includes a user account lock object.

904
While displaying the user account lock object, receive, via the one or more input devices, a first input corresponding to selection of the user account lock object.

906
In response to receiving the first input, display, via the display generation component, a user account lock user interface corresponding to a first account, wherein the user account lock user interface includes concurrent display of:

908
A first electronic lock object corresponding to a first electronic lock that is separate from the computer system.

910
A first status object that indicates whether the first electronic lock is configured to unlock using credentials of the first account.

912
A second electronic lock object corresponding to a second electronic lock that is separate from the computer system.

914
a second status object that indicates whether the second electronic lock is configured to unlock using credentials of the first account.

*FIG. 9*

USER INTERFACES FOR MANAGING LOCKS

CROSS-REFERENCE TO RELATED APPLICATIONS

This application is a continuation of U.S. patent application Ser. No. 17/897,979, filed on Aug. 29, 2022, entitled "USER INTERFACES FOR MANAGING LOCKS," which is a continuation of U.S. patent application Ser. No. 17/484,469, filed on Sep. 24, 2021, entitled "USER INTERFACES FOR MANAGING LOCKS," which claims benefit to U.S. Provisional Application No. 63/197,462, filed Jun. 6, 2021, entitled "USER INTERFACES FOR MANAGING LOCKS," the entire contents of each of which are hereby incorporated by reference in their entirety.

FIELD

The present disclosure relates generally to computer user interfaces, and more specifically to techniques for managing lock accessories.

BACKGROUND

Electronic devices are able to wirelessly communicate with a lock accessory to cause the lock accessory to transition between a locked state and an unlocked state while displaying a user interface corresponding to the lock accessory. Electronic devices can also communicate with a lock accessory to set a personal identification number (PIN) that can be used to cause the lock accessory to transition between the locked state and the unlocked state via inputs on a keypad of the lock accessory.

BRIEF SUMMARY

Some techniques for managing lock accessories using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing lock accessories. Such methods and interfaces optionally complement or replace other methods for managing lock accessories. Such methods and interfaces reduce the cognitive burden on a user and produce a more efficient human-machine interface. For example, such methods and interfaces facilitate a setup process for establishing communication between an electronic device and a lock accessory. As another example, such methods and interfaces enable a user to quickly and efficiently manage access to multiple lock accessories for guests and/or other users. For battery-operated computing devices, such methods and interfaces conserve power and increase the time between battery charges.

In accordance with some embodiments, a method is described. The method is performed at a computer system that is in communication with a display generation component and one or more input devices. The method comprises: receiving, via the one or more input devices, a request to configure an electronic lock that is separate from the computer system; in response to receiving the request to configure the electronic lock, starting a configuration process for configuring the electronic lock; and during the configuration process for configuring the electronic lock: in accordance with a determination that the electronic lock includes a short-range communication feature for communicating via short-range wireless communication, displaying, via the display generation component, an option to configure a first account of the computer system to provide credentials via short-range communication without requiring authentication; in accordance with a determination that the electronic lock does not include the short-range communication feature, forgoing display, via the display generation component, of the option to configure the first account of the computer system to provide credentials without requiring authentication; in accordance with a determination that the electronic lock includes a keypad feature, displaying, via the display generation component, an option to configure a code of the first account of the computer system to be used for unlocking the electronic lock via the keypad feature of the electronic lock; and in accordance with a determination that the electronic lock does not include the keypad feature, forgoing display, via the display generation component, of the option to configure a code of the first account of the computer system to be used for unlocking the electronic lock.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving, via the one or more input devices, a request to configure an electronic lock that is separate from the computer system; in response to receiving the request to configure the electronic lock, starting a configuration process for configuring the electronic lock; and during the configuration process for configuring the electronic lock: in accordance with a determination that the electronic lock includes a short-range communication feature for communicating via short-range wireless communication, displaying, via the display generation component, an option to configure a first account of the computer system to provide credentials via short-range communication without requiring authentication; in accordance with a determination that the electronic lock does not include the short-range communication feature, forgoing display, via the display generation component, of the option to configure the first account of the computer system to provide credentials without requiring authentication; in accordance with a determination that the electronic lock includes a keypad feature, displaying, via the display generation component, an option to configure a code of the first account of the computer system to be used for unlocking the electronic lock via the keypad feature of the electronic lock; and in accordance with a determination that the electronic lock does not include the keypad feature, forgoing display, via the display generation component, of the option to configure a code of the first account of the computer system to be used for unlocking the electronic lock.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving, via the one or more input devices, a request to configure an electronic lock that is separate from the computer system; in response to receiving the request to configure the electronic lock, starting a configuration process for configuring the electronic lock; and during the configuration process for configuring the electronic lock: in accordance with a determination that the electronic lock includes a short-range communication feature for communicating via short-range wireless communication, displaying, via the display generation component, an option to configure a first account of the computer system to provide credentials via short-range communication without requiring authentication; in accordance with a determination that the electronic lock does not include the short-range communication feature, forgoing display, via the display generation component, of the option to configure the first account of the computer system to provide credentials without requiring authentication; in accordance with a determination that the electronic lock includes a keypad feature, displaying, via the display generation component, an option to configure a code of the first account of the computer system to be used for unlocking the electronic lock via the keypad feature of the electronic lock; and in accordance with a determination that the electronic lock does not include the keypad feature, forgoing display, via the display generation component, of the option to configure a code of the first account of the computer system to be used for unlocking the electronic lock.

In accordance with some embodiments, a computer system is described. The computer system is configured to communicate with a display generation component and one or more input devices. The computer system comprises: one or more processors; and memory storing one or more programs configured to be executed by the one or more processors, the one or more programs including instructions for: receiving, via the one or more input devices, a request to configure an electronic lock that is separate from the computer system; in response to receiving the request to configure the electronic lock, starting a configuration process for configuring the electronic lock; and during the configuration process for configuring the electronic lock: in accordance with a determination that the electronic lock includes a short-range communication feature for communicating via short-range wireless communication, displaying, via the display generation component, an option to configure a first account of the computer system to provide credentials via short-range communication without requiring authentication; in accordance with a determination that the electronic lock does not include the short-range communication feature, forgoing display, via the display generation component, of the option to configure the first account of the computer system to provide credentials without requiring authentication; in accordance with a determination that the electronic lock includes a keypad feature, displaying, via the display generation component, an option to configure a code of the first account of the computer system to be used for unlocking the electronic lock via the keypad feature of the electronic lock; and in accordance with a determination that the electronic lock does not include the keypad feature, forgoing display, via the display generation component, of the option to configure a code of the first account of the computer system to be used for unlocking the electronic lock.

In accordance with some embodiments, a computer system is described. The computer system is configured to communicate with a display generation component and one or more input devices. The computer system comprises: means for receiving, via the one or more input devices, a request to configure an electronic lock that is separate from the computer system; means for, in response to receiving the request to configure the electronic lock, starting a configuration process for configuring the electronic lock; and means for, during the configuration process for configuring the electronic lock: in accordance with a determination that the electronic lock includes a short-range communication feature for communicating via short-range wireless communication, displaying, via the display generation component, an option to configure a first account of the computer system to provide credentials via short-range communication without requiring authentication; in accordance with a determination that the electronic lock does not include the short-range communication feature, forgoing display, via the display generation component, of the option to configure the first account of the computer system to provide credentials without requiring authentication; in accordance with a determination that the electronic lock includes a keypad feature, displaying, via the display generation component, an option to configure a code of the first account of the computer system to be used for unlocking the electronic lock via the keypad feature of the electronic lock; and in accordance with a determination that the electronic lock does not include the keypad feature, forgoing display, via the display generation component, of the option to configure a code of the first account of the computer system to be used for unlocking the electronic lock.

In accordance with some embodiments, a computer program product is described. The computer program product comprises one or more programs configured to be executed by one or more processors of a computer system that is in communication with a display generation component and one or more input devices, the one or more programs including instructions for: receiving, via the one or more input devices, a request to configure an electronic lock that is separate from the computer system; in response to receiving the request to configure the electronic lock, starting a configuration process for configuring the electronic lock; and during the configuration process for configuring the electronic lock: in accordance with a determination that the electronic lock includes a short-range communication feature for communicating via short-range wireless communication, displaying, via the display generation component, an option to configure a first account of the computer system to provide credentials via short-range communication without requiring authentication; in accordance with a determination that the electronic lock does not include the short-range communication feature, forgoing display, via the display generation component, of the option to configure the first account of the computer system to provide credentials without requiring authentication; in accordance with a determination that the electronic lock includes a keypad feature, displaying, via the display generation component, an option to configure a code of the first account of the computer system to be used for unlocking the electronic lock via the keypad feature of the electronic lock; and in accordance with a determination that the electronic lock does not include the keypad feature, forgoing display, via the display generation component, of the option to configure a code of the first account of the computer system to be used for unlocking the electronic lock.

In accordance with some embodiments, a method is described. The method is performed at a computer system that is in communication with a display generation component and one or more input devices. The method comprises: displaying, via the display generation component, an account user interface that includes a user account lock object; while displaying the user account lock object, receiving, via the one or more input devices, a first input corresponding to selection of the user account lock object; and in response to receiving the first input, displaying, via the display generation component, a user account lock user interface corresponding to a first account, wherein the user account lock user interface includes concurrent display of: a first electronic lock object corresponding to a first electronic lock that is separate from the computer system; a first status object that indicates whether the first electronic lock is configured to unlock using credentials of the first account; a second electronic lock object corresponding to a second electronic lock that is separate from the computer system; and a second status object that indicates whether the second electronic lock is configured to unlock using credentials of the first account.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, an account user interface that includes a user account lock object; while displaying the user account lock object, receiving, via the one or more input devices, a first input corresponding to selection of the user account lock object; and in response to receiving the first input, displaying, via the display generation component, a user account lock user interface corresponding to a first account, wherein the user account lock user interface includes concurrent display of: a first electronic lock object corresponding to a first electronic lock that is separate from the computer system; a first status object that indicates whether the first electronic lock is configured to unlock using credentials of the first account; a second electronic lock object corresponding to a second electronic lock that is separate from the computer system; and a second status object that indicates whether the second electronic lock is configured to unlock using credentials of the first account.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, an account user interface that includes a user account lock object; while displaying the user account lock object, receiving, via the one or more input devices, a first input corresponding to selection of the user account lock object; and in response to receiving the first input, displaying, via the display generation component, a user account lock user interface corresponding to a first account, wherein the user account lock user interface includes concurrent display of: a first electronic lock object corresponding to a first electronic lock that is separate from the computer system; a first status object that indicates whether the first electronic lock is configured to unlock using credentials of the first account; a second electronic lock object corresponding to a second electronic lock that is separate from the computer system; and a second status object that indicates whether the second electronic lock is configured to unlock using credentials of the first account.

In accordance with some embodiments, a computer system is described. The computer system is configured to communicate with a display generation component and one or more input devices. The computer system comprises: one or more processors; and memory storing one or more programs configured to be executed by the one or more processors, the one or more programs including instructions for: displaying, via the display generation component, an account user interface that includes a user account lock object; while displaying the user account lock object, receiving, via the one or more input devices, a first input corresponding to selection of the user account lock object; and in response to receiving the first input, displaying, via the display generation component, a user account lock user interface corresponding to a first account, wherein the user account lock user interface includes concurrent display of: a first electronic lock object corresponding to a first electronic lock that is separate from the computer system; a first status object that indicates whether the first electronic lock is configured to unlock using credentials of the first account; a second electronic lock object corresponding to a second electronic lock that is separate from the computer system; and a second status object that indicates whether the second electronic lock is configured to unlock using credentials of the first account.

In accordance with some embodiments, a computer system is described. The computer system is configured to communicate with a display generation component and one or more input devices. The computer system comprises: means for displaying, via the display generation component, an account user interface that includes a user account lock object; means for, while displaying the user account lock object, receiving, via the one or more input devices, a first input corresponding to selection of the user account lock object; and means for, in response to receiving the first input, displaying, via the display generation component, a user account lock user interface corresponding to a first account, wherein the user account lock user interface includes concurrent display of: a first electronic lock object corresponding to a first electronic lock that is separate from the computer system; a first status object that indicates whether the first electronic lock is configured to unlock using credentials of the first account; a second electronic lock object corresponding to a second electronic lock that is separate from the computer system; and a second status object that indicates whether the second electronic lock is configured to unlock using credentials of the first account.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, an account user interface that includes a user account lock object; while displaying the user account lock object, receiving, via the one or more input devices, a first input corresponding to selection of the user account lock object; and in response to receiving the first input, displaying, via the display generation component, a user account lock user interface corresponding to a first account, wherein the user account lock user interface includes concurrent display of: a first electronic lock object corresponding to a first electronic lock that is separate from the computer system; a first status object that indicates whether the first electronic lock is configured to unlock using credentials of the first account; a second electronic lock object corresponding to a second electronic lock that is separate from the computer system; and a second status object that indicates whether the second electronic lock is configured to unlock using credentials of the first account.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing lock accessories, thereby increasing the effectiveness, efficiency, and user satisfaction with such devices. Such methods and interfaces may complement or replace other methods for managing lock accessories.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating a method for configuring a lock accessory, in accordance with some embodiments.

FIG. 9 is a flow diagram illustrating a method for managing access for one or more lock accessories, in accordance with some embodiments.

DESCRIPTION OF EMBODIMENTS

Figure 1A:
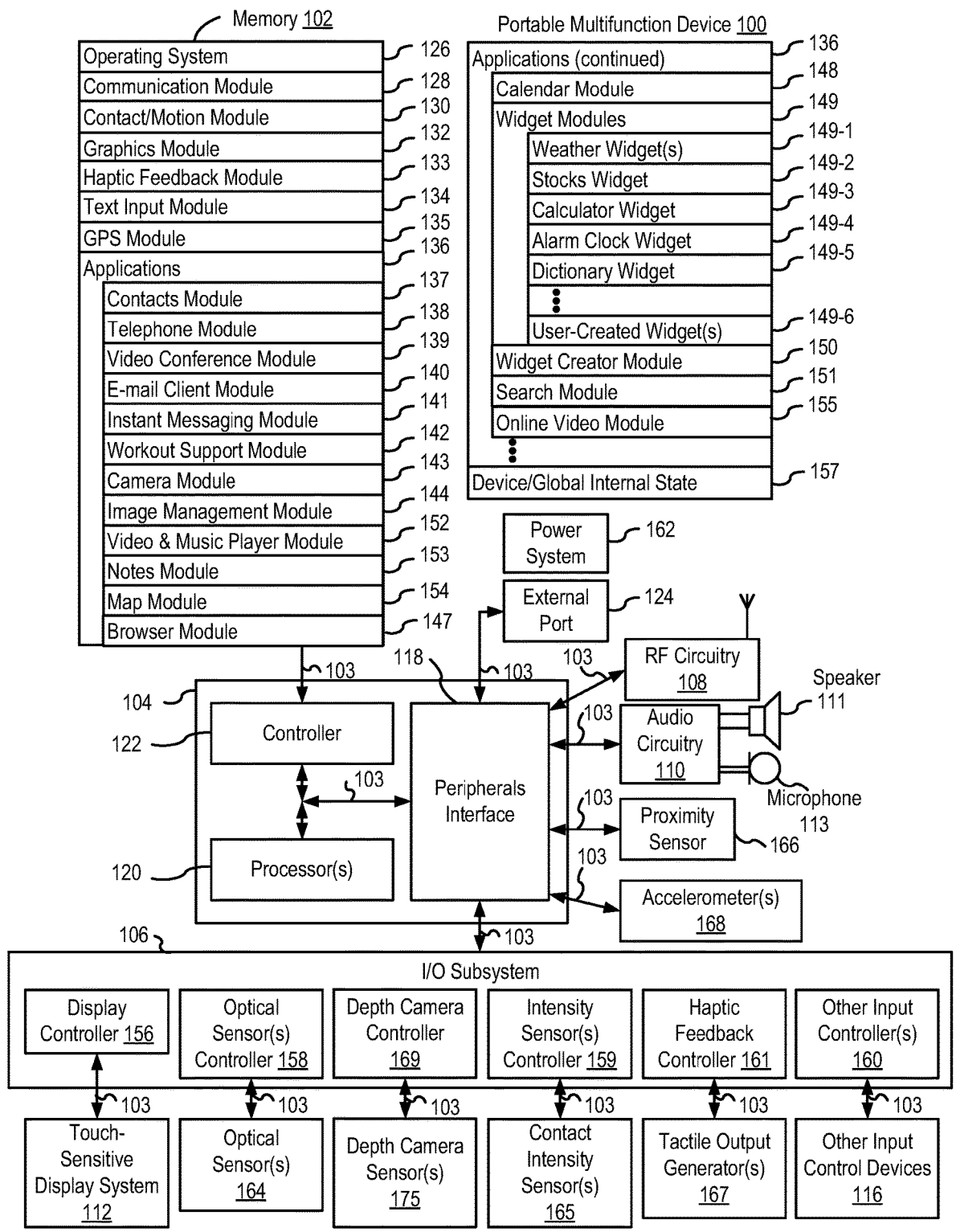
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing lock accessories. For example, there is a need for electronic devices that facilitate a setup process for configuring a lock accessory based on features of the lock accessory. As another example, there a need for electronic devices that enable a user to quickly and efficiently manage access to one or more lock accessories for guests and/or users. Such techniques can reduce the cognitive burden on a user who manages lock accessories, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing lock accessories. FIGS. 6A-6V illustrate exemplary user interfaces for configuring and/or using a lock accessory. FIG. 7 is a flow diagram illustrating methods for configuring a lock accessory in accordance with some embodiments. The user interfaces in FIGS. 6A-6V are used to illustrate the processes described below, including the processes in FIG. 7. FIGS. 8A-8S illustrate exemplary user interfaces for managing access for one or more lock accessories. FIG. 9 is a flow diagram illustrating methods for managing access for one or more lock accessories in accordance with some embodiments. The user interfaces in FIGS. 8A-8S are used to illustrate the processes described below, including the processes in FIG. 9.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.1 lac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
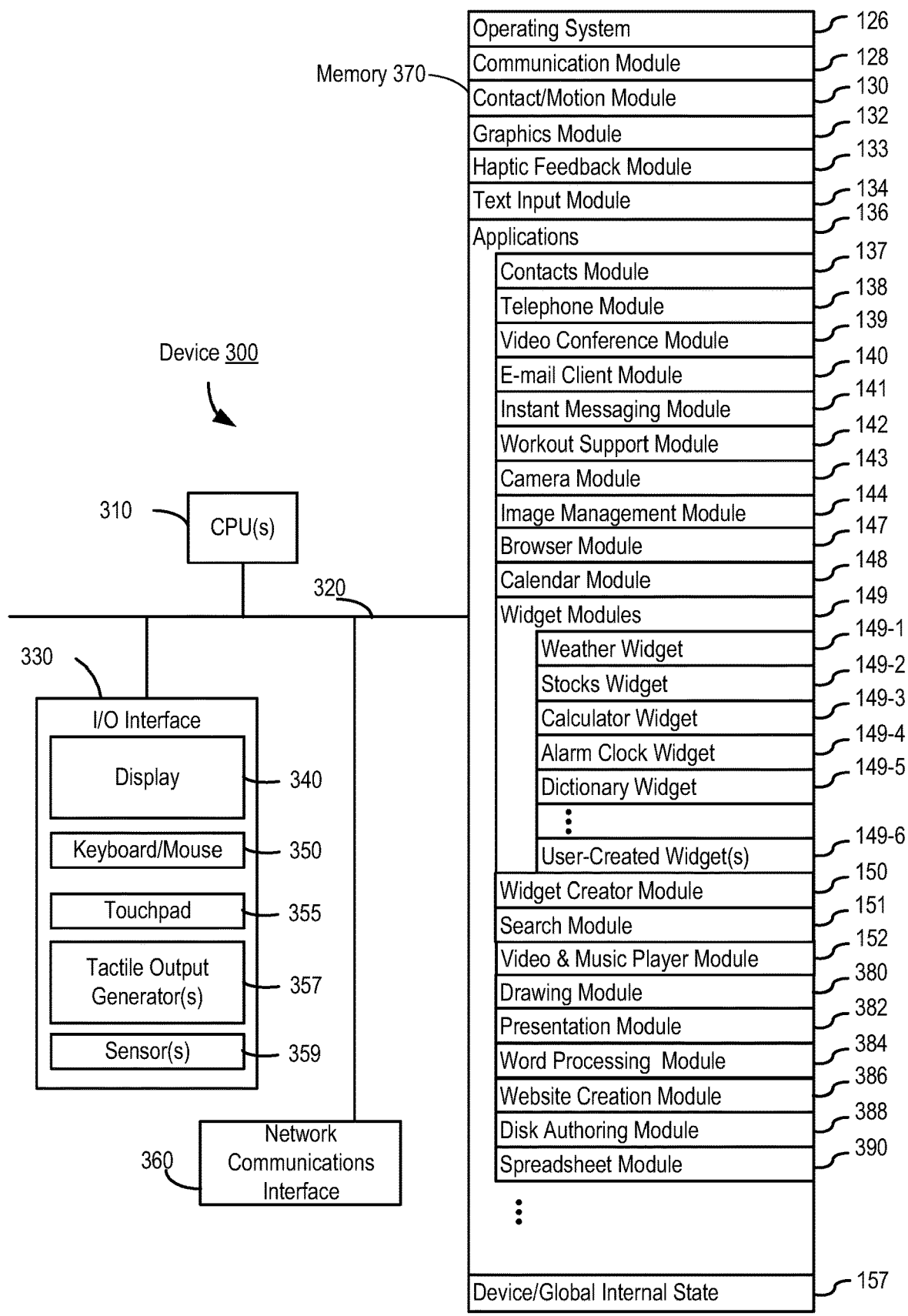
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
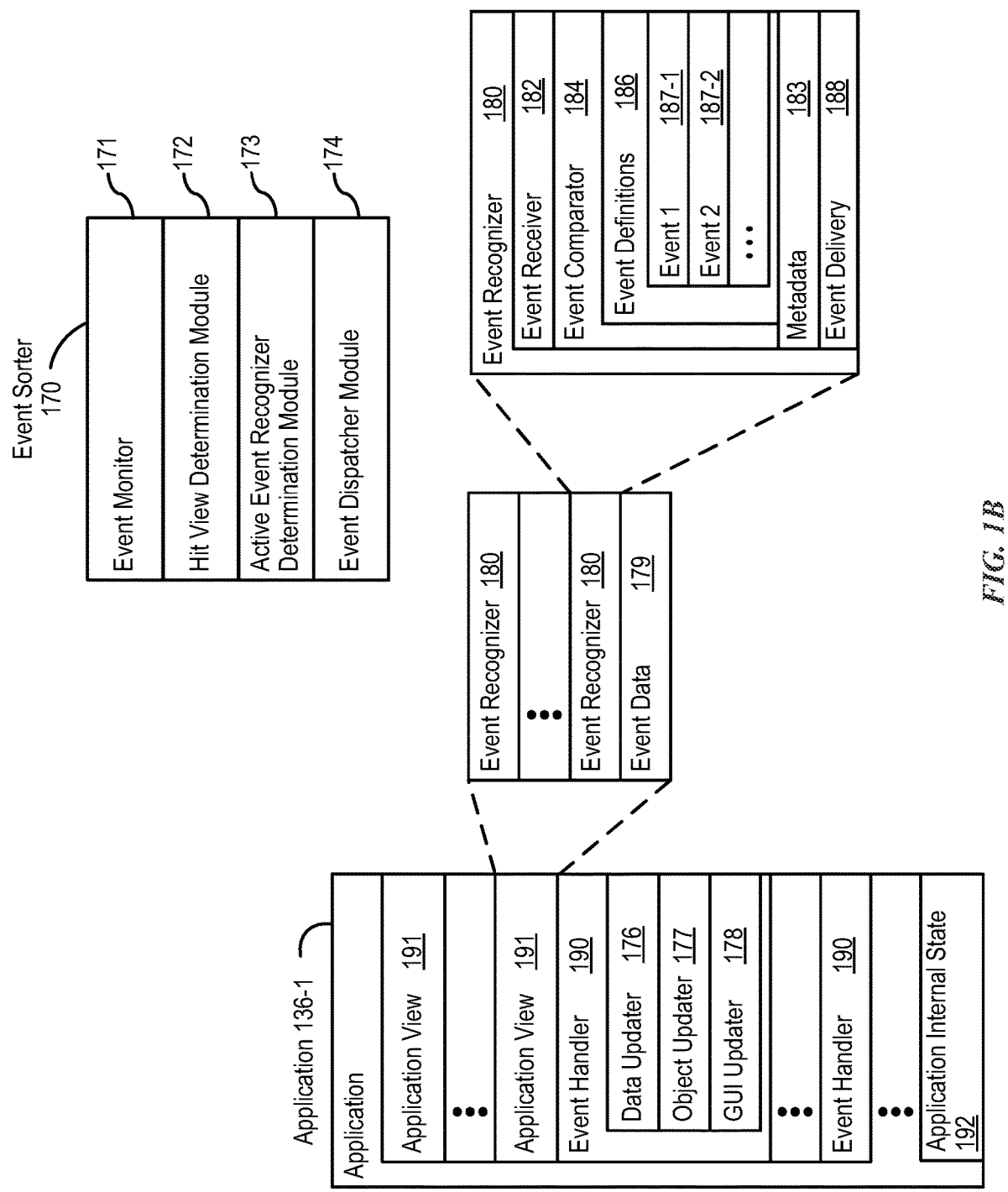
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
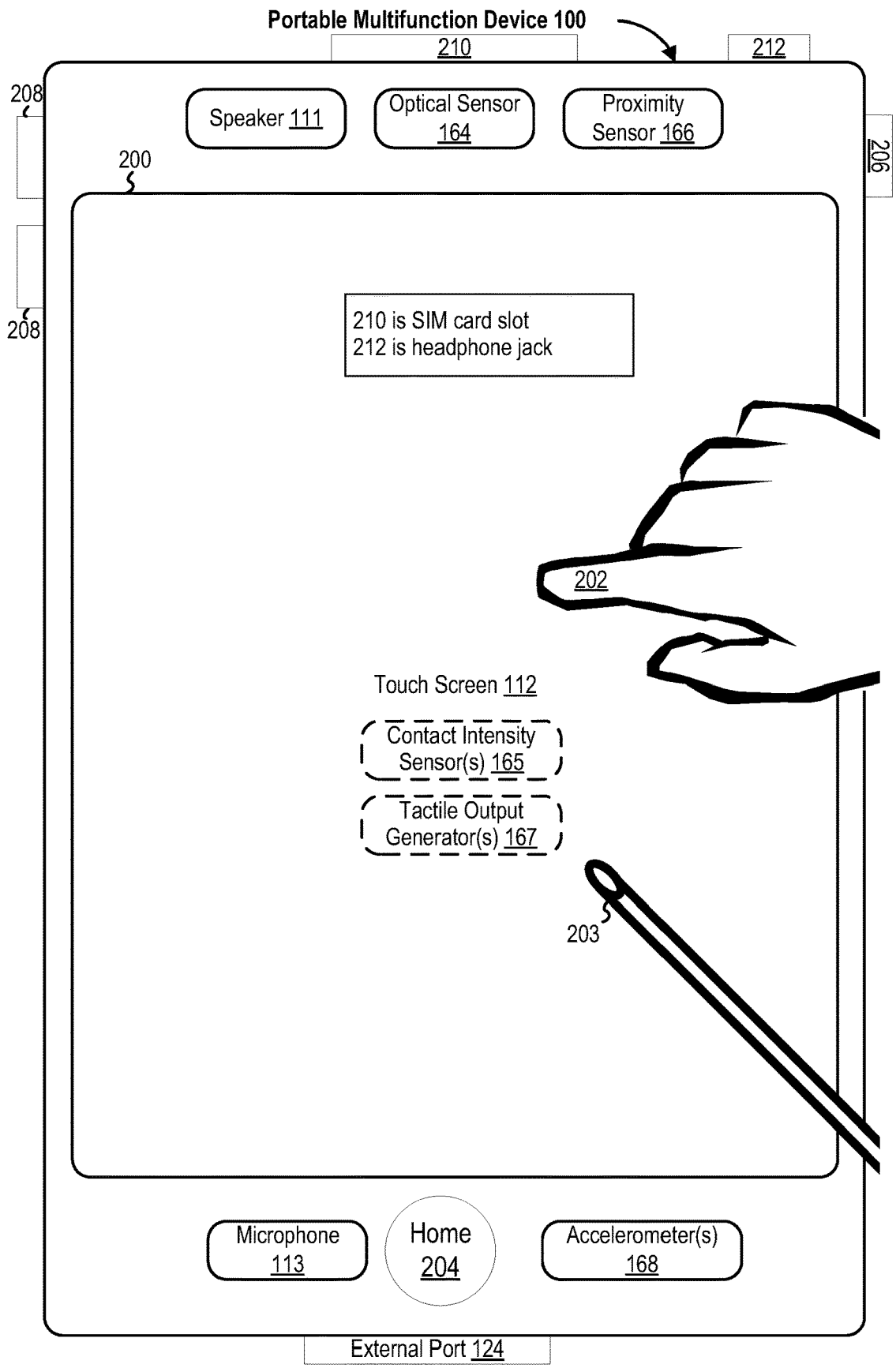
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
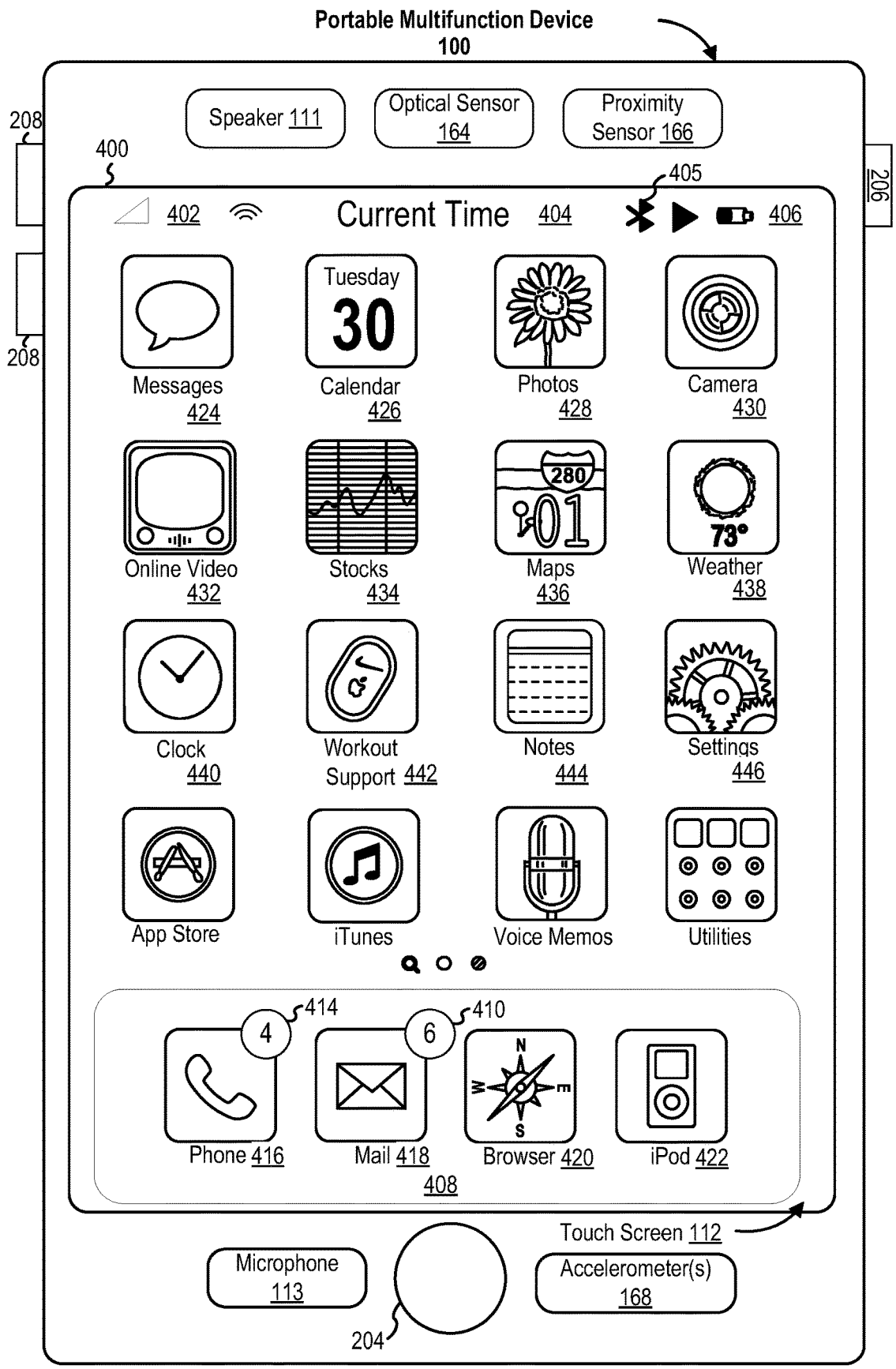
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
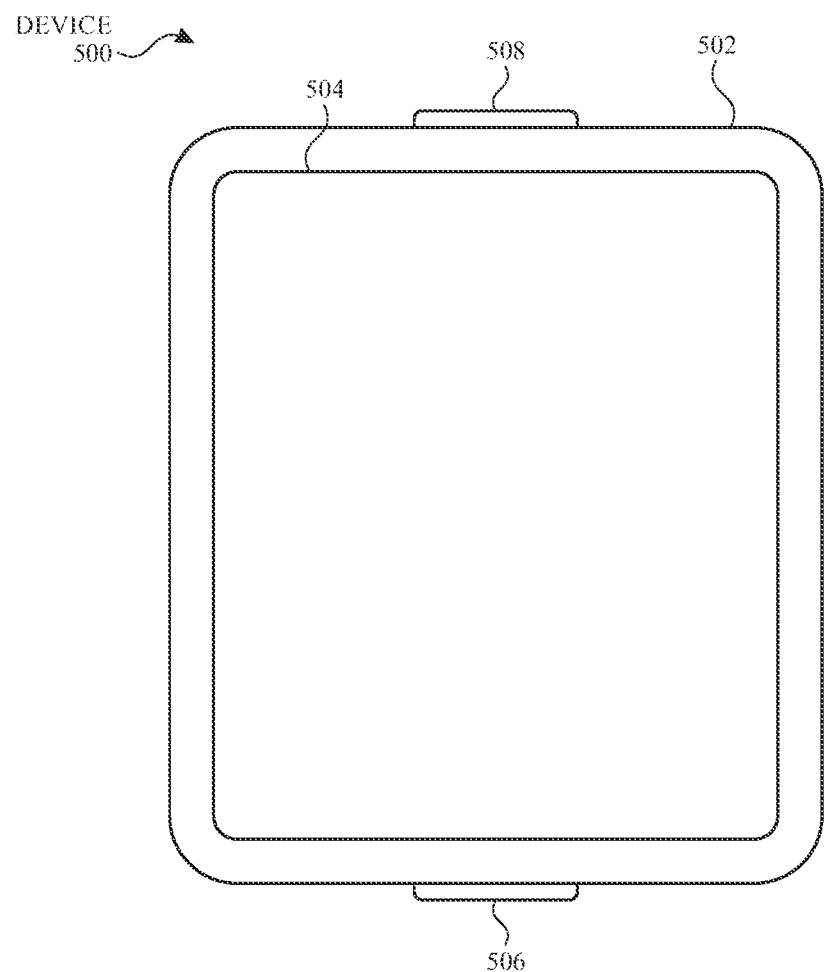
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
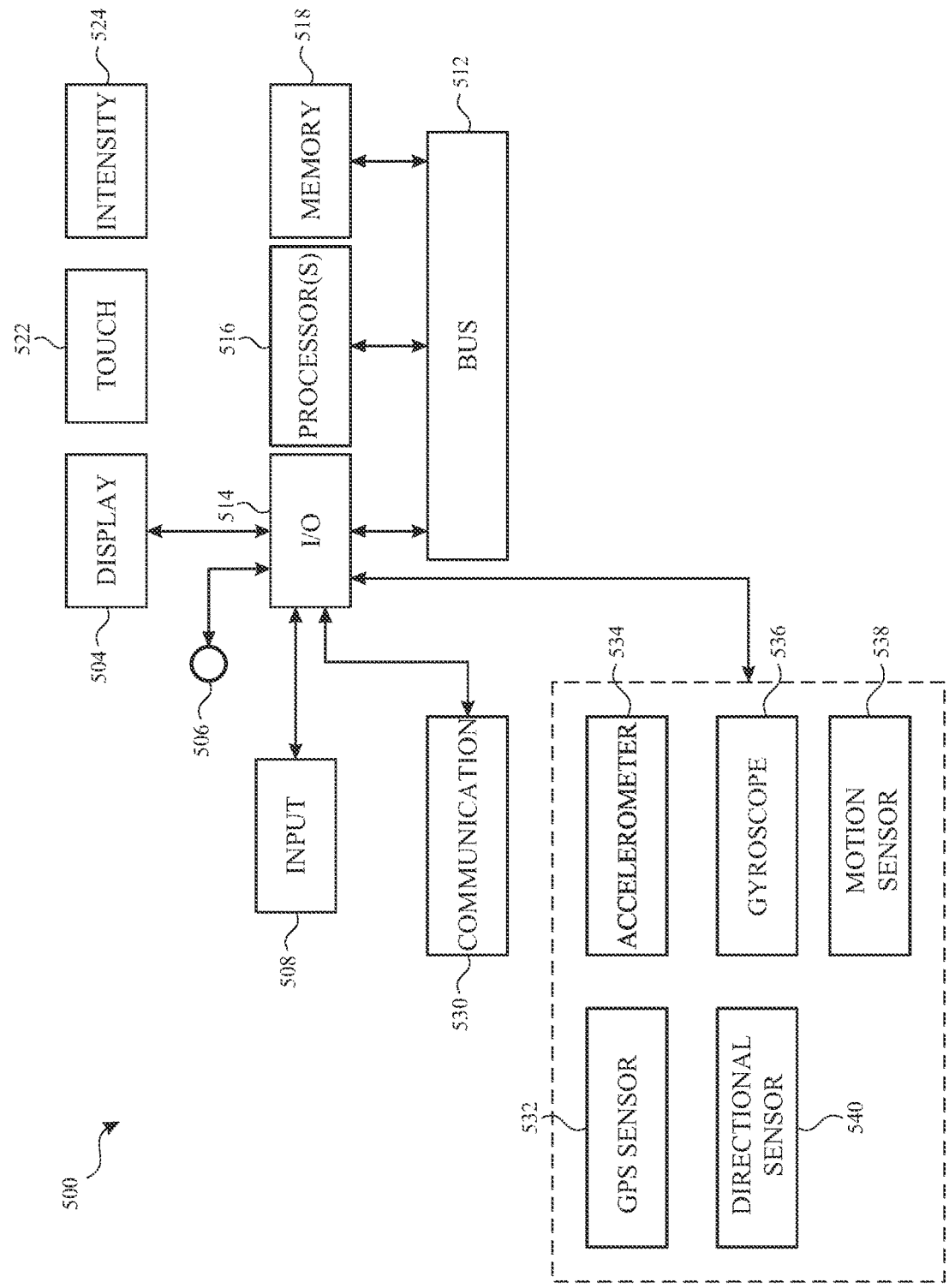
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6V illustrate exemplary user interfaces for configuring and/or using a lock accessory, in accordance with some embodiments. The user interfaces in these figures are used to illustrate the processes described below, including the processes in FIG. 7.

FIG. 6A illustrates electronic device 600 displaying, on display 602, first user interface 604 corresponding to a home automation system. At FIG. 6A, first user interface 604 includes home user interface object 604a, add user interface object 604b, status indicator region 606, favorite scenes region 608, and favorite accessory region 610.

As set forth below with reference to FIG. 8A, home user interface object 604a corresponds to one or more settings of the home automation system and/or access to particular accessory devices of the home automation system. Status indicator region 606 includes first status indicator 606a and second status indicator 606b each corresponding to an accessory device and/or a group of accessory devices that are determined to be in a predefined mode (e.g., an on mode, an unlocked mode, an open mode, an error mode, and/or an active mode). Thus, status indicator region 606 provides an indication of a status of one or more accessory devices of the home automation system that a user is likely to want to quickly control (e.g., cause electronic device 600 to adjust a mode and/or setting of the one or more accessory devices when activated).

Favorite scenes region 608 includes several objects for activating scenes, including first scene user interface object 608a for activating a 'ready for bed' scene and second scene user interface object 608b for activating an 'good night' scene. When a scene is activated, electronic device 600 causes respective accessory devices corresponding to each scene to change modes to respective modes for the activated scene. For example, activation of first scene user interface object 608a causes music to stop playing on a smart speaker and the entryway light accessory to turn off (or stay off).

Favorite accessory region 610 includes several accessory user interface objects 610a-610g for causing an adjustment to a mode for respective accessory devices associated with each object. For example, in response to detecting user input corresponding to first accessory user interface object 610a, electronic device 600 causes a dining room light to adjust from an on mode to an off mode and/or causes electronic device 600 to display a dining room light user interface enabling additional controls of the dining room light (e.g., the dining room light user interface enables electronic device 600 to adjust a brightness setting and/or a color temperature setting of dining room light).

At FIG. 6A, electronic device 600 detects user input 650a (e.g., a tap gesture) corresponding to selection of add user interface object 604b. In response to detecting user input 650a, electronic device 600 displays options user interface 612 including add accessory option 612a and add scene option 612b. In some embodiments, in response to detecting user input corresponding to add scene option 612b, electronic device 600 displays an add scene user interface that enables a user to select one or more accessories and/or particular modes for the one or more accessories associated with a new scene. In some embodiments, in response to creating the new scene, electronic device 600 displays a corresponding additional scene user interface object in favorite scenes region 608 of first user interface 604.

At FIG. 6A, electronic device 600 detects user input 650b (e.g., a tap gesture) corresponding to add accessory option 612a of options user interface 612. In response to detecting user input 650b, electronic device 600 displays add accessory user interface 614, as shown at FIG. 6B.

Figure 6B:
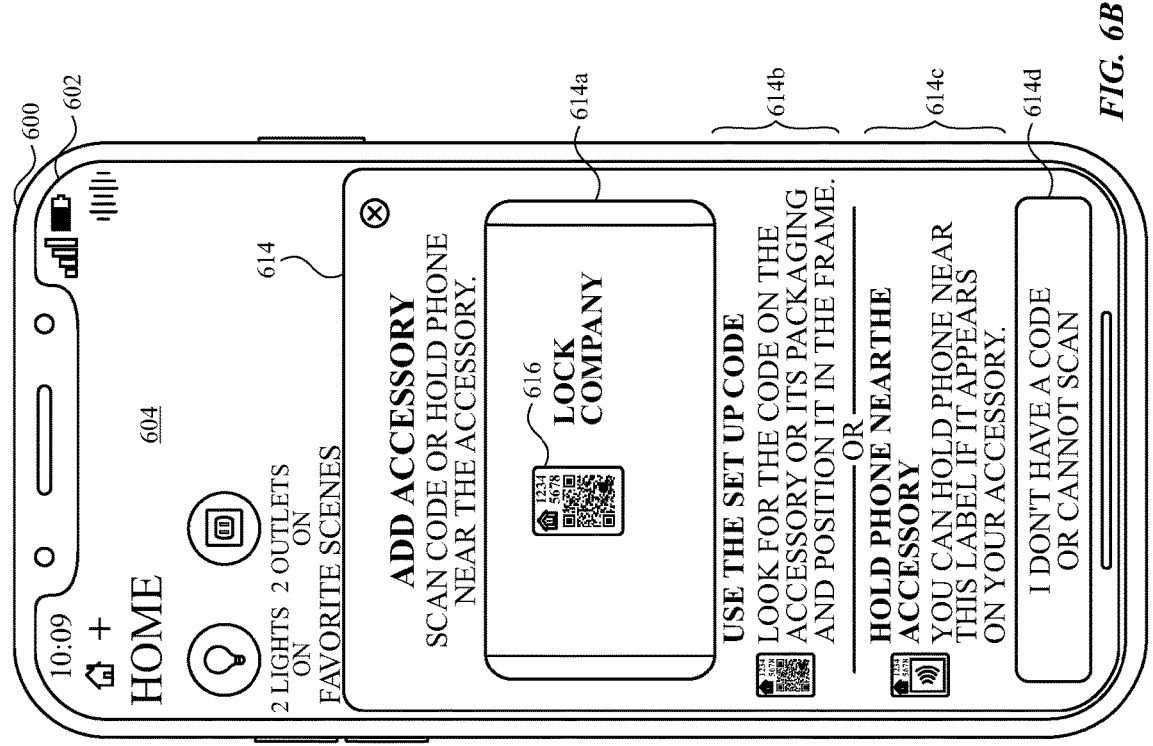
FIGS. 6A-6V illustrate exemplary user interfaces for configuring and/or using a lock accessory, in accordance with some embodiments.
Figure 6A:
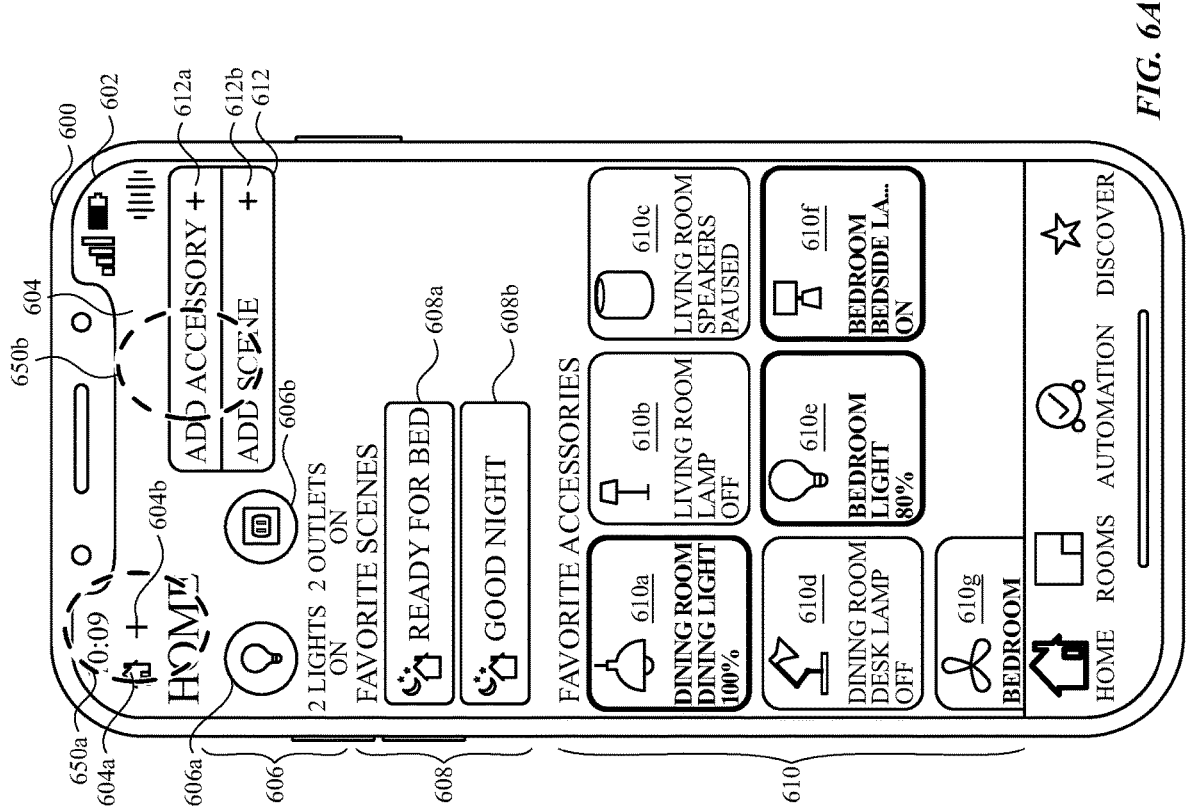

At FIG. 6B, add accessory user interface 614 includes camera field of view 614a, first details region 614b, second details region 614c, and manual setup user interface object 614d.

First details region 614b of add accessory user interface 614 includes a visual indication of instructions for a first option for adding an accessory device (e.g., a new accessory device) to the home automation system. For instance, first details region 614b includes the visual indication, which prompts a user to position a portion of packaging of the accessory device that includes a code (e.g., a QR code, a bar code, an alphanumeric code) within a field of view of the camera of electronic device 600. Camera field of view 614a is a visual representation of a field of view of a camera of electronic device 600. At FIG. 6B, camera field of view 614a includes a visual representation of a portion of the packaging of a lock accessory having code 616 that is within the field of view of the camera of electronic device 600. When code 616 is within the field of view of the camera (e.g., and while displaying add accessory user interface 614), electronic device 600 detects code 616. In response to detecting code 616, electronic device 600 displays first accessory user interface 618, as shown in FIG. 6C. For example, the lock accessory is an electronic lock (e.g., a smart lock) that can be (or is) installed in a door (e.g., of a home) to control whether the door is locked or unlocked (and therefore can be opened) (e.g., via a deadbolt and/or latch).

At FIG. 6B, second details region 614c of add accessory user interface 614 includes a visual indication of instructions for a second option for adding an accessory device (e.g., a new accessory device) to the home automation system. For instance, second details region 614c includes the visual indication, which prompts a user to position the accessory device proximate to (e.g., within a predefined distance of) electronic device 600. In some embodiments, in response to detecting that the accessory device is within a predefined distance of electronic device 600, electronic device 600 detects the accessory device and displays first accessory user interface 618, as shown in FIG. 6C.

At FIG. 6B, manual setup user interface object 614d corresponds to a manual setup process for adding an accessory device (e.g., a new accessory device) to the home automation system. In some embodiments, in response to detecting user input corresponding to manual setup user interface object 614d, electronic device 600 displays a detection user interface that prompts a user to position electronic device 600 proximate to the accessory device and/or to turn the accessory device on.

At FIG. 6C, first accessory user interface 618 includes visual representation 618a of the accessory device that has been detected by electronic device 600 (e.g., via code 616 and/or via a proximity to the accessory device), identifier 618b of the accessory device that has been detected by electronic device 600, and add user interface object 618c. Visual representation 618a includes an image of a type of accessory device detected by electronic device 600. For example, at FIG. 6C, visual representation 618a includes an image of lock accessory 620 having keypad 620a. In some embodiments, visual representation 618a corresponds to a type of accessory that electronic device 600 detects via code 616 and/or via establishing a wireless communication with the accessory device. In some embodiments, visual representation 618a includes features that are particular to the accessory device, such as keypad 620a. In some embodiments, visual representation 618a includes a generic image corresponding to a type of accessory device detected by electronic device 600 without including specific features of the accessory device detected by electronic device 600. At FIG. 6C, identifier 618b (e.g., 'Lock') includes a description of the accessory device and/or a type of accessory device.

At FIG. 6C, electronic device 600 detects user input 650c (e.g., a tap gesture) corresponding to selection of add user interface object 618c. In response to detecting user input 650c, electronic device 600 displays location user interface 622, as shown at FIG. 6D.

Figure 6D:
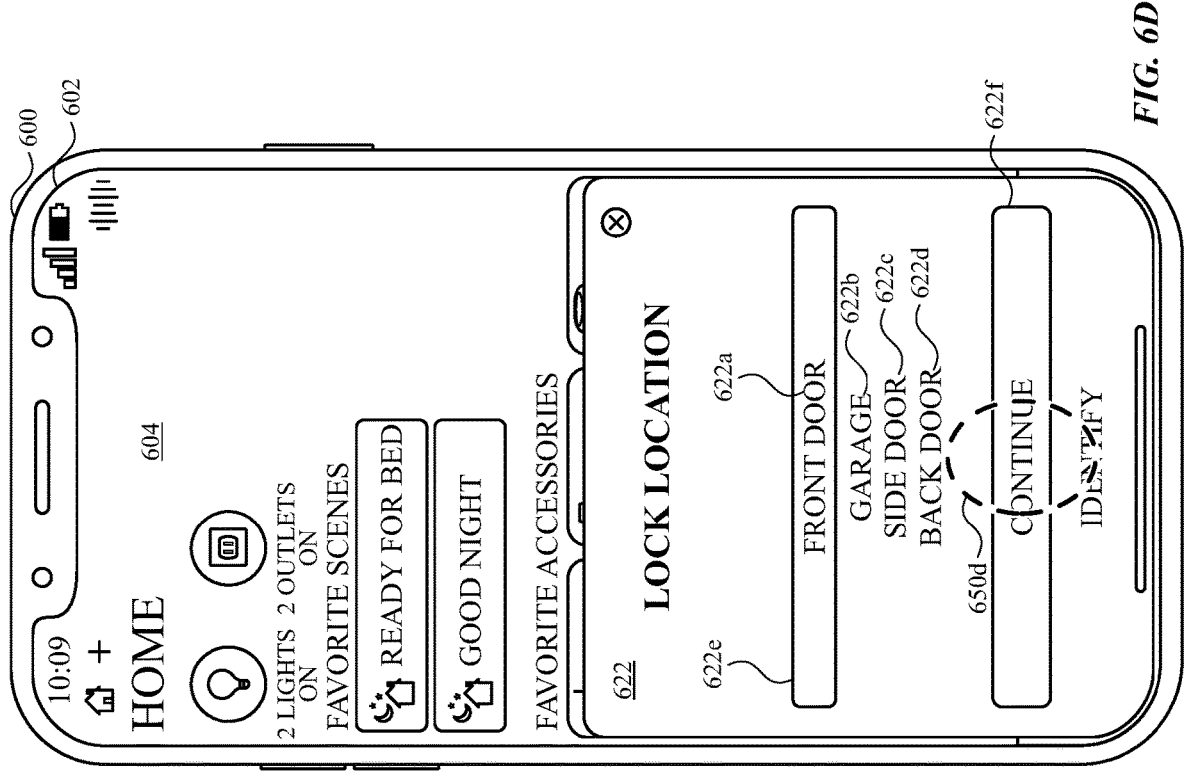
Figure 6C:
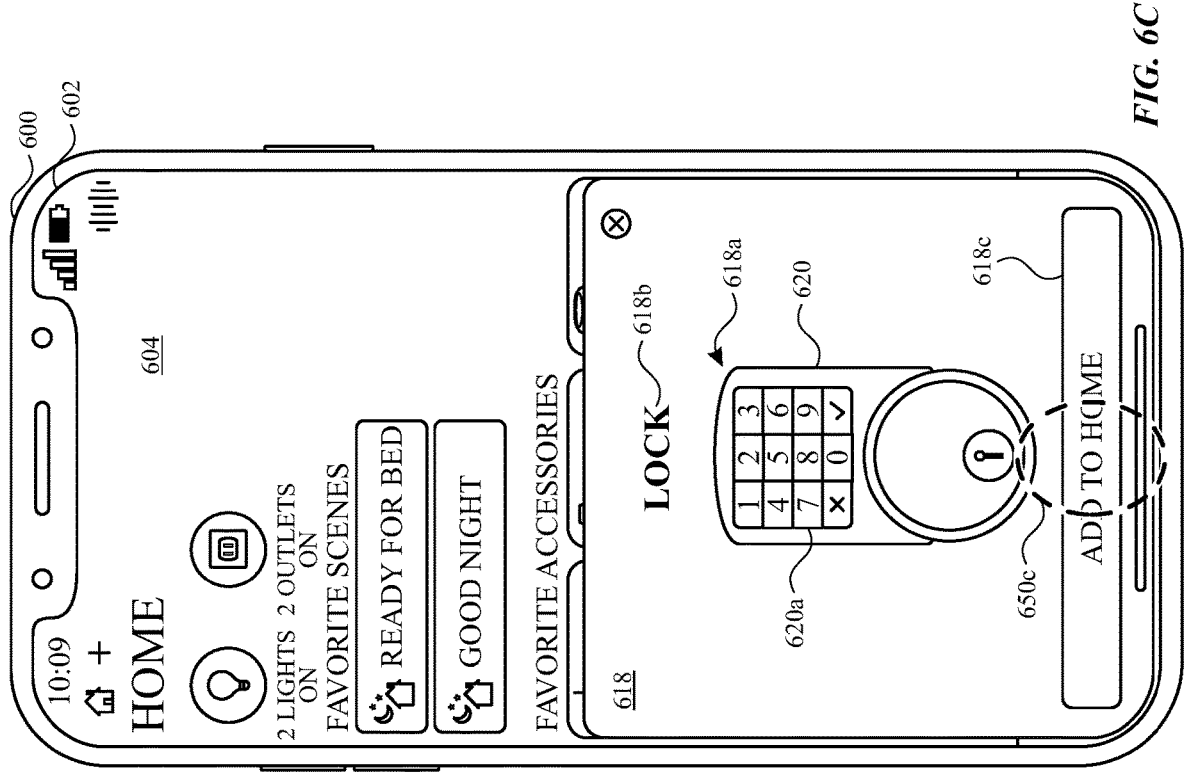
Figure 6F:
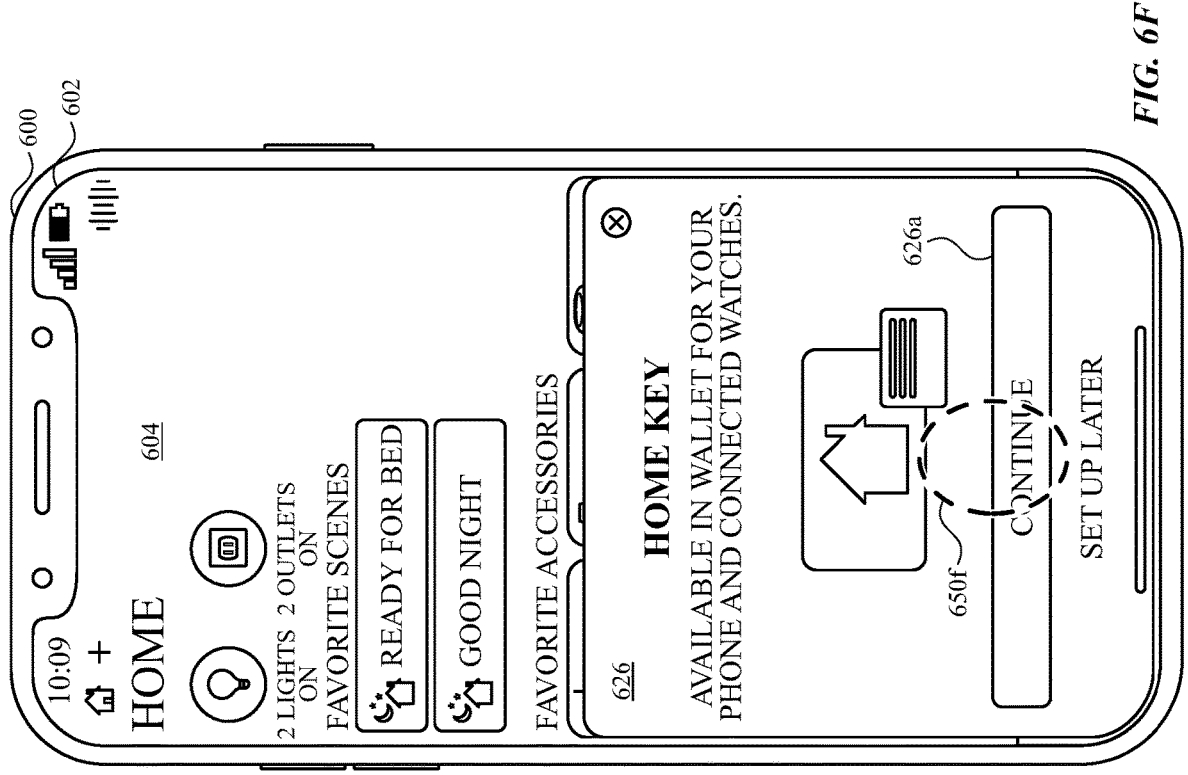

At FIG. 6D, location user interface 622 enables electronic device 600 to associate the accessory device with a location of the home associated with the home automation system. At FIG. 6D, location user interface 622 includes first location indicator 622a (e.g., 'Front Door'), second location indicator 622b (e.g., 'Garage'), third location indicator 622c (e.g., 'Side Door'), and fourth location indicator 622d (e.g., 'Back Door'). Electronic device 600 displays focus indicator 622e (e.g., a box and/or border) around first location indicator 622a. As such, in response to detecting user input corresponding to continue user interface object 622f, electronic device 600 associates the accessory device with the location of the home corresponding to first location indicator 622a (e.g., the 'Front Door' location). In some embodiments, electronic device 600 is configured to display focus indicator 622e around one of location indicators 622b-622d instead of around location indicator 622a. For instance, in response to detecting user input (e.g., a swipe gesture) on location user interface 622, electronic device 600 displays focus indicator 622e around second location indicator 622b, third location indicator 622c, or fourth location indicator 622d (e.g., based on a magnitude of the user input, such as a distance associated with movement of the swipe gesture). In some embodiments, location user interface 622 includes an add location user interface object that, when selected via user input and/or when add location user interface object includes focus indicator 622e, enables a user to add a new location for the home (e.g., via an add location user interface displayed by electronic device 600).

In some embodiments, location indicators 622a-622d correspond to locations of the home associated with the home automation system that have been created via user input (e.g., electronic device 600 detects one or more user inputs that cause electronic device 600 to include a location of the home that can be associated with one or more accessory devices that are added to the home automation system). In some embodiments, location indicators 622a-622d are generated by electronic device 600 as suggested locations for which to associate the accessory device (e.g., default locations that are associated with the home when the home automation system is created by electronic device 600 and/or another electronic device).

At FIG. 6D, electronic device 600 detects user input 650d (e.g., a tap gesture) corresponding to selection of continue user interface object 622f (e.g., continue user interface affordance 622f). In response to detecting user input 650d, electronic device 600 associates the accessory device with the front door location of the home and displays identification user interface 624, as shown at FIG. 6E.

Figure 6E:
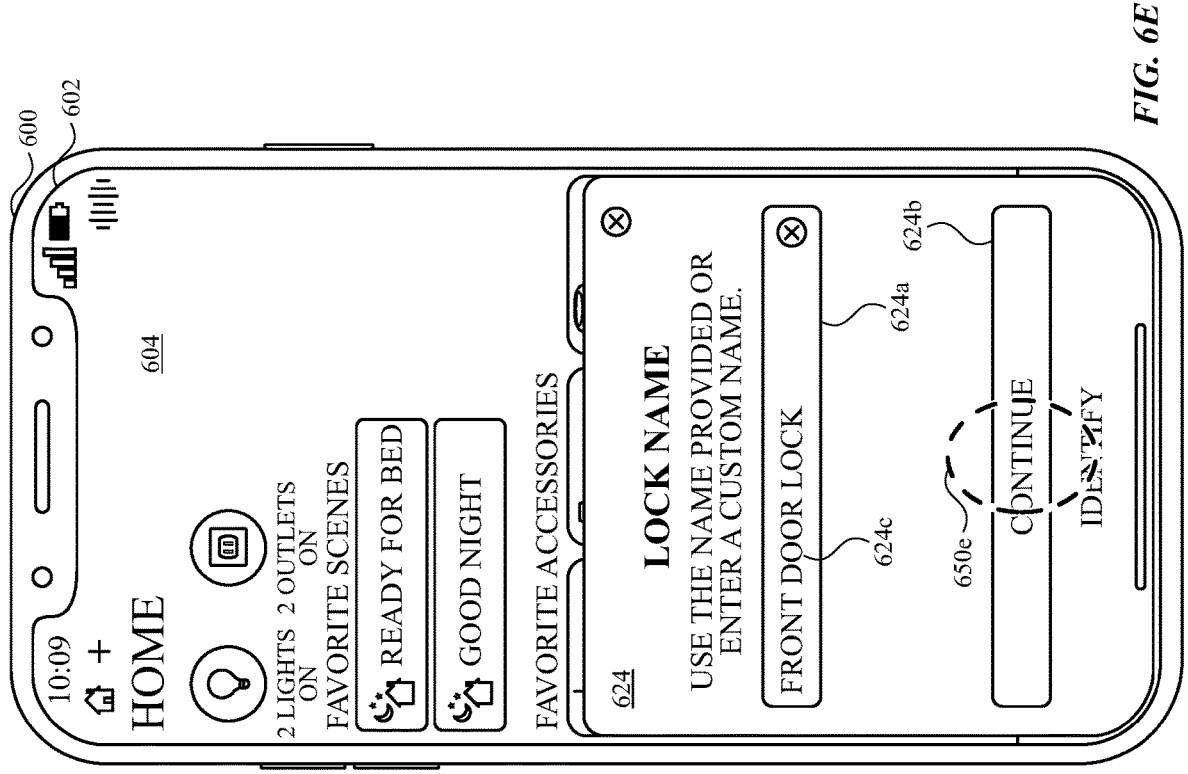

At FIG. 6E, identification user interface 624 enables a user to input a custom name for the accessory device detected by electronic device 600. Identification user interface 624 includes name user interface object 624a and continue user interface object 624b. In some embodiments, in response to detecting user input corresponding to name user interface object 624a, electronic device 600 displays a keyboard (e.g., a virtual keyboard) that enables a user to type alphanumeric characters corresponding to a name for the accessory device. At FIG. 6E, electronic device 600 displays name 624c (e.g., 'Front Door Lock') in name user interface object 624a.

In some embodiments, electronic device 600 displays name 624c in response to detecting one or more user inputs on the keyboard after detecting user input corresponding to name user interface object 624a. In some such embodiments, electronic device 600 displays name user interface object 624a without name 624c and displays name 624c in response to detecting one or more user inputs on the keyboard. In some embodiments, electronic device 600 displays name 624c as a suggested identifier for the accessory device based on the location associated with the accessory device (e.g., 'Front Door' selected via location user interface 622) and/or based on a type of accessory device detected by electronic device 600 (e.g., a lock).

At FIG. 6E, electronic device 600 detects user input 650e (e.g., a tap gesture) corresponding to selection of continue user interface object 624b. In response to detecting user input 650e, electronic device 600 displays accounts user interface 626, as shown at FIG. 6F.

At FIG. 6F, accounts user interface 626 enables a user to add an electronic key associated with the lock accessory to electronic device 600. As set forth below, in some embodiments, adding the electronic key associated with the lock accessory to electronic device 600 enables a user to quickly and easily provide authorization and cause electronic device 600 to lock and/or unlock the lock accessory. At FIG. 6F, electronic device 600 detects user input 650f (e.g., a tap gesture) corresponding to selection of continue user interface object 626a of accounts user interface 626. In response to detecting user input 650f, electronic device 600 adds an electronic key associated with the lock accessory to electronic device 600. In some embodiments, electronic device 600 forgoes displaying accounts user interface 626 and adds an electronic key associated with the lock accessory to electronic device 600 without detecting user input 650f (e.g., electronic device 600 automatically adds the electronic key associated with the lock accessory to electronic device 600).

Figure 6G:
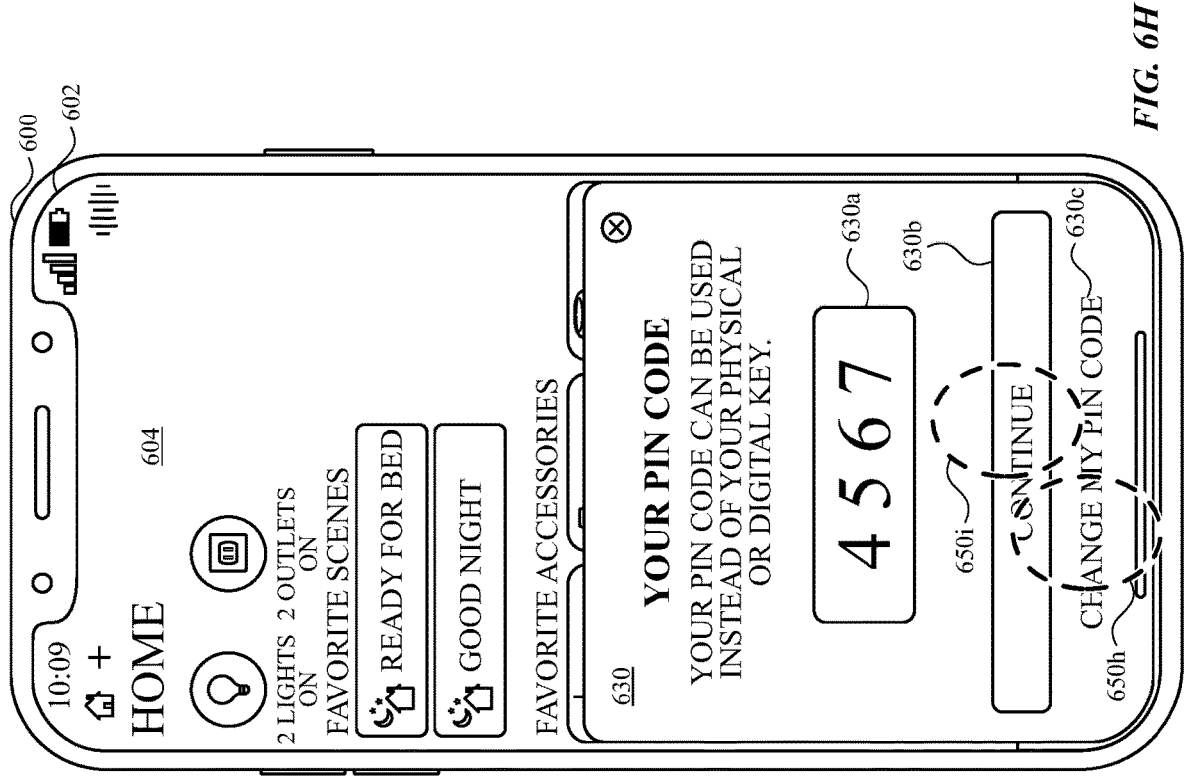
Figure 6H:
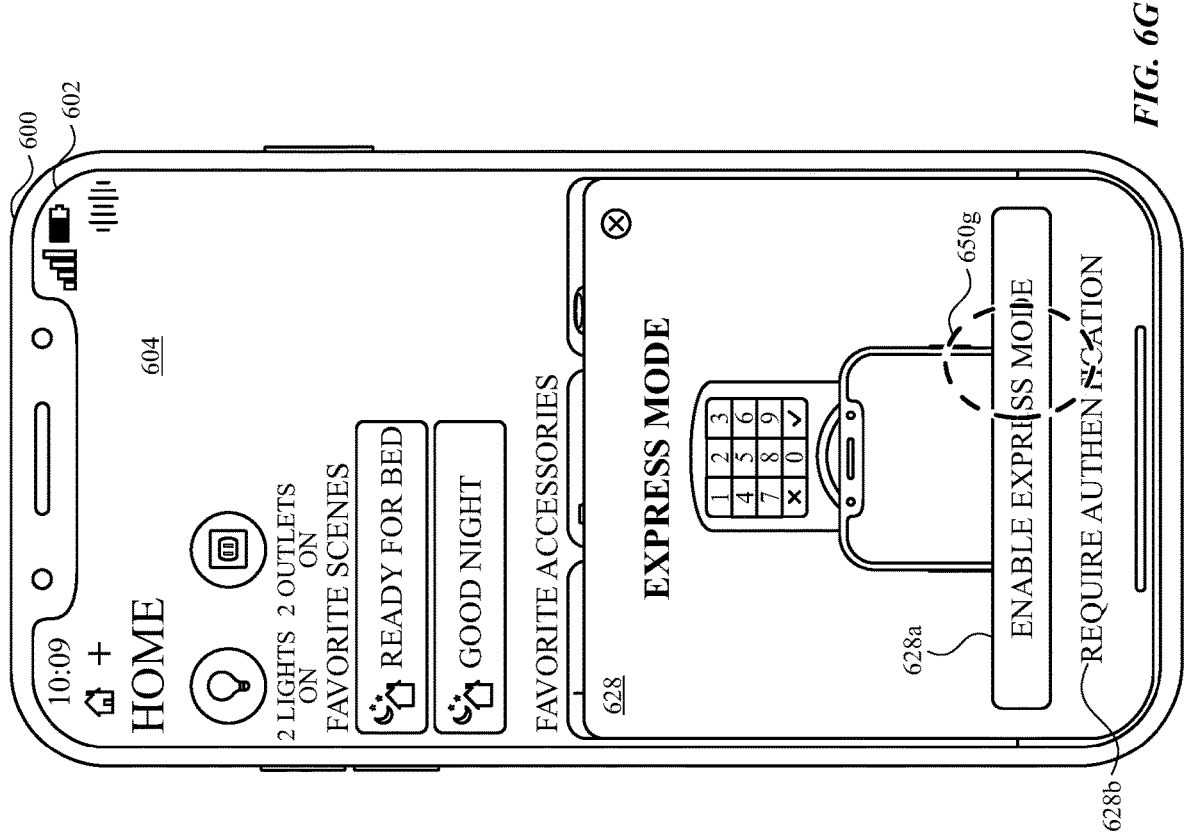

In some embodiments, the lock accessory detected by electronic device 600 (e.g., via code 616 and/or via establishing a wireless communication with the lock accessory) includes a wireless communication feature that enables electronic device 600 to cause the lock accessory to transition between modes (e.g., a locked mode and an unlocked mode) via wireless communication (e.g., near-field communication, Bluetooth, Wi-Fi, UWB, and/or Zigbee). When electronic device 600 detects that the lock accessory includes the wireless communication feature and/or in response to detecting user input 650f, electronic device 600 displays express mode user interface 628, as shown at FIG. 6G. When electronic device 600 detects that the lock accessory does not include the wireless communication feature, electronic device 600 forgoes displaying express mode user interface 628 and instead displays the next user interface of the configuration process for the lock accessory (e.g., pin user interface 630, as shown at FIG. 6H).

At FIG. 6G, express mode user interface 628 enables electronic device 600 to activate an express mode for the lock accessory. When the express mode is activated, electronic device 600 causes the lock accessory to transition between modes (e.g., from the unlocked mode to the locked mode and/or from the locked mode to the unlocked mode) in response to detecting that the lock accessory is within a predefined distance from electronic device 600, such as within wireless range, within one foot, within six inches, within three inches, within two inches, within one inch, and/or within less than one inch from electronic device 600. In some embodiments, when the express mode is activated, electronic device 600 causes the lock accessory to transition between modes without requiring a user to provide (e.g., between the time the lock accessory is detected within the predefined distance and when an instruction is sent to unlock the lock) further authentication, such as a password and/or a biometric feature (e.g., facial features and/or a fingerprint), and/or without transitioning electronic device 600 from a locked mode/state to an unlocked mode/state and independent of the locked/unlocked mode/state of electronic device 600.

At FIG. 6G, express mode user interface 628 includes activate user interface object 628a and skip user interface object 628*b* (e.g., skip activation user interface object 628*b*). In response to detecting user input corresponding to selection of skip user interface object 628*b*, electronic device 600 does not activate the express mode. When the express mode is not activated, electronic device 600 prompts a user for authorization before causing the lock accessory to transition between modes (e.g., when the lock accessory is within the predefined distance of electronic device 600). At FIG. 6G, electronic device 600 detects user input 650*g* (e.g., a tap gesture) corresponding to selection of activate user interface object 628*a*. In response to detecting user input 650*g*, electronic device 600 enables the express mode, thereby enabling electronic device 600 to cause the lock accessory to transition between modes when electronic device 600 detects that the lock accessory is within the predefined distance from electronic device 600 and without prompting a user to provide further authentication.

In some embodiments, the lock accessory detected by electronic device 600 (e.g., via code 616 and/or via establishing a wireless communication with the lock accessory) includes a keypad (e.g., in addition to the wireless communication feature and/or instead of the wireless communication feature). For example, the lock accessory includes an integrated keypad, and the lock (with integrated keypad) is installed (or to be installed) in a door (e.g., of a home). In some such embodiments, electronic device 600 is used to set and/or store a personal identification number (e.g., a "pin") that can be entered into the keypad of the lock accessory to cause the lock accessory to transition between modes (e.g., a locked mode and an unlocked mode). When electronic device 600 detects that the lock accessory includes the keypad and/or in response to detecting user input 650*g*, electronic device 600 displays pin user interface 630, as shown at FIG. 6H. When electronic device 600 detects that the lock accessory does not include a keypad, electronic device 600 forgoes displaying pin user interface 630 and instead displays the next user interface of the configuration process for the lock accessory (e.g., confirmation user interface 634 shown at FIG. 6J).

At FIG. 6H, pin user interface 630 includes pin indicator 630*a*, continue user interface object 630*b*, and change pin user interface object 630*c*. In some embodiments, when electronic device 600 detects that the lock accessory includes the keypad, electronic device 600 generates a pin (e.g., a random set of alphanumeric characters) and communicates with the lock accessory (e.g., via wireless communication, such as Wi-Fi) so that the pin can be entered into the keypad of the lock accessory to cause the lock accessory to transition between modes. In some such embodiments, electronic device 600 displays the generated pin via pin indicator 630*a* (e.g., '4567'). In some embodiments, electronic device 600 suggests an existing pin in pin indicator 630*a* for use with the lock accessory, where the existing pin is associated with a different lock accessory of the home automation system (e.g., electronic device 600 suggests that a user set a pin for the lock accessory that is the same as a pin associated with another lock accessory of the home automation system). In some embodiments, an account of the home automation system is associated with the pin, and the pin (the same pin) is used to unlock various lock accessories of the home automation system. A second account of the home automation system is associated with a second (different) pin, and the second pin is used (e.g., by the user of the second account) to unlock the various lock accessories of the home automation system.

At FIG. 6H, electronic device 600 detects user input 650*h* (e.g., a tap gesture) corresponding to selection of change pin user interface object 630*c*. In response to detecting user input 650*h*, electronic device 600 displays change pin user interface 632, as shown at FIG. 6I. Alternatively, electronic device 600 detects user input 650*i* (e.g., a tap gesture) corresponding to continue user interface object 630*b*. In response to detecting user input 650*i*, electronic device 600 sets the pin (e.g., '4567') (e.g., corresponding to a particular user) for use with the lock accessory (e.g., via wireless communication with the lock accessory) and displays confirmation user interface 634 (e.g., and forgoes displaying change pin user interface 632), as shown at FIG. 6J.

At FIG. 6I, change pin user interface 632 includes pin indicator 632*a*, keyboard 632*b*, and done user interface object 632*c*. At FIG. 6I, computer system 600 has detected one or more user inputs corresponding to keyboard 632*b* and displays pin 632*d* (e.g., '3454') in pin indicator 632*a*. As such, change pin user interface 632 allows a user to input a pin that electronic device 600 enables for use with the lock accessory (e.g., electronic device 600 communicates with the lock accessory over a wireless communication to cause the lock accessory to accept the pin as authorization for transitioning the lock accessory between modes). At FIG. 6I, electronic device 600 detects user input 650*j* (e.g., a tap gesture) corresponding to selection of done user interface object 632*c*. In response to detecting user input 650*j*, electronic device 600 sets pin 632*d* for use with the lock accessory and displays confirmation user interface 634, as shown at FIG. 6J.

Figure 6J:
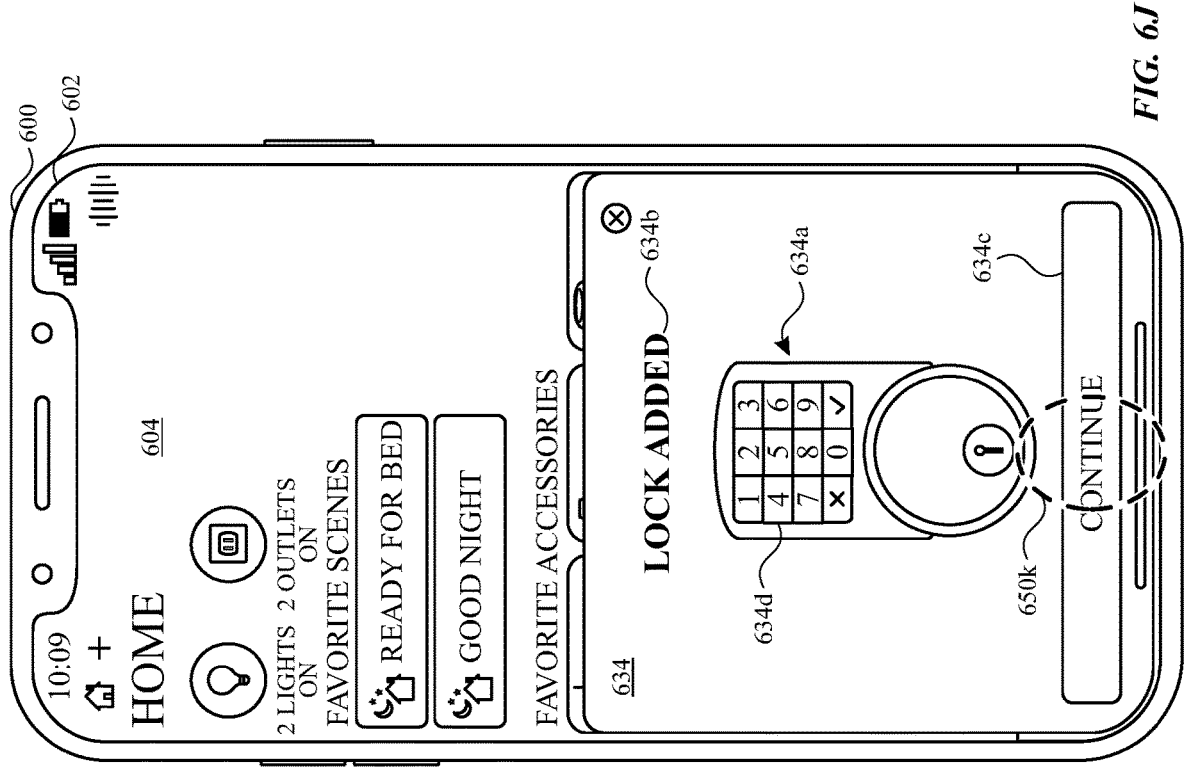
Figure 6I:
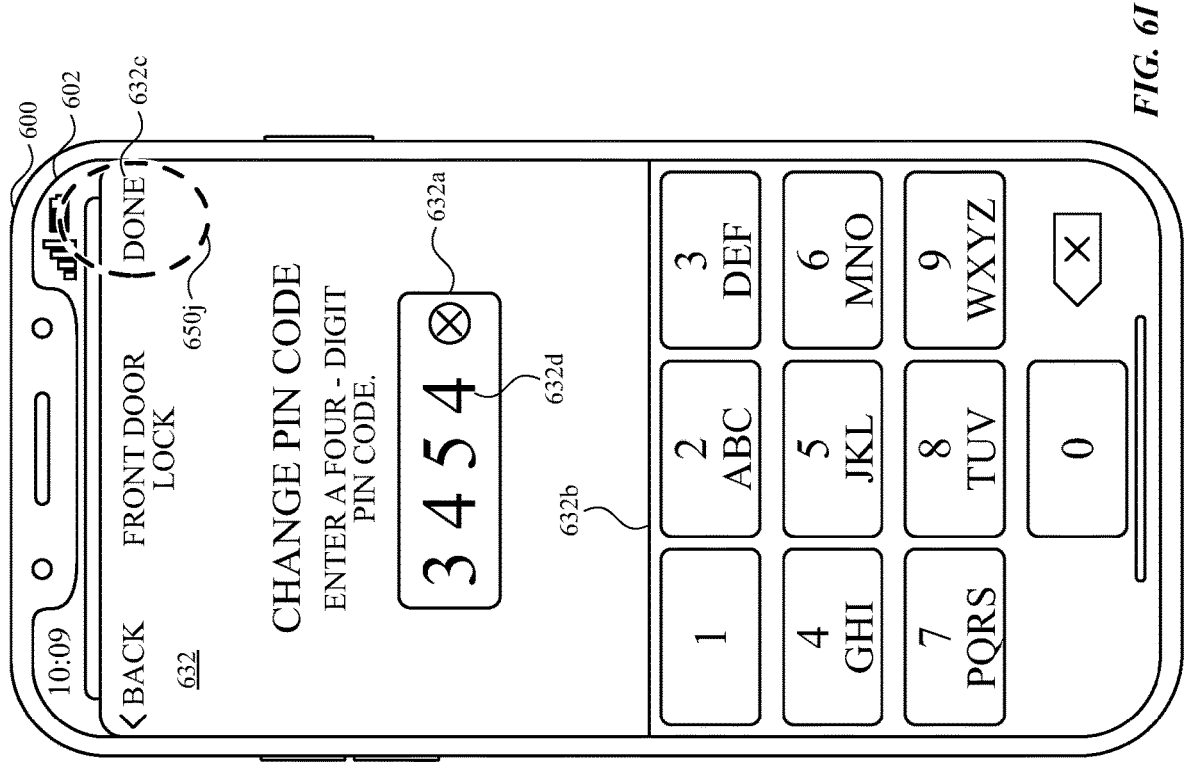
Figure 6L:
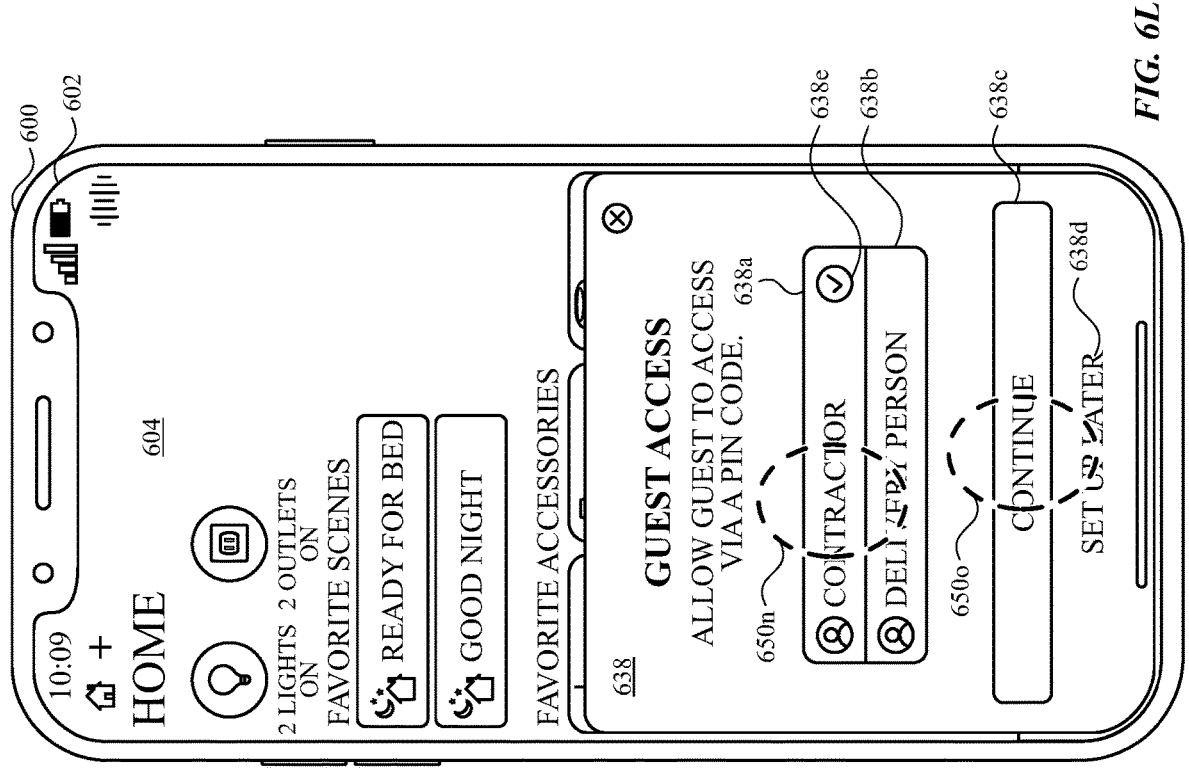

At FIG. 6J, confirmation user interface 634 includes visual representation 634*a* of the lock accessory, confirmation indicator 634*b*, and continue user interface object 634*c*. As set forth above with reference to FIG. 6C, visual representation 634*a* of the lock accessory includes an image of the lock accessory (e.g., a generic image and/or an image with features specific to the lock accessory, such as keypad 634*d*). Confirmation indicator 634*b* includes a visual representation indicating that electronic device 600 successfully added the lock accessory to the home automation system. At FIG. 6J, electronic device 600 detects user input 650*k* (e.g., a tap gesture) corresponding to continue user interface object 634*c*. In response to detecting user input 650*k*, electronic device 600 displays automation user interface 636, as shown at FIG. 6K.

Figure 6K:
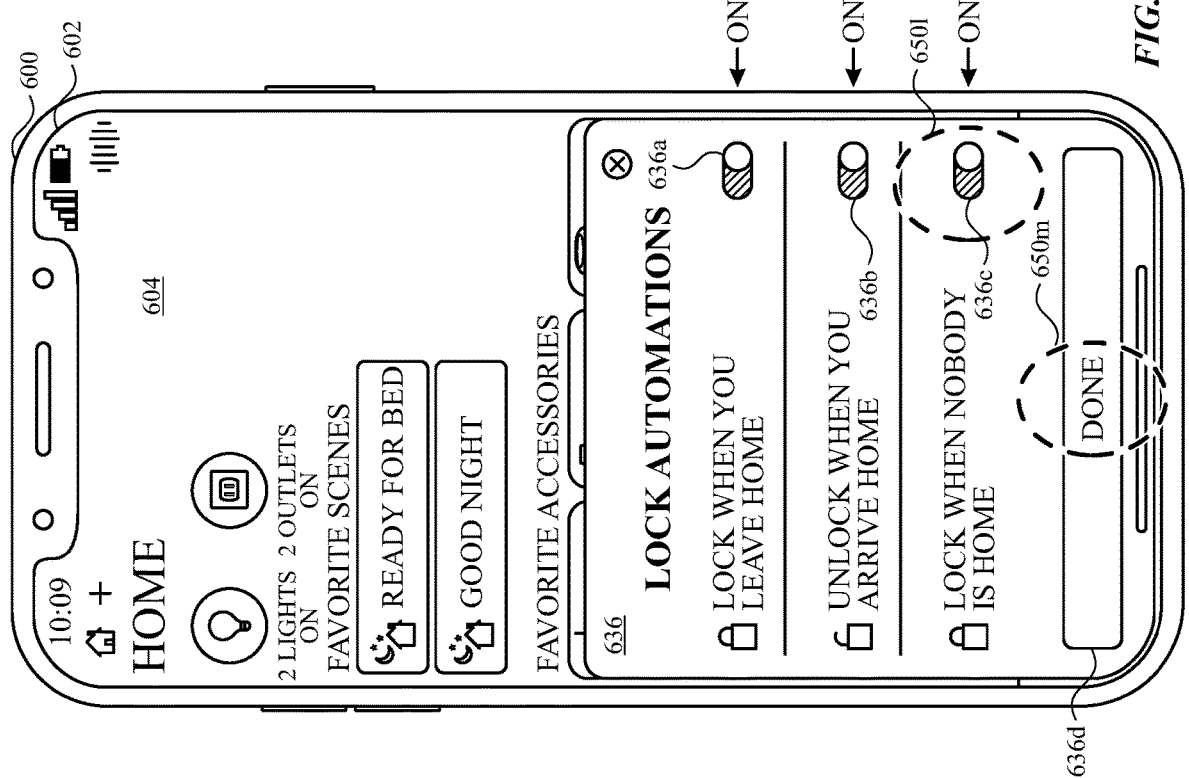

At FIG. 6K, automation user interface 636 includes first automation user interface object 636*a* corresponding to a first automation setting for the lock accessory, second automation user interface object 636*b* corresponding to a second automation setting for the lock accessory, and third automation user interface object 636*d* corresponding to a third automation setting for the lock accessory. For example, at FIG. 6K, first automation user interface object 636*a* corresponds to an automation setting for the lock accessory that, when activated, enables electronic device 600 to cause the lock accessory to transition from an unlocked mode to an unlocked mode in response to determining that electronic device 600 is outside of a predefined distance from the home (e.g., electronic device 600 is disconnected from a Wi-Fi network associated with the home automation system and/or electronic device 600 is outside of the predefined distance (e.g., based on GPS or other locating techniques) from one or more accessories of the home automation system).

At FIG. 6K, second automation user interface object 636*b* corresponds to an automation setting for the lock accessory that, when activated, enables electronic device 600 to cause the lock accessory to transition from the locked mode to the unlocked mode when electronic device 600 is within the predefined distance of the home (e.g., electronic device 600 connects to a Wi-Fi network associated with the home automation system and/or electronic device is within the predefined distance from one or more accessories of the home automation system). Third automation user interface object 636c corresponds to an automation setting for the lock accessory that, when activated, enables electronic device 600 to cause the lock accessory to transition from the unlocked mode to the locked mode when electronic device 600 and additional electronic devices associated with the home automation system (e.g., smart phones (and/or primary devices) of other users of the home automation system) are outside of the predefined distance from the home (e.g., electronic device 600 and additional electronic devices associated with the home automation system are disconnected from a Wi-Fi network associated with the home automation system and/or electronic device 600 and all additional electronic devices associated with the home automation system are outside of the predefined distance from one or more accessories of the home automation system).

At FIG. 6K, each of automation user interface objects 636a-636c are in an on state (e.g., the automation settings associated with automation user interface objects 636a-636c are enabled). In some embodiments, electronic device 600 displays automation user interface 636 with automation user interface objects 636a-636c in the on state (e.g., enabled) in response to detecting user input 650k. In some embodiments, electronic device 600 displays automation user interface 636 with automation user interface objects 636a-636c in the off state (e.g., disabled) in response to detecting user input 650k. In some embodiments, electronic device 600 displays automation user interface 636 with one or more of automation user interface objects 636a-636c in the on state (e.g., enabled).

At FIG. 6K, electronic device 600 detects user input 650l (e.g., a tap gesture) corresponding to selection of third automation user interface object 636c. In response to detecting user input 650l, electronic device 600 displays third automation user interface object 636c in the off state indicating that the third automation setting of the lock accessory is disabled and/or not activated.

At FIG. 6K, electronic device 600 detects user input 650m (e.g., a tap gesture) corresponding to selection of done user interface object 636d. In response to detecting user input 650k, electronic device 600 displays guest user interface 638, as shown at FIG. 6L.

At FIG. 6L, electronic device 600 determines that the home automation system includes one or more guests that have been authorized to use and/or access one or more accessories of the home automation system. For instance, a user of electronic device 600 and/or another user of an external device associated with the home automation system can provide a non-resident of the home access to an existing lock accessory (e.g., a lock accessory that is included in and/or has been previously added to the home automation system and that is different from the lock accessory detected by electronic device 600 as set forth above with reference to FIGS. 6B-6C), such that the guest can cause the existing lock accessory to transition between modes (e.g., via an electronic device and/or via input on a keypad of the lock accessory). When electronic device 600 determines that the home automation system includes guests that are authorized to use and/or access an existing lock accessory (and, optionally, other types of accessories of the home automation system), electronic device 600 displays guest user interface 638. Guest user interface 638 enables a user of electronic device 600 to authorize one or more existing guests to use the lock accessory. In contrast, when electronic device 600 determines that the home automation system does not include guests and/or does not include guests that are authorized to use and/or access an existing lock accessory (and, optionally, other types of accessories of the home automation system), electronic device 600 forgoes displaying guest user interface 638.

At FIG. 6L, guest user interface 638 includes first guest user interface object 638a corresponding to a first existing guest of the home automation system, second guest user interface object 638b corresponding to a second existing guest of the home automation system, continue user interface object 638c, and skip user interface object 638d.

In response to detecting user input 650m, electronic device 600 displays guest user interface 638 indicating that the guests associated with guest user interface objects 638a-638b are not authorized to access the lock accessory (e.g., guest user interface objects 638a-638b are displayed without authorization indicator 638e). In other words, electronic device 600 defaults to not providing authorization to the guests associated with guest user interface objects 638a-638b when electronic device 600 initially displays guest user interface 638. Instead, electronic device 600 authorizes one or more of the guests associated with guest user interface objects 638a-638b in response to user input corresponding to selection of one or both guest user interface objects 638a-638b.

At FIG. 6L, electronic device 600 detects user input 650n (e.g., a tap gesture) corresponding to selection of first guest user interface object 638a. In response to detecting user input 650n, electronic device 600 displays authorization indicator 638e on first guest user interface 638a (e.g., within first guest user interface object 638a and/or adjacent to first guest user interface object 638a). Authorization indicator 638e indicates that electronic device will authorize the first existing guest (e.g., 'Contractor') associated with first guest user interface object 638a to access the lock accessory in response to detecting user input corresponding to continue user interface object 638c. In some embodiments, electronic device 600 displays authorization indicator 638e for the second guest (e.g., 'Delivery Person') associated with second guest user interface object 638b in response to detecting user input selecting second guest user interface object 638b.

In some embodiments, before detecting user input 650n and in response to detecting user input selecting skip user interface object 638d, electronic device 600 forgoes authorizing both the first guest associated with first guest user interface object 638a and the second guest associated with second guest user interface object 638b and displays first user interface 604, as shown at FIG. 6M. In some embodiments, a user of electronic device 600 can provide authorization to the first guest and/or the second guest at a later time (e.g., a time after electronic device 600 displays guest user interface 638) via a settings user interface of electronic device 600.

At FIG. 6L, electronic device 600 detects user input 650o (e.g., a tap gesture) corresponding to selection of continue user interface object 638c. In response to detecting user input 650o, electronic device 600 authorizes the first guest associated with first guest user interface object 638a to access the lock accessory (e.g., via an external device associated with the first guest and/or via a pin). After detecting user input 650o, electronic device 600 displays first user interface 604, as shown at FIG. 6M.

At FIG. 6M, first user interface 604 includes lock accessory user interface object 640 in favorite accessory region 610. Lock accessory user interface object 640 corresponds to the lock accessory that electronic device 600 detected and configured as described above with reference to FIGS. 6B-6L. At FIG. 6M, lock accessory user interface object 640 includes identifier 640a (e.g., 'Front Door Lock') and status indicator 640b (e.g., 'Unlocked'). Lock accessory user interface object 640 thus includes visual indications providing information (e.g., a current mode, such as 'Unlocked') related to the lock accessory corresponding to lock accessory user interface object 640.

In some embodiments, electronic device 600 displays lock accessory user interface object 640 in favorite accessory region 610 in response to detecting one or more user inputs designating the lock accessory corresponding to lock accessory user interface object 640 as a favorite accessory. In some embodiments, electronic device 600 displays lock accessory user interface object 640 in favorite accessory region 610 in response to determining that a setup process for the lock accessory is completed (e.g., in response to detecting user input 650o).

At FIG. 6M, electronic device 600 detects user input 650p (e.g., a long press gesture) corresponding to lock accessory user interface object 640. In response to detecting user input 650p, electronic device 600 displays front door lock user interface 642, as shown at FIG. 6N.

At FIG. 6N, front door lock user interface 642 includes mode user interface object 644 and settings user interface object 642a. Mode user interface object 644 includes indicator 644a corresponding to a current mode of the lock accessory (e.g., an unlocked mode). When mode user interface object 644 is selected via user input, electronic device 600 causes the lock accessory to transition from a first mode (e.g., the unlocked mode) to a second mode (e.g., a locked mode). At FIG. 6N, mode user interface object 644 is in a first position and indicator 644a includes a visual representation of an unlocked lock, thereby indicating that the lock accessory is in an unlocked mode. In response to detecting user input 650q (e.g., a swipe down gesture and/or a tap gesture) on mode user interface object 644, electronic device 600 displays mode user interface object 644 in a second position and causes the lock accessory to transition from the unlocked mode to a locked mode. In some embodiments, in response to detecting user input 650q, electronic device 600 displays indicator 644a as having a visual representation of a locked lock to indicate that the lock accessory has transitioned to the locked mode.

Front door lock user interface 642 enables electronic device 600 to cause the lock accessory to transition between modes (e.g., locked and unlocked). In some embodiments, electronic device 600 is configured to cause the lock accessory to transition between modes in response to detecting user input corresponding to mode user interface object 644 when a set of criteria is met. For example, in some embodiments, the set of criteria includes electronic device 600 being connected to the same network (e.g., Wi-Fi network) as the lock accessory, electronic device 600 being within a predefined distance of the lock accessory, and/or electronic device 600 being in direct communication with the lock accessory (e.g., via a short-range communication connection, such as Bluetooth). In some embodiments, when the set of criteria is not met, electronic device 600 is unable to cause the lock accessory to transition between modes in response to detecting user input corresponding to mode user interface object 644. In some embodiments, when the set of criteria is not met, electronic device 600 forgoes displaying front door lock user interface 642 in response to detecting user input 650p.

At FIG. 6N, electronic device 600 detects user input 650r corresponding to selection of settings user interface object 642a of front door lock user interface 642. In response to detecting user input 650r, electronic device 600 displays first settings user interface 646, as shown at FIG. 6O.

Figure 6O:
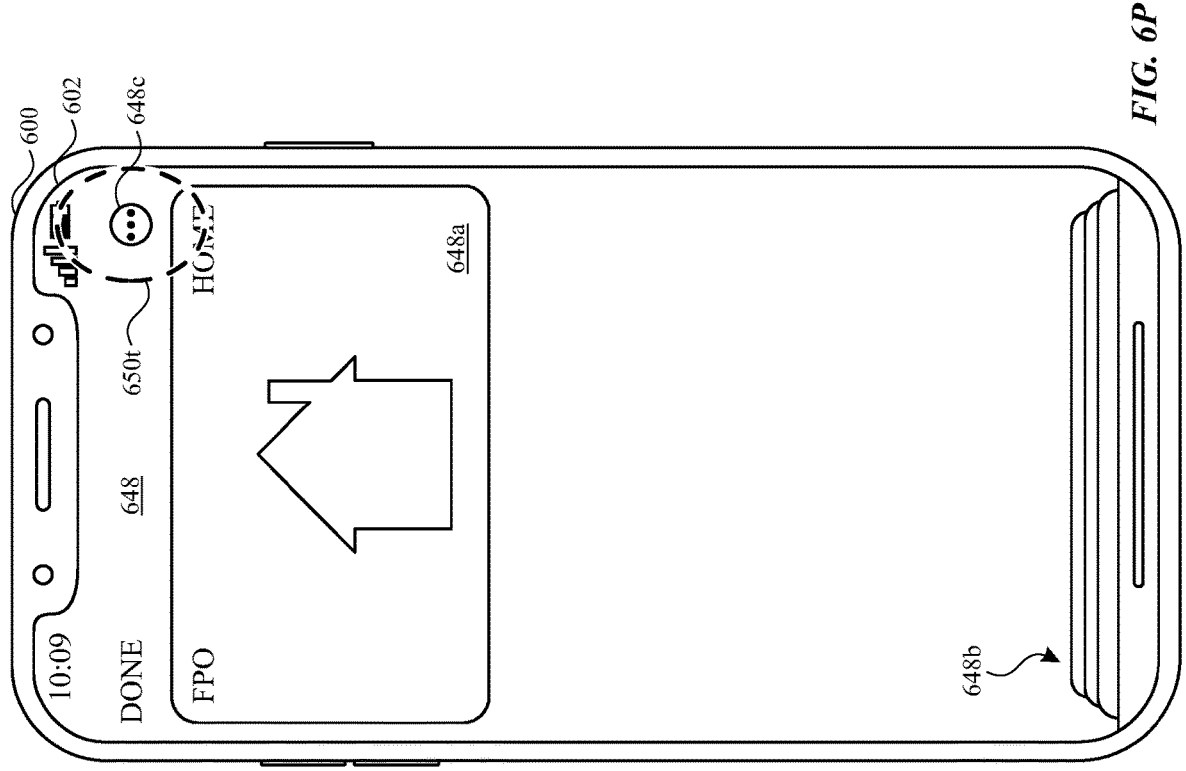

At FIG. 6O, first settings user interface 646 includes identifier 646a corresponding to a name and/or other identifier of the lock accessory, settings region 646b, automations region 646c, manage access user interface object 646d, notifications user interface object 646e, and details region 646f. In some embodiments, electronic device 600 is configured to adjust and/or change a location designation of the lock accessory and/or adjust whether lock accessory user interface object 640 is displayed in favorite accessory region 610 in response to one or more user inputs corresponding to settings region 646b. In some embodiments, electronic device 600 is configured to enable, disable, and/or create automation settings for the lock accessory in response to one or more user inputs corresponding to automations region 646c. In some embodiments, electronic device 600 is configured to display authorization statuses, authorize, and/or revoke authorization for one or more users in response to user input selecting manage access user interface object 646d. In some embodiments, electronic device 600 is configured to display notification options, enable notifications, and/or disable notifications for the lock accessory in response to user input selecting notifications user interface object 646e.

At FIG. 6O, electronic device 600 detects user input 650s (e.g., a swipe right gesture) while displaying first settings user interface 646. After detecting user input 650s, electronic device 600 navigates to an accounts application (e.g., an electronic wallet application) of electronic device 600 and displays accounts user interface 648, as shown at FIG. 6P.

Figure 6P:
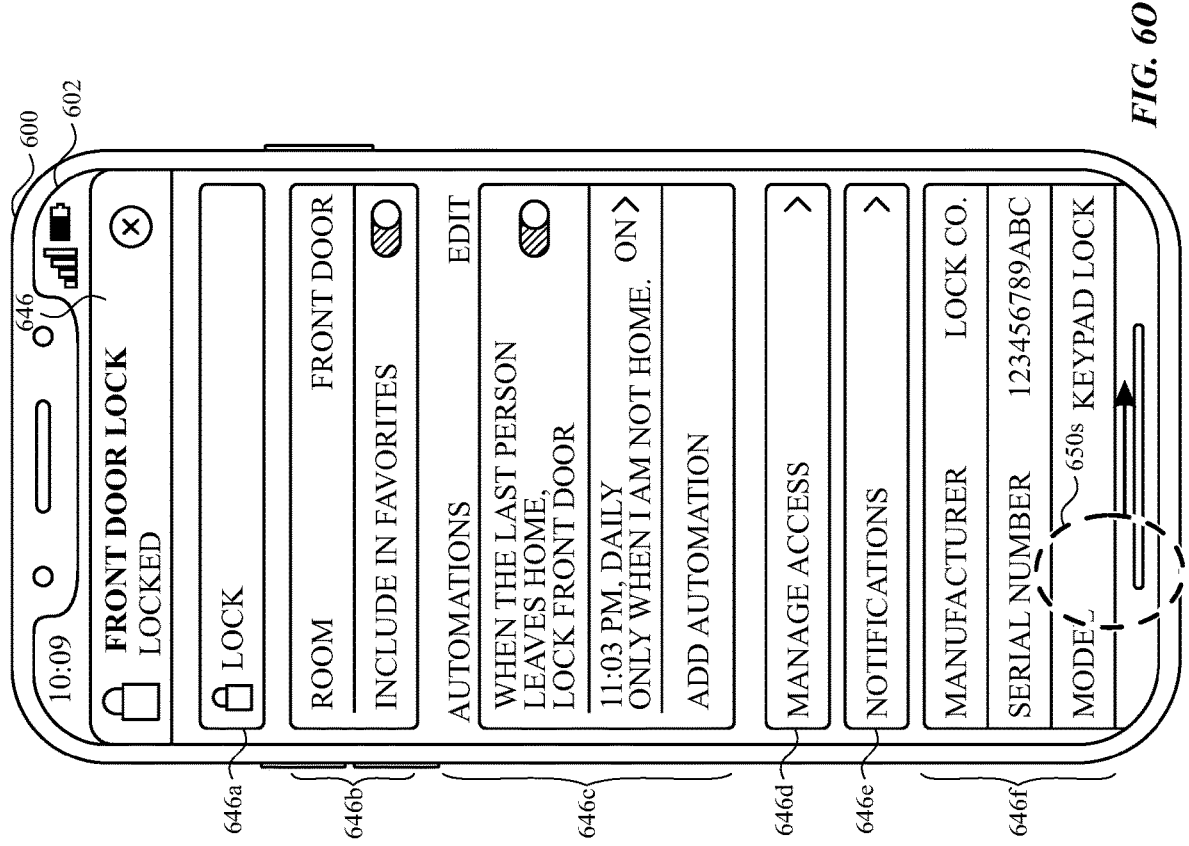
Figure 6V:
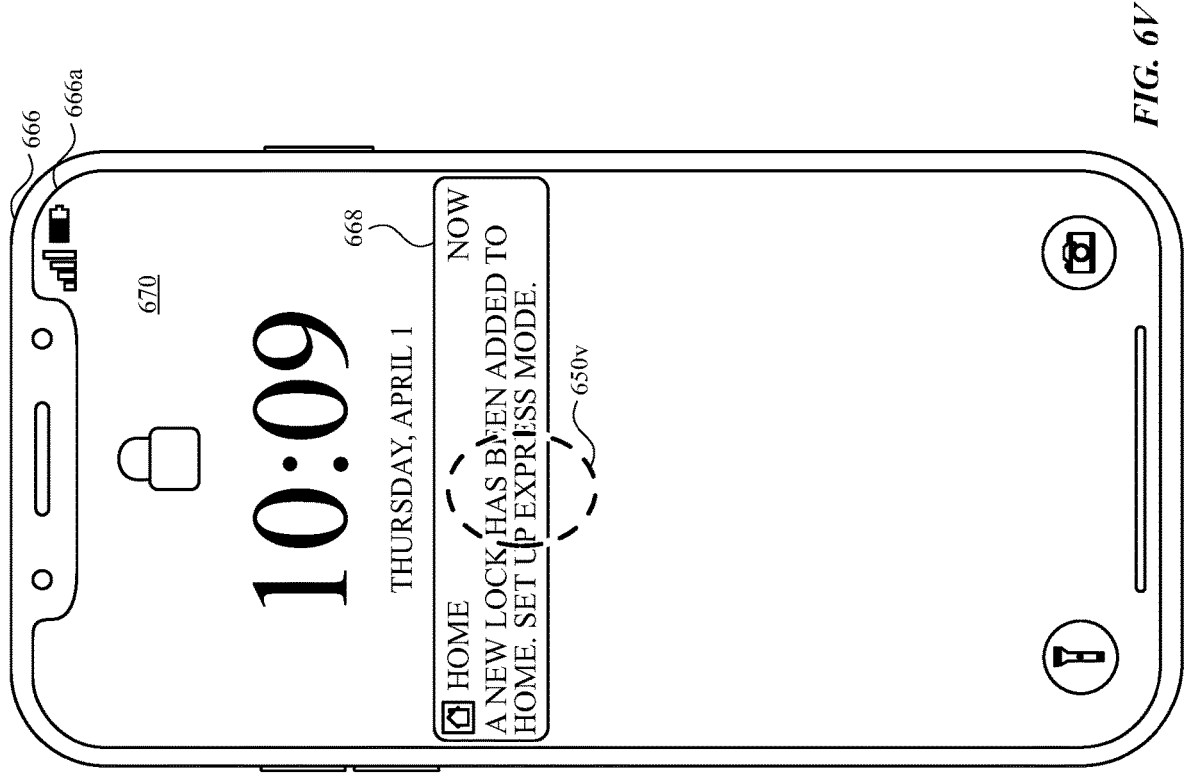

At FIG. 6P, accounts user interface 648 includes first electronic key user interface object 648a and electronic key stack 648b. First electronic key user interface object 648a corresponds to an electronic key for one or more lock accessories, including the lock accessory, of the home automation system. As set forth above with reference to FIG. 6F, electronic device 600 includes first electronic key user interface object 648a and/or otherwise associates the lock accessory with first electronic key user interface object 648a in response to detecting user input 650f during the configuration process of the lock accessory. In some embodiments, first electronic key user interface object 648a includes an appearance, such as a color and/or finish, that matches an appearance of the lock accessory. In some such embodiments, electronic device 600 receives data from the lock accessory (e.g., via a wireless communication connection) corresponding to a visual appearance of the lock accessory and displays first electronic key user interface object 648a to resemble and/or simulate an appearance of the lock accessory.

In some embodiments, electronic key stack 648b corresponds to a plurality of electronic keys, passes, and/or account credentials for which electronic device 600 has received authorization (e.g., electronic car keys, boarding passes, transportation accounts, transaction accounts, and/or gift cards).

At FIG. 6P, electronic device 600 detects user input 650t (e.g., a tap gesture) corresponding to selection of key settings user interface object 648c. In response to detecting user input 650t, electronic device 600 displays key settings user interface 652, as shown at FIG. 6Q.

At FIG. 6Q, key settings user interface 652 includes first key user interface object 648a, home application user interface object 652a, pin code region 652b, notifications user interface object 652c, express mode region 654, and remove key user interface object 652d. In some embodiments, in response to detecting user input corresponding to selection of home application user interface object 652a, electronic device 600 displays first user interface 604 and/or front door lock user interface 642. In some embodiments, electronic device 600 is configured to change a pin associated with one or more lock accessories (e.g., and the lock accessory) of the home automation system in response to user input selecting pin code region 652b (e.g., to change the pin for an account of the home automation system). In some embodiments, electronic device 600 is configured to enable and/or disable notifications for the lock accessory (and, optionally, other lock accessories of the home automation system) in response to user input selecting notifications user interface object 652c. In some embodiments, electronic device 600 is configured to remove and/or revoke authorization of electronic device 600 for the lock accessory (and, optionally, other lock accessories of the home automation system) in response to user input corresponding to remove key user interface object 652d.

As set forth above, express mode enables electronic device 600 to cause the lock accessory to transition between modes when electronic device 600 is within a predefined distance of the lock accessory (and when the lock accessory includes a wireless communication feature) without requiring further authentication from a user of electronic device 600. At FIG. 6Q, express mode region 654 includes express mode user interface object 654a and express mode settings user interface object 654b. In some embodiments, electronic device 600 displays an express mode settings user interface in response to detecting user input selecting express mode settings user interface object 654b. In some such embodiments, the express mode settings user interface enables electronic device 600 to adjust settings corresponding to the express mode, such as which lock accessories of the home automation system are authorized and/or selected for use with the express mode.

At FIG. 6Q, express mode user interface object 654a includes indicator 654c indicating that the express mode for the lock accessory (and, optionally, other lock accessories of the home automation system) is currently disabled (e.g., 'Off'). At FIG. 6Q, electronic device 600 detects user input 650u (e.g., a tap gesture) corresponding to selection of express mode user interface object 654a. In response to detecting user input 650u, electronic device 600 prompts a user for authentication to enable the express mode, as shown at FIG. 6R.

Because the express mode enables a user to cause the lock accessory to transition between modes without requiring further authorization from the user, electronic device 600 prompts a user to provide authentication to enable the express mode (e.g., so that an identity of the user of electronic device 600 is confirmed before electronic device 600 is authorized to use the express mode). At FIG. 6R, electronic device 600 displays authentication user interface object 656, which prompts a user to provide a biometric feature, such as one or more facial features and/or a fingerprint, as an authentication input for enabling the express mode. In some embodiments, authentication user interface object 656 prompts the user to provide another authentication input, such as a password. At FIG. 6R, in response to detecting the biometric feature of a user (e.g., via a camera and/or a fingerprint sensor of electronic device 600), electronic device 600 compares the detected biometric feature to biometric feature data of an authorized user of electronic device (e.g., biometric feature data stored and/or accessible by electronic device). At FIG. 6R, electronic device 600 determines that the detected biometric feature matches the biometric feature data of the authorized user and enables the express mode for the lock accessory (and, optionally, other lock accessories of the home automation system). At FIG. 6R, after determining that the detected biometric feature matches the biometric feature data, electronic device 600 displays indicator 654c (e.g., updates display of indicator 654c) indicating that the express mode has been enabled (e.g., 'On').

After electronic device 600 enables the express mode, electronic device 600 is configured to cause the lock accessory to transition between modes when electronic device 600 is within the predefined distance of the lock accessory (and when the lock accessory includes a wireless communication feature (e.g., a near-field communication receiver and/or tag)). At FIG. 6S, electronic device 600 is positioned proximate to lock accessory 658 (e.g., the lock accessory detected by electronic device 600 and configured by electronic device 600 as described above with reference to FIGS. 6B-6L). At FIG. 6S, electronic device 600 is within a predefined distance of lock accessory 658. In some embodiments, the predefined distance is within one foot, within six inches, within five inches, within two inches, within one inch, and/or within less than one inch of (e.g., in contact with) lock accessory 658. As described below, when electronic device 600 determines and/or detects that electronic device 600 is within the predefined distance of lock accessory 658 and when the express mode is enabled (e.g., lock accessory 658 includes a wireless communication feature), electronic device 600 causes lock accessory 658 to transition between modes (e.g., from a locked mode to an unlocked mode or from the unlocked mode to the locked mode).

At FIG. 6S, electronic device 600 displays lock user interface 660 indicating that electronic device 600 is locked (e.g., one or more features and/or functions of electronic device 600 are locked and/or blocked). In some embodiments, electronic device 600 unlocks (and/or unblocks the one or more features and/or functions) in response to detecting an authentication user input, such as a passcode, a password, and/or a biometric feature (e.g., one or more facial features and/or a fingerprint detected via a biometric sensor (e.g., a camera and/or a fingerprint sensor) of electronic device 600). At FIG. 6S, while electronic device 600 is locked (and, optionally displays lock user interface 660) and while the express mode is enabled, electronic device 600 detects that lock accessory 658 is within the predefined distance of electronic device 600. In response to detecting that lock accessory 658 is within the predefined distance of electronic device 600, electronic device 600 causes (e.g., sends a wireless communication to) lock accessory 658 to transition between modes (e.g., to unlock), as shown at FIG. 6T. At FIG. 6S, electronic device causes lock accessory 658 to transition between modes while displaying lock user interface 660 and without prompting a user to provide an authentication input. Therefore, when the express mode is enabled, electronic device 600 causes lock accessory 658 to transition between modes (e.g., to unlock) without requiring a user to provide an authentication input and/or otherwise unlock electronic device 600.

At FIG. 6T, after electronic device 600 causes lock accessory 658 to transition between modes, electronic device 600 displays mode transition user interface 662. Mode transition user interface 662 includes first electronic key user interface object 648a and status indicator 662a. Displaying first electronic key user interface object 648a provides an indication to a user of electronic device 600 that electronic device 600 used an electronic key associated with first electronic key user interface object 648a (and associated with lock accessory 658) to cause lock accessory 658 to transition between modes. In some embodiments, a user of electronic device 600 did not intend to cause lock accessory 658 to transition between modes, and thus, the user can take further action to cause lock accessory 658 to return to a preferred mode. Status indicator 662a notifies a user of electronic device 600 that electronic device 600 received an indication (e.g., from lock accessory 658 and/or from an intermediate device in communication with electronic device 600 and lock accessory 658) that lock accessory 658 successfully transition between modes.

In some embodiments, electronic device 600 displays mode transition user interface 662 for a predefined period of time (e.g., 10 seconds, 5 seconds, and/or 3 seconds) before ceasing to display mode transition user interface 662 and displaying lock user interface 660. In some embodiments, electronic device 600 forgoes displaying mode transition user interface 662 after receiving and indication that lock accessory 658 transitioned between modes (e.g., electronic device 600 continues to display lock user interface 660).

Figure 6U:
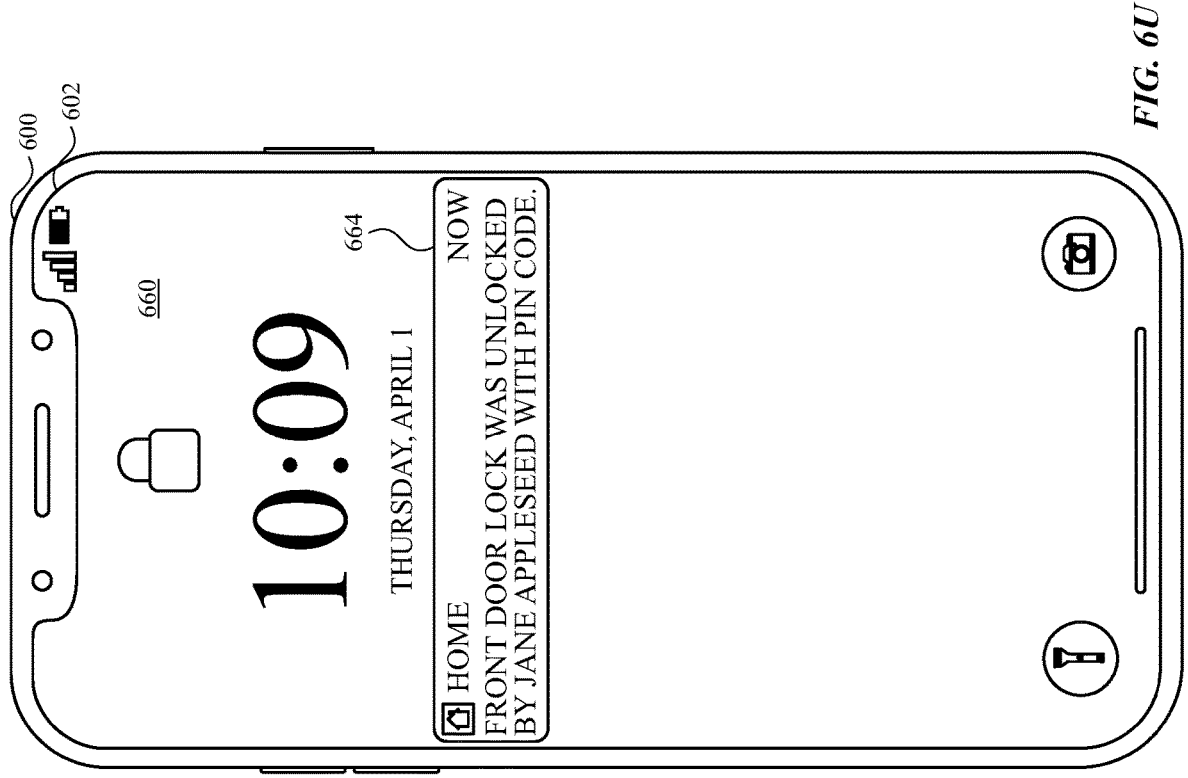

FIGS. 6U and 6V illustrate exemplary user interfaces that include notifications corresponding to lock accessory 658 (and/or another lock accessory of the home automation system). At FIG. 6U, electronic device 600 displays unlock notification 664 indicating that lock accessory 658 (and/or another lock accessory of the home automation system) transitioned from a locked mode to an unlocked mode via a pin entered into a keypad of lock accessory 658. The notification may include an indication of which user and/or device associated with a user interacted with lock accessory 658. In this case, Jane Appleseed (and/or an authorized device of Jane Appleseed) unlocked the front door lock with the pin code assigned to Jane Appleseed. At FIG. 6U, electronic device 600 displays unlock notification 664 on lock user interface 660. In some embodiments, electronic device 600 displays unlock notification 664 while electronic device 600 is in an unlocked state and displaying another user interface.

In some embodiments, electronic device 600 displays unlock notification 664 in response to detecting and/or receiving an indication that lock accessory 658 transitioned from a locked mode to an unlocked mode via a pin entered into a keypad of lock accessory 658. In some embodiments, electronic device 600 displays unlock notification 664 in response to detecting and/or receiving an indication that a pin of a first set of pins was entered into a keypad of lock accessory 658 and caused lock accessory 658 to transition from the locked mode to the unlocked mode. In some such embodiments, the first set of pins correspond to users that are different from the user of electronic device 600 (e.g., pins corresponding to users associated with different accounts than an account of electronic device 600) and/or users that are not designated as residents of the home (e.g., users that are designated as guests and have access to lock accessory 658 via a pin). In some embodiments, when electronic device 600 detects and/or receives an indication that a pin that is not included in the first set of pins was entered into a keypad of lock accessory 658 and caused lock accessory 658 to transition from the locked mode to the unlocked mode, electronic device 600 forgoes displaying unlock notification 664. In some embodiments, electronic device 600 displays unlock notification 664 when electronic device 600 determines that lock accessory 658 (and/or another lock accessory of the home automation system) includes a keypad. In some embodiments, when electronic device 600 detects and/or receives an indication that a pin that is not authorized to cause lock accessory 658 to transition between modes was entered at a keypad of lock accessory 658, electronic device 600 displays a notification indicating that an unauthorized pin was attempted to cause lock accessory 658 to transition between modes (e.g., but lock accessory 658 did not transition between modes).

At FIG. 6V, electronic device 666 displays, via display 666a, new lock accessory notification 668 indicating that lock accessory 658 (and/or another lock accessory of the home automation system) has been newly added to the home automation system. At FIG. 6V, electronic device 666 displays new lock accessory notification 668 on lock user interface 670. In some embodiments, electronic device 666 displays new lock accessory notification 668 while electronic device 666 is in an unlocked state and displaying another user interface.

In some embodiments, electronic device 666 is different from electronic device 600. For instance, in some embodiments, electronic device 666 corresponds to a user that has been granted authorization for the home automation system, but the user associated with electronic device 666 did not configure lock accessory 658 (e.g., as described above with reference to FIGS. 6A-6L). Accordingly, users that have been granted authorization for the home automation system receive new lock accessory notification 668 when lock accessory 658 is added to the home automation system so that users can configure and/or customize various settings for lock accessory 658 via electronic device 666 (e.g., express mode settings, notification settings, pin settings, and/or automation settings). In some embodiments, electronic devices associated with users that are designated as guests of the home automation system do not generate and/or display new lock accessory notification 668.

At FIG. 6V, electronic device 666 detects user input 650v (e.g., a tap gesture) corresponding to selection of new lock accessory notification 668. In some embodiments, in response to detecting user input 650v, electronic device 666 displays accounts user interface 626 (e.g., as shown at FIG. 6F), express mode user interface 628 (e.g., as shown at FIG. 6G), and/or pin user interface 630 (e.g., as shown at FIG. 6H) so that the user of electronic device 666 can adjust one or more settings for lock accessory 658 via electronic device 666.

FIG. 7 is a flow diagram illustrating a method for configuring a lock accessory using a computer system in accordance with some embodiments. Method 700 is performed at a computer system (e.g., 100, 300, 500, or 600) (e.g., a smartphone, a tablet, and/or a smartwatch) that is in communication with (e.g., wirelessly or by wire, and/or integrates or includes) a display generation component (e.g., a display or touch-sensitive display) and one or more input devices (e.g., a touch-sensitive surface and/or a keyboard). Some operations in method 700 are, optionally, combined, the orders of some operations are, optionally, changed, and some operations are, optionally, omitted.

As described below, method 700 provides an intuitive way for configuring a lock accessory. The method reduces the cognitive burden on a user for configuring a lock accessory, thereby creating a more efficient human-machine interface. For battery-operated computing devices, enabling a user to configure a lock accessory faster and more efficiently conserves power and increases the time between battery charges.

The computer system (e.g., 600) receives (702), via the one or more input devices, a request (e.g., 650c) to configure an electronic lock (e.g., 658) (e.g., a door lock, such as for controlling access to a home/building doorway) that is separate from (e.g., that is not physically integrated into the computer system; that does not power on (or off) when the computer system is powered on (or off)) the computer system (e.g., 600). In some embodiments, the computer system is in communication (e.g., wireless communication) with the electronic lock.

In response to receiving the request (e.g., 650*c*) to configure the electronic lock (e.g., 658), the computer system (e.g., 600) starts (704) a configuration process for configuring the electronic lock.

During the configuration process (706) for configuring the electronic lock, in accordance with a determination that the electronic lock includes a short-range communication feature for communicating via short-range wireless communication (e.g., includes a near field communication (NFC) reader, includes WiFi communication capabilities, and/or includes ultra-wideband (UWB) communication capabilities) (and optionally in response to receiving a first configuration user input received during the configuration process), the computer system (e.g., 600) displays (708), via the display generation component, an option (e.g., 628 and/or 628*a*) (e.g., a graphical user interface object) to configure a first account (e.g., corresponding to a first digital key of an electronic wallet for unlocking the lock) of the computer system to provide credentials (e.g., to unlock the electronic lock) via short-range communication (e.g., via NFC, WiFi, and/or UWB) without requiring authentication (e.g., without requiring the user to enter a password/passcode at the computer system, without requiring authentication via fingerprint and/or facial recognition when the electronic lock requests a credential from the computer system; and/or without requiring separate authentication (e.g., separate authentication beyond any authentication provided to unlock the computer system; after the computer system has been authenticated and while the computer system is in an unlocked state) specifically for providing credentials to the electronic lock).

During the configuration process (706) for configuring the electronic lock, in accordance with a determination that the electronic lock does not include the short-range communication feature (e.g., does not include NFC reader, does not include WiFi communication capabilities, and/or does not include a UWB communication capabilities) (and optionally in response to receiving the first configuration user input received during the configuration process), the computer system (e.g., 600) forgoes displaying (710), via the display generation component, of the option to configure the first account of the computer system to provide credentials without requiring authentication.

During the configuration process (706) for configuring the electronic lock, in accordance with a determination that the electronic lock includes a keypad feature (e.g., includes a numeric and/or alphanumeric keypad and/or is configurable to display a numeric and/or alphanumeric keypad) (and optionally in response to receiving a second configuration user input received during the configuration process), the computer system (e.g., 600) displays (712), via the display generation component, an option (e.g., 630, 630*c*) to configure a code (e.g., a numerical code, an alphabetical code, an alphanumerical code) of the first account of the computer system to be used for unlocking the electronic lock via the keypad feature of the electronic lock.

During the configuration process (706) for configuring the electronic lock, in accordance with a determination that the electronic lock does not include the keypad feature (e.g., does not include a numeric and/or alphanumeric keypad and/or is not configurable to display a numeric and/or alphanumeric keypad) (and optionally in response to receiving the second configuration user input received during the configuration process), the computer system (e.g., 600) forgoes displaying (714), via the display generation component, of the option to configure a code (e.g., a numerical code, an alphabetical code, an alphanumerical code) of the first account of the computer system to be used for unlocking the electronic lock.

In some embodiments, the electronic lock is a smart lock. In some embodiments, the electronic lock includes a bolt and/or cylinder connected to a motor using an actuator. In some embodiments, the electronic lock is configured to perform locking and unlocking operations (e.g., via activation of the actuator), such as on a door, based on receiving authorized commands. In some embodiments, communicating via short-range communication includes communicating using a short-range communication protocol.

Displaying various options based on hardware and/or functionality of an electronic lock provides the user with visual feedback about the computer system's ability to configure the electronic lock and enables the user to only configure features supported by the electronic lock, thereby reducing the number of required inputs.

In some embodiments, prior to receiving the request (e.g., 650*c*) to configure the electronic lock, detecting, via the one or more input devices, the electronic lock (e.g., as in FIG. 6C) (e.g., via detecting, via a camera of the computer system, a QR corresponding to the electronic lock and/or via detecting, via short-range (e.g., NFC and/or UWB) communication, the electronic lock). In response to detecting the electronic lock (e.g., 658), the computer system (e.g., 600) displays a user interface object (e.g., 618 and/or 618*c*) (e.g., an object corresponding to the detected QR code), wherein the request to configure the electronic lock is an input corresponding to (e.g., a tap input on) the user interface object (e.g., 618*c*). Displaying the user interface object in response to detecting the electronic lock provides the user with visual feedback that the electronic lock has been detected by the computer system.

In some embodiments, during the configuration process (706) for configuring the electronic lock: the computer system (e.g., 600) receives, via the one or more input devices, user input (e.g., 650*d*) (e.g., touch input) that selects a location (e.g., a room of a home, a portion (front area, back area) of a home) for the electronic lock; the computer system (e.g., 600) associates, based on the user input that selects the location, the electronic lock with the location; the computer system (e.g., 600) receives, via the one or more input devices, user input (e.g., 650*e*) that selects a name (e.g., front door lock, side door lock) for the electronic lock; and the computer system (e.g., 600) associates, based on the user input that selects the name, the electronic lock with the name. Associating the electronic lock with a location and a name enables the computer system to subsequently identify and represent that particular electronic lock using the location and name identifiers, thereby reducing the number of inputs the user must provide to find a particular electronic lock.

In some embodiments, during the configuration process (706) for configuring the electronic lock, the computer system (e.g., 600) displays (e.g., concurrently), via the display generation component, one or more lock automation options (e.g., 636*a*-636*c*), which, when enabled, cause the electronic lock to change to a predefined state (e.g., to lock, to unlock) when a lock condition (e.g., a first lock condition and/or a second lock condition) is met. Providing the user with lock automation options during the configuration process enables the computer system to automate procedures (e.g., locking of the electronic lock and/or transmitting instructions to the electronic lock), thereby performing the procedure when the condition is met and reducing the need for the user to provide user input to perform the procedure.

In some embodiments, a first lock automation option, when enabled (e.g., via user input), causes the electronic lock to become locked when a user of the computer system has been detected as leaving a location (e.g., a home) corresponding to the electronic lock. In some embodiments, a second lock automation option, when enabled (e.g., via user input), causes the electronic lock to become unlocked when a user of the computer system has been detected as arriving at (or near) the location (e.g., a home) corresponding to the electronic lock. In some embodiments, a third lock automation option, when enabled (e.g., via user input), causes the electronic lock to become locked when no users of a home automation system associated with the location (e.g., home) are detected as being at the location (e.g., when it is detected that a last user of the home automation system has departed the location and no other users of the home automation system remain at the location). In some embodiments, the one or more lock automation options includes a fourth lock automation option in accordance with a determination that the electronic lock includes a short-range communication feature for communicating via short-range wireless communication and does not include the fourth lock automation option in accordance with a determination that the electronic lock does not include a short-range communication feature for communicating via short-range wireless communication. In some embodiments, the one or more lock automation options include a fifth lock automation option in accordance with a determination that the electronic lock includes a keypad feature and does not include the fifth lock automation option in accordance with a determination that the electronic lock does not include a keypad feature.

In some embodiments, during the configuration process (706) for configuring the electronic lock, in accordance with a determination that a home automation system associated with the computer system (e.g., the computer system is a user and/or administrator of the home automation system) is configured for guest access (e.g., one or more guests have access to the home automation system, the home automation system includes one or more guest accounts), the computer system (e.g., 600) displays, via the display generation component, a user interface (e.g., 638) to enable guests of the home automation system to operate (e.g., change a state of, lock and/or unlock) the electronic lock, including: a first guest user interface object (e.g., 638a) that is selectable (e.g., via tap input) to enable a first guest of the home automation system to operate the electronic lock without enabling a second guest of the home automation system to operate the electronic lock, and a second guest user interface object (e.g., 638b) that is selectable (e.g., via tap input) to enable the second guest to operate the electronic lock without enabling the first guest to operate the electronic lock. In some embodiments, during the configuration process (706) for configuring the electronic lock, in accordance with a determination that the home automation system associated with the computer system (e.g., the computer system is a user and/or administrator of the home automation system) is not configured for guest access (e.g., one or more guests have access to the home automation system, the home automation system includes one or more guest accounts), the computer system (e.g., 600) forgoes displaying, via the display generation component, the user interface to enable guests of the home automation system to operate (e.g., change a state of, lock and/or unlock) the electronic lock. Displaying a list of guests of the home automation system enables the computer system to configure those users' access to the electronic lock, thereby reducing the inputs that would otherwise be required to access a guest configuration interface for this particular electronic lock.

In some embodiments, guests are not enabled to operate the electronic lock by default. In some embodiments, select of a respective guest causes an indication to be displayed (e.g., adjacent to a respective guest user interface objection) indicating that the respective guest has been selected to have access to operate the electronic lock. In some embodiments, the home automation system includes different levels of access, such as a highest level of access for an administrator, a lower level of access for a non-administrators (e.g., standard users), and the lowest level of access for guests (e.g., temporary visitors of the home, users with reduced permissions to configure aspects of the home automation system).

In some embodiments, the computer system (e.g., 600) configures the electronic lock (e.g., by transmitting configuration information to the electronic lock and/or to one or more devices and/or hubs of the home automation system; and/or configuring one or more functions or one or more settings of the electronic lock) based on user inputs received during the configuration process for configuring the electronic lock. In some embodiments, the computer system configures the electronic lock by wirelessly transmitting (e.g., via NFC, via UWB, via WiFi) configuration information to the electronic lock. The configuration information optionally includes information (e.g., account identifiers of users and/or guests and/or pin codes for unlocking the electronic lock). In some embodiments, configuring the electronic lock includes transmitting the code to be used for unlocking the electronic lock to the electronic lock, such that the electronic lock can compare a code received at the keypad to the code for unlocking.

In some embodiments, subsequent to configuring the electronic lock, the computer system (e.g., 600) detects, via one or more input devices, user input (e.g., 650q) (e.g., touch input on a touch sensitive surface of the computer system) corresponding to a request to transmit, to the electronic lock, credentials of the first account to unlock the electronic lock and in response to detecting the request (e.g., 650q) to transmit credentials of the first account to unlock the electronic lock, the computer system (e.g., 600) transmits, to the electronic lock via short-range communication (e.g., via NFC, WiFi, and/or UWB), credentials of the first account.

In some embodiments, subsequent to configuring the electronic lock, the computer system (e.g., 600) receives (e.g., from a device of the home automation system, from the lock itself), via the one or more input devices (e.g., via NFC, via UWB, via WiFi), an indication that the electronic lock has been unlocked using a code associated with a particular account (e.g., associated with the first account, associated with a second account different from the first account) and in response to receiving the indication that the electronic lock has been unlocked using the code associated with the particular account, the computer system (e.g., 600) displays, via the display generation component, a notification (e.g., 664) indicating that the electronic lock has been unlocked using the code associated with the particular account (e.g., a notification stating "The front door was unlocked using David's code."). Displaying a notification indicating that the electronic lock has been unlocked using a code associated with a particular account provides the user with improved visual feedback about the state of the home automation system (a particular user's account was used to unlock an electronic lock) and the state of the computer system (has detected that a particular user's account was used to unlock an electronic lock).

In some embodiments, subsequent to configuring the electronic lock, the computer system (e.g., 600) detects, via the one or more input devices (e.g., via NFC, via UWB), a wireless field of the electronic lock and in response to detecting the wireless field of the electronic lock, the computer system (e.g., 600) transmits (e.g., as in FIGS. 6S-6T), to the electronic lock via short-range communication (e.g., via NFC, WiFi, and/or UWB), credentials of the first account (e.g., without requiring authentication after detecting the wireless field of the electronic lock). In some embodiments, transmitting the credentials of the first account causes the electronic lock to unlock. In some embodiments, the first account can be configured on various computer systems (e.g., a smartphone, a smartwatch) associated with the same user, such that the various computer systems can use the first account to provide credentials to unlock the electronic lock. Transmitting credentials of the first account to the electronic lock in response to detecting a wireless field of the electronic lock reduces the number of user inputs required to cause an unlock of the device (e.g., by not requiring the user to navigate to a particular user interface, not requiring the user to select a particular user interface object, and/or not requiring the user to enter a passcode/password.)

In some embodiments, while displaying, via the display generation component, the option (e.g., 628a, 654) (e.g., a graphical user interface object) to configure the first account of the computer system to provide credentials (e.g., to unlock the electronic lock) via short-range communication (e.g., via NFC, WiFi, and/or UWB) without requiring authentication, the computer system (e.g., 600) receives, via the one or more input devices, one or more configuration user inputs (e.g., 650g, 650u) selecting the option to configure the first account of the computer system to provide credentials via short-range communication without requiring authentication. Subsequent to (e.g., in response to) receiving the one or more configuration user inputs (e.g., 650g, 650u), the computer system (e.g., 600) receives, via the one or more input devices (e.g., a camera and/or a depth sensor) biometric information (e.g., information about a face detected using the one or more input devices, as indicated in FIG. 6R). In accordance with a determination that the biometric information matches enrolled biometric information (e.g., facial recognition is successful and the computer system determines that the biometric information received is from an authorized user), the computer system (e.g., 600) configures the first account of the computer system to provide credentials (e.g., to the electronic lock) via short-range communication without requiring authentication (e.g., without requiring the authentication between when the electronic lock requests the credentials and when the credentials are provided, even if the computer system is in a locked state). In accordance with a determination that the biometric information does not match enrolled biometric information (e.g., facial recognition is not successful and the computer system determines that the biometric information received is not from an authorized user), the computer system (e.g., 600) forgoes configuring the first account of the computer system to provide credentials (e.g., to the electronic lock) via short-range communication without requiring authentication. Using confirming that biometric information matches enrolled biometric information before configuring the first account to provide credentials without requiring authentication makes the computer system more secure by preventing an unauthorized user from enabling a feature that unlocks the electronic lock without requiring authentication.

In some embodiments, configuring the electronic lock includes configuring the electronic lock for use as part of a home automation system (e.g., the electronic lock is part of the home automation system). In some embodiments, subsequent to configuring the electronic lock (e.g., in response to completing configuring the electronic lock), the computer system (e.g., 600) initiates a process to cause notifications to be transmitted to one or more other computer systems (e.g., 666) (other than the computer system) of users of the home automation system (e.g., transmitting the notifications to the one or more other computer systems and/or providing information to a second computer system to transmit the notifications to the one or more other computer system) indicating (e.g., 668) that an account of the one or more other computer systems (e.g., 666) can be configured to provide credentials to the electronic lock via short-range communication without requiring authentication. Causing notifications to be transmitting to computer systems of the home automation system provides those users with information about the state of the home automation system (that a new lock is operational) and enables those users to configured and/or operate (e.g., unlock) the electronic lock using their computer system.

In some embodiments, the computer system (e.g., 600) configuring the electronic lock includes automatically adding the first account (e.g., an electronic key) to an electronic wallet (e.g., as illustrated in FIG. 6P) of the computer system, wherein the electronic wallet includes one or more additional accounts (e.g., loyalty accounts, transit accounts and/or payment accounts associated with respective credentials). Automatically adding the first account (e.g., an electronic key) to an electronic wallet of the computer system enables the user of the computer system to subsequently access/use the first account.

In some embodiments, adding the first account (e.g., an electronic key) to the electronic wallet of the computer system includes associating the first account with a visual representation (e.g., 648a) (e.g., a card in the electronic wallet and/or representing a key), wherein a color (e.g., artwork, background) of the visual representation (e.g., 648a) is selected based on a color of the electronic lock (e.g., 658) (e.g., the color of the hardware, the color of the handle, and/or the color of the mortise cylinder). In some embodiments, in accordance with a determination that the electronic lock is a first color, a color (e.g., a background color) of a visual representation of the first account is a second color (e.g., same as the first color and/or different from the third color) and in accordance with a determination that the electronic lock is a third color, the color (e.g., a background color) of the visual representation of the first account is a fourth color (e.g., same as the third color and/or different from the fourth color). Providing the user with display of a visual representation with a color that is based on the color of the electronic lock provides the user with visual feedback that the first account corresponds to that particular electronic lock.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, the electronic lock of method 700 is the same as the first or second electronic lock of method 900. For another example, the computer system of method 700 is the same as the computer system of method 900. For another example, the first account of method 700 is the same as the first account of method 900. For brevity, these details are not repeated below.

FIGS. 8A-8S illustrate exemplary user interfaces for managing access for one or more lock accessories, in accordance with some embodiments. The user interfaces in these figures are used to illustrate the processes described below, including the processes in FIG. 9.

FIG. 8A illustrates electronic device 600 displaying, via display 602, first user interface 604. At FIG. 8A, electronic device 600 detects user input 850*a* (e.g., a tap gesture) corresponding to selection of home user interface object 604*a*. In response to detecting user input 850*a*, electronic device 600 displays home options user interface 802. Home options user interface 802 includes rooms region 802*a*, home settings user interface object 802*b*, room settings user interface object 802*c*, and edit user interface object 802*d*. In some embodiments, in response to detecting user input corresponding to rooms region 802*a*, electronic device 600 displays a room user interface corresponding to one or more accessory devices designated as being positioned within a respective room of the home automation system. In some embodiments, in response to detecting user input corresponding to room settings user interface object 802*c*, electronic device 600 displays a room settings user interface that enables electronic device 600 to create a room, remove a room, designate one or more accessory devices to a room, and/or remove a designation of one or more accessory devices from a room. In some embodiments, in response to detecting user input corresponding to edit user interface object 802*d*, electronic device 600 displays an editing user interface for adjusting and/or changing an appearance and/or layout of first user interface 604.

At FIG. 8A, electronic device 600 detects user input 850*b* (e.g., a tap gesture) corresponding to selection of home settings user interface object 802*b*. In response to detecting user input 850*b*, electronic device 600 displays home settings user interface 804, as shown at FIG. 8B.

Figure 8B:
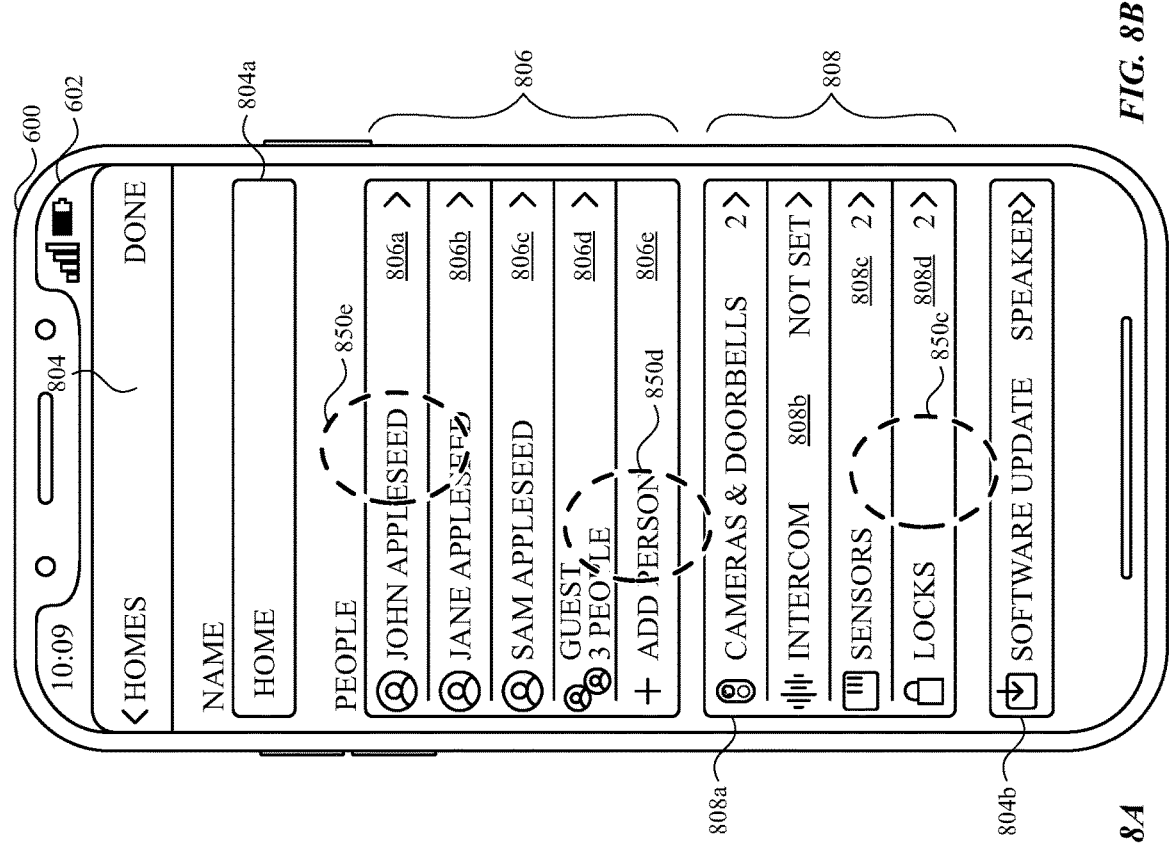
FIGS. 8A-8S illustrate exemplary user interfaces for managing access for one or more lock accessories, in accordance with some embodiments.
Figure 8A:
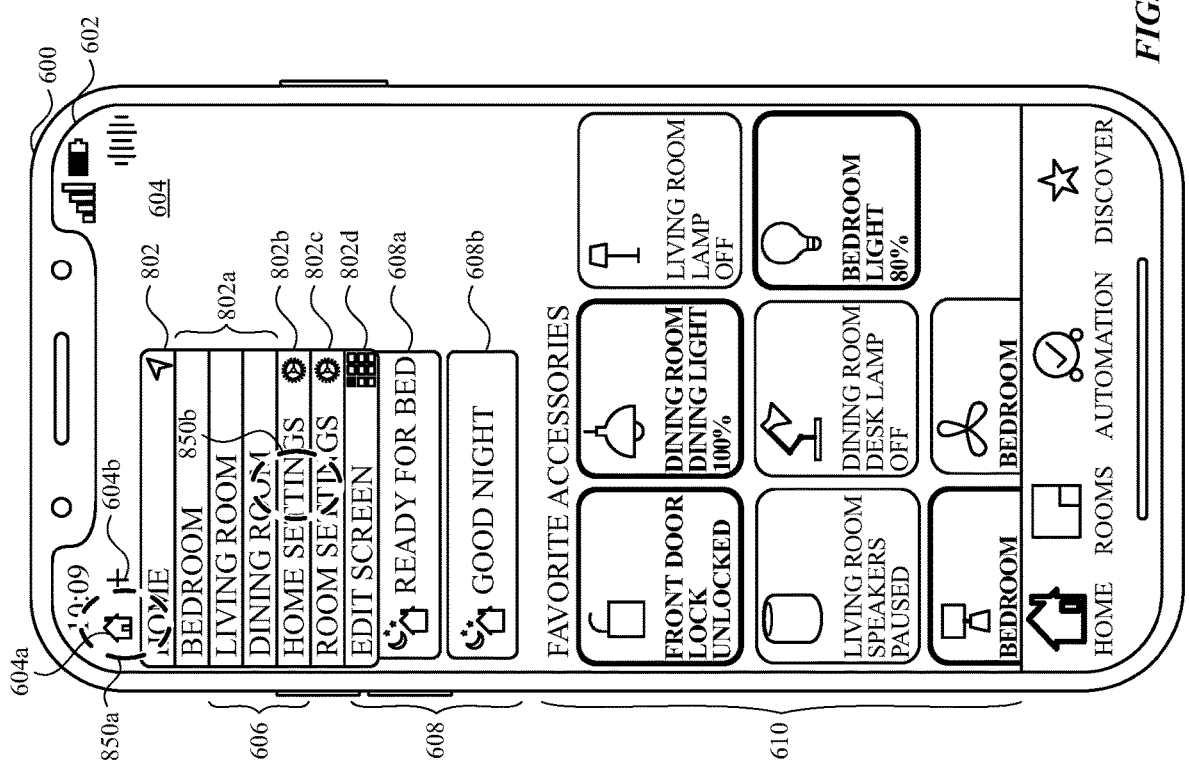
Figure 8D:
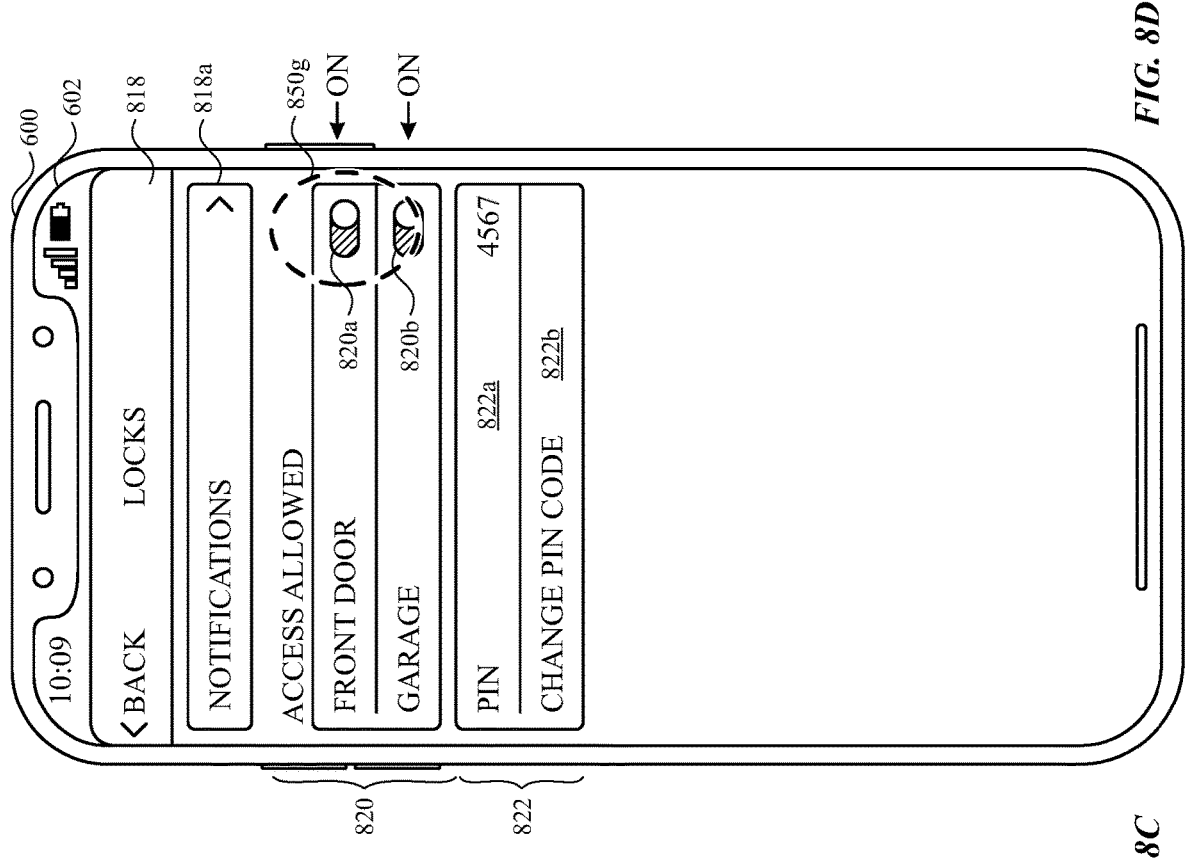

At FIG. 8B, home settings user interface 804 includes home indicator 804*a* (e.g., 'Home') corresponding to an identifier and/or name of the home associated with the home automation system, user region 806, settings region 808, and software update user interface object 804*b*. In some embodiments, in response to detecting user input selecting software update user interface object 804*b*, electronic device 600 is configured to cause one or more accessory devices (e.g., 'Speaker') of the home automation system to update a software program of the one or more accessory devices.

At FIG. 8B, settings region 808 includes cameras and doorbells user interface object 808*a* corresponding to settings of one or more camera accessory devices and/or doorbell accessory devices of the home automation system, intercom user interface object 808*b* corresponding to intercom settings of the home automation system, sensors user interface object 808*c* corresponding to settings of one or more sensor accessory devices of the home automation system, and locks user interface object 808*d* corresponding to settings of one or more lock accessory devices of the home automation system. As set forth below with reference to FIGS. 8M-8P, electronic device 600 displays lock settings user interface 848 in response to detecting user input 850*c* (e.g., a tap gesture) correspond to selection of locks user interface object 808*d*.

User region 806 of home settings user interface 804 corresponds to users that have access and/or authorization to one or more accessory devices of the home automation system. At FIG. 8B, user region 806 includes resident user interface objects 806*a*-806*c*, guest user interface object 806*d*, and add user interface object 806*e*. Resident user interface objects 806*a*-806*c* correspond to respective users that have been designated as residents of the home associated with the home automation system (e.g., individuals that reside and/or live at the home). In some embodiments, users that are designated as residents of the home have access and/or authorization to all accessory devices of the home automation system. In some embodiments, users that are designated as residents of the home have access and/or authorization to a set of accessory devices for which users designated as guests do not have access and/or authorization.

At FIG. 8B, guest user interface object 806*d* corresponds to users designated as guests of the home associated with the home automation system (e.g., individuals that do not reside and/or live at the home). Guest user interface object 806*d* indicates that the home includes three users (e.g., '3 People') that have been designated as guests of the home. Therefore, at FIG. 8B, electronic device 600 groups users designated as guests together and displays guest user interface object 806*d* corresponding to the group of users designated as guests. In some embodiments, in response to detecting user input selecting guest user interface object 806*d*, electronic device 600 displays respective guest user interface objects corresponding to each guest of the home. In some embodiments, electronic device 600 displays respective user interface objects for users designated as guests on home settings user interface 804. In some embodiments, users designated as guests have limited access and/or authorization to one or more particular accessory devices of the home automation system. In other words, because users designated as guests do not reside at the home, users designated as guests do not have access and/or authorization to some types of accessory devices, such as lights, speakers and/or televisions.

As set forth below, electronic device 600 is configured to initiate a process for adding a new user (e.g., a resident and/or a guest) in response to detecting user input corresponding to add user interface object 806*e*. At FIG. 8B, electronic device 600 detects user input 850*d* (e.g., a tap gesture) corresponding to selection of add user interface object 806*e*. In response to detecting user input 850*d*, electronic device 600 displays add user interface 838, as shown at FIG. 8J.

Alternatively, at FIG. 8B, electronic device 600 detects user input 850*e* (e.g., a tap gesture) corresponding to selection of first resident user interface object 806*a* (e.g., 'John Appleseed'). In response to detecting user input 850*e*, electronic device 600 displays user settings user interface 810, as shown at FIG. 8C.

Figure 8C:
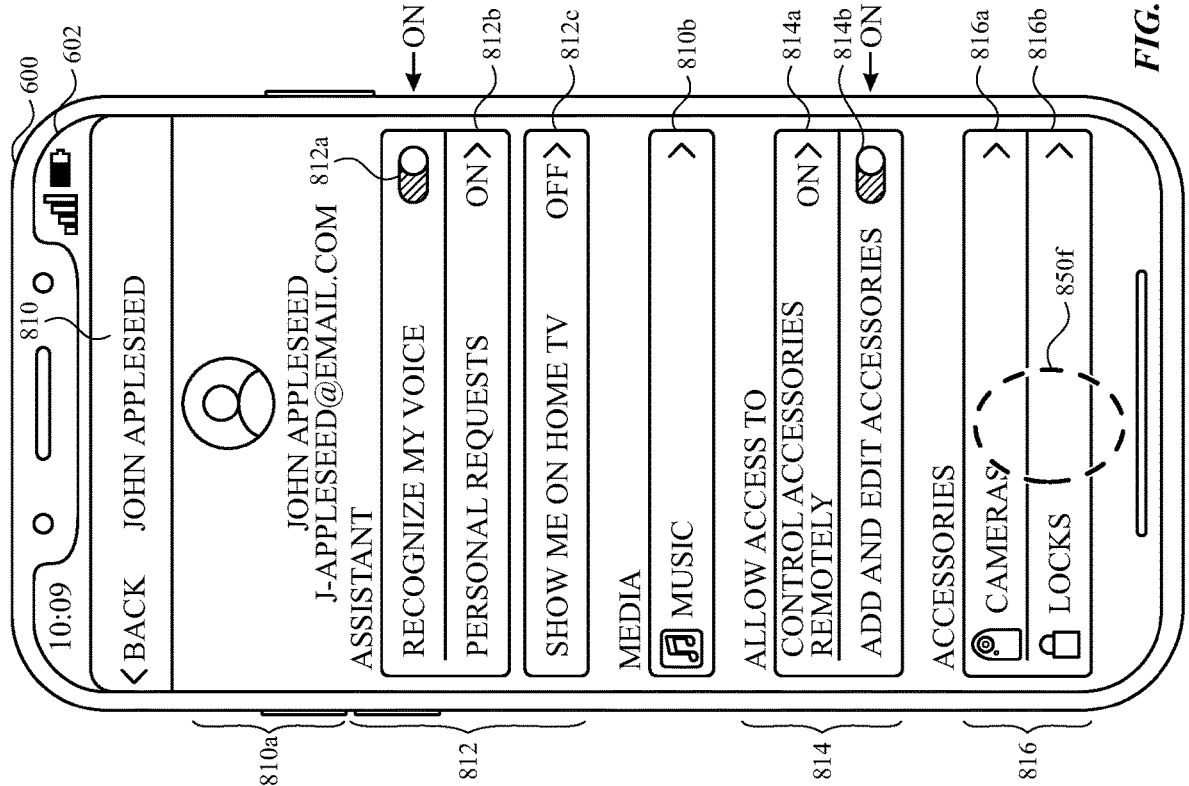
Figure 8F:
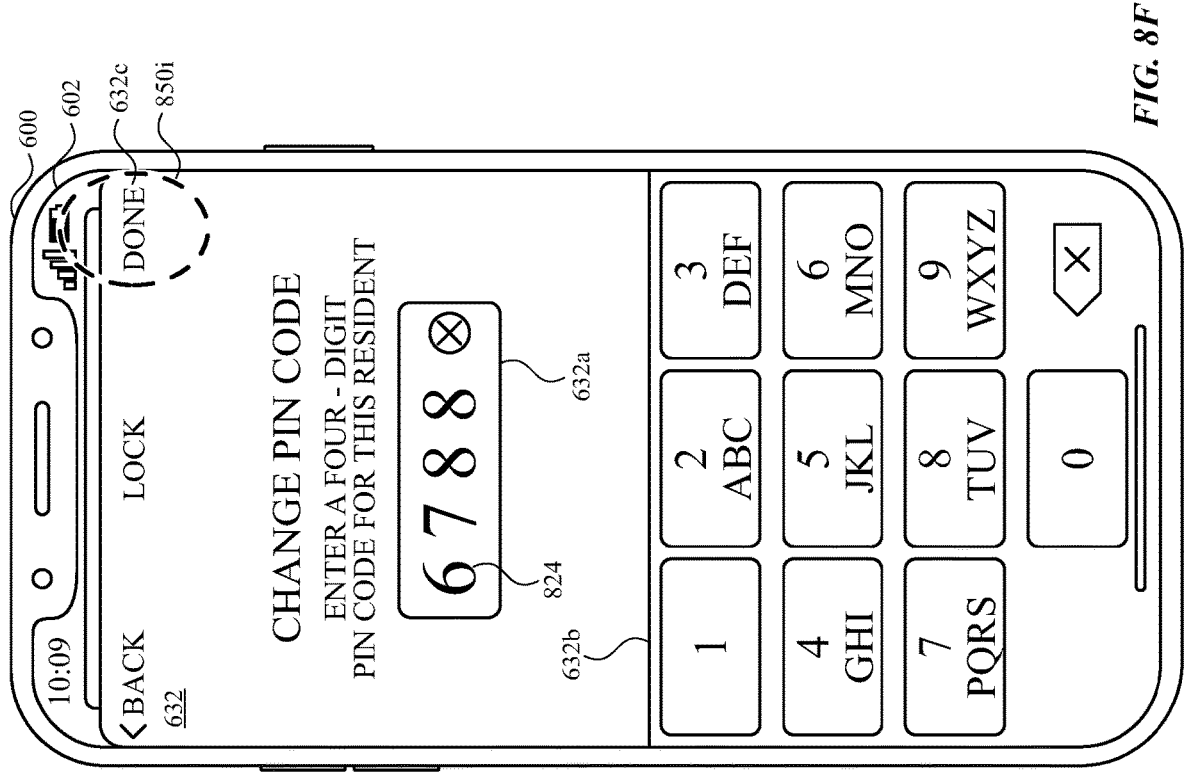

At FIG. 8C, user settings user interface 810 includes user information region 810*a* including a name, an identifier, and/or contact information associated with the resident user corresponding to first resident user interface object 806*a* (e.g., 'John Appleseed'). User settings user interface 810 also includes settings region 812, media user interface object 810*b*, access region 814, and accessories region 816.

At FIG. 8C, settings region 812 includes assistant user interface object 812*a* for enabling and/or disabling an electronic assistant for the resident user (e.g., an electronic assistant that responds to voice commands of the resident user (e.g., based on voice recognition of the resident user) received via a microphone of an external device (e.g., a smart speaker)), requests user interface object 812*b* for enabling and/or disabling assistant requests that are customized to the resident user (e.g., the electronic assistant responding to voice commands with a customized name of the resident user associated with first resident user interface object 806a), and television user interface object 812c for displaying a user interface object corresponding to the resident user on a television of the home automation system.

In some embodiments, in response to detecting user input selecting music interface object 810b, electronic device 600 enables the user of electronic device 600 to select a music application and/or a playlist that is available for playback by the resident user (e.g., via an external device different from electronic device 600) on one or more speakers of the home automation system.

Access region 814 includes remote access user interface object 814a corresponding to whether an external device of the resident user (e.g., an electronic device different from electronic device 600) is enabled to cause one or more accessory devices of the home automation to transition between modes. At FIG. 8C, access region 814 includes edit accessories user interface object 814b corresponding to whether the external device of the resident user is enabled to add new accessory devices, remove accessory devices, and/or adjust one or more settings of accessory devices of the home automation system.

At FIG. 8C, accessories region 816 includes cameras user interface object 816a corresponding to one or more camera accessory devices of the home automation system and locks user interface object 816b corresponding to one or more lock accessory devices of the home automation system. In some embodiments, in response to detecting user input selecting cameras user interface object 816a, electronic device 600 displays a camera settings user interface, which corresponds to enabling and/or disabling access and/or authorization for the resident user with respect to the one or more camera accessory devices of the home (e.g., whether the resident user has access to view images captured via the one or more camera accessory devices of the home).

At FIG. 8C, electronic device 600 detects user input 850f (e.g., a tap gesture) corresponding to selection of locks user interface object 816b. In response to detecting user input 850f, electronic device 600 displays lock settings user interface 818, as shown at FIG. 8D.

At FIG. 8D, lock settings user interface 818 corresponds to access and/or settings for one or more lock accessory devices of the home automation system, where the access and/or settings are specific to the resident user associated with first resident user interface object 806a (e.g., 'John Appleseed'). In other words, in response to detecting user input on one or more user interface objects of lock settings user interface 818, electronic device 600 is configured to adjust access and/or settings for the one or more lock accessories of the home automation system for the resident user associated with first resident user interface object 806a, but electronic device 600 does not adjust access and/or settings for the one or more lock accessories of the home automation system for other users (e.g., users associated with resident user interface objects 806b-806c and/or users associated with guest user interface object 806d).

Lock settings user interface 818 includes notifications user interface object 818a, access region 820, and pin region 822. In some embodiments, in response to detecting user input selecting notifications user interface object 818a, electronic device 600 is configured to manage whether electronic device 600 displays notifications associated with the resident user (e.g., 'John Appleseed') causing one or more lock accessory devices of the home automation system to transition between modes (e.g., between the locked mode and the unlocked mode).

Access region 820 of lock settings user interface 818 includes first lock user interface object 820a corresponding to a front door lock of the home automation system and second lock user interface object 820b corresponding to a garage door lock of the home automation system. At FIG. 8D, first lock user interface object 820a and second lock user interface object 820b are both in an active and/or on position indicating that the resident user associated with first resident user interface object 806a has access to both the front door lock and the garage door lock. As such, in some embodiments, the resident user associated with first resident user interface object 806a is able to cause both the front door lock and the garage door lock to transition between modes via an external device and/or via a pin associated with the resident user.

At FIG. 8D, electronic device 600 detects user input 850g (e.g., a tap gesture) corresponding to selection of first lock user interface object 820a. In response to detecting user input 850g, electronic device 600 initiates a process (e.g., communicates with the front door lock and/or a server) to revoke the resident user's access to the front door lock.

Figure 8E:
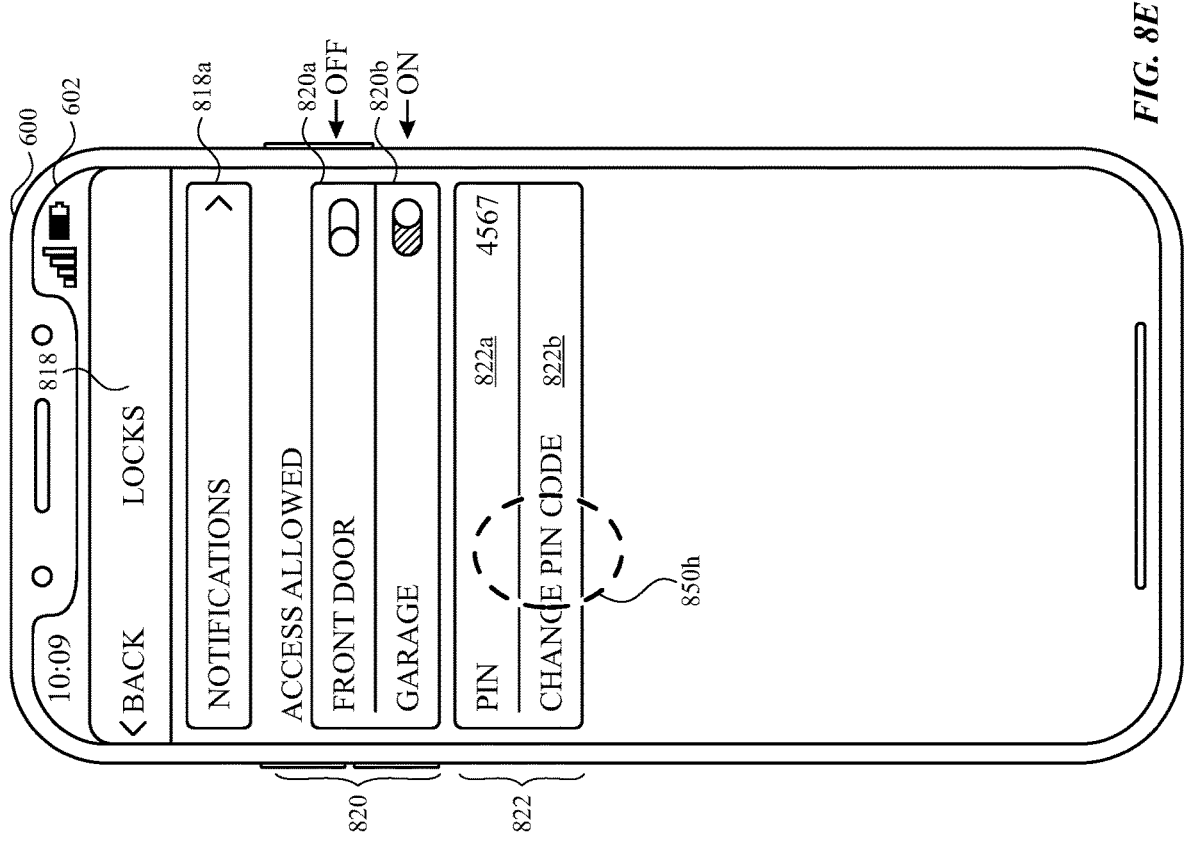
Figure 8J:
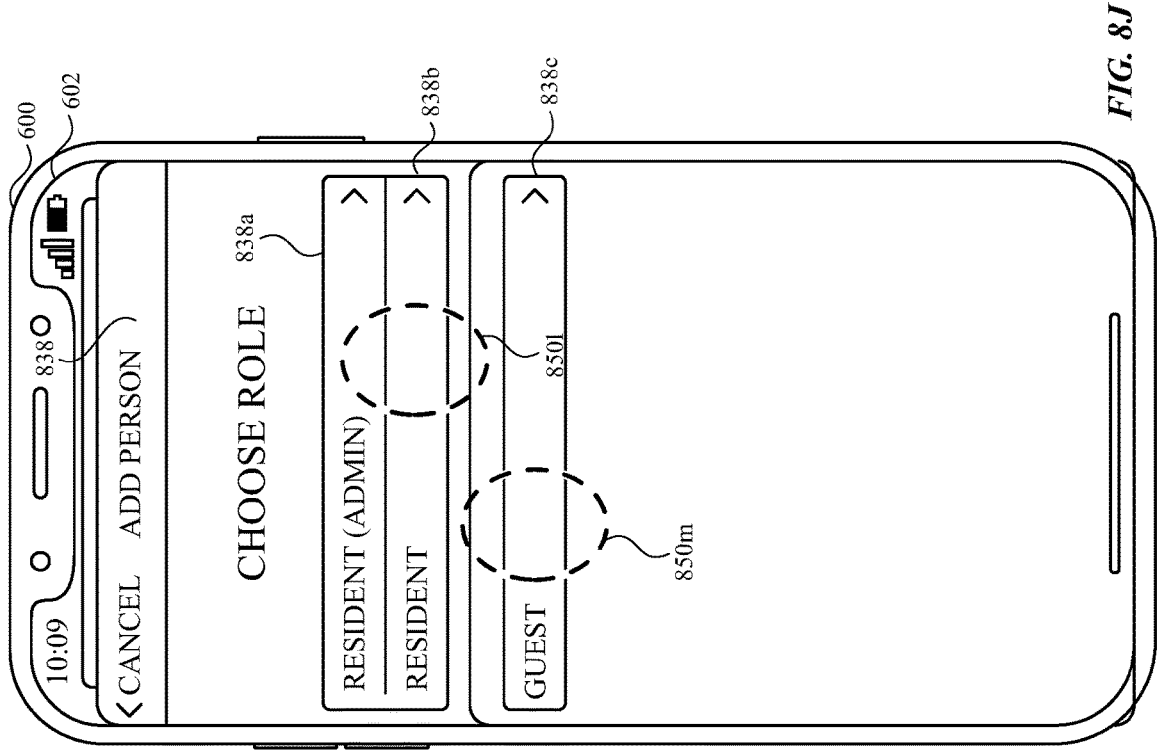

At FIG. 8E, electronic device 600 displays first lock user interface object 820a in a disabled and/or off position indicating that the resident user associated with first resident user interface object 806a no longer has access to the front door lock. In other words, the resident user associated with first resident user interface object 806a cannot use an external device and/or a pin associated with the resident user to cause the front door lock to transition between modes (e.g., to unlock).

At FIG. 8E, pin region 822 of lock settings user interface 818 includes pin user interface object 822a corresponding to a pin that the resident user can enter into a keypad of the garage door lock to cause the garage door lock to transition between modes (and, optionally, the front door lock when first lock user interface object 820a is in the enabled and/or on mode). Pin region 822 also includes change pin user interface object 822b, which enables electronic device 600 to change the pin (e.g., the pin displayed on pin user interface object 822a) that the resident user can enter into the keypad of the garage door lock to cause the garage door lock to transition between modes.

For instance, at FIG. 8E, electronic device 600 detects user input 850h (e.g., a tap gesture) corresponding to selection of change pin user interface object 822b. In response to detecting user input 850h, electronic device 600 displays change pin user interface 632, as shown at FIG. 8F.

At FIG. 8F, change pin user interface 632 includes pin indicator 632a, keyboard 632b, and done user interface object 632c. At FIG. 8F, computer system 600 has detected one or more user inputs corresponding to keyboard 632b and displays pin 824 (e.g., '6788') in pin indicator 632a. As such, change pin user interface 632 allows a user to input a unique pin that electronic device 600 associates with the resident user (e.g., 'John Appleseed') and enables for use with the garage door lock (e.g., electronic device 600 communicates with the garage door lock over a wireless communication to cause the garage door lock to accept the pin as authorization for transitioning the garage door lock between modes). At FIG. 8F, electronic device 600 detects user input 850i (e.g., a tap gesture) corresponding to selection of done user interface object 632c. In response to detecting user input 850i, electronic device 600 displays (e.g., re-displays) lock settings user interface 818, as shown at FIG. 8G.

At FIG. 8G, electronic device 600 displays pin 824 in pin user interface object 822a indicating that the pin associated with the resident user (e.g., 'John Appleseed') has been changed (e.g., from '4567' to '6788'). In some instances, the user of electronic device 600 is not within a proximity to the resident user to provide the new pin to the resident user (e.g., orally and/or via a physical note). As such, electronic device 600 is configured to share the new pin with the resident user via an external device of the resident user. In some embodiments, the external device of the resident user displays a notification corresponding to the new pin after the pin has been changed via electronic device 600 (e.g., regardless of whether electronic device 600 shares the new pin with the resident user or not).

At FIG. 8G, electronic device 600 detects user input 850*j* (e.g., a tap gesture and/or a long press gesture) corresponding to selection of pin user interface object 822*a*. In response to detecting user input 850*j*, electronic device 600 displays share user interface 826, as shown at FIG. 8H.

At FIG. 8H, share user interface 826 includes user selection region 830, sharing options region 832, and copy user interface object 826*a*. User selection region 830 includes contact user interface objects 830*a*-830*d* corresponding to respective contact information (e.g., phone numbers, email addresses, and/or usernames) for users stored by and/or otherwise accessible to electronic device 600. In some embodiments, in response to detecting user input corresponding to one of contact user interface objects 830*a*-830*d*, electronic device 600 selects the respective contact information for sharing the pin with a respective user. In some embodiments, electronic device 600 includes contact information for the resident user and selects the contact information for the resident user for sharing the pin with the resident user in response to detecting user input 850*j* (e.g., and without detecting user input corresponding to one of contact user interface objects 830*a*-830*d*).

Sharing options region 832 includes sharing option user interface objects 832*a*-832*d* corresponding to different communication protocols for sharing the pin with the resident user. First sharing option user interface object 832*a* corresponds to a short-range communication technique (e.g., Bluetooth, Wi-Fi, and/or Zigbee) for sharing the pin with the resident user (e.g., an external device associated with the resident user). Second sharing option user interface object 832*b* corresponds to a first messaging application that enables electronic device 600 to share the pin with the resident user via an electronic message (e.g., a short message service message). Third sharing option user interface object 832*c* corresponds to an email application that enables electronic message to share the pin with the resident user via an email. Fourth sharing option user interface object 832*d* corresponds to a second messaging application that enables electronic device 600 to share the pin with the resident user via an electronic message (e.g., a short message service message and/or an instant message).

At FIG. 8H, in response to detecting user input selecting copy user interface object 826*a*, electronic device 600 copies (e.g., stores data associated with) the pin, such that electronic device 600 can later reproduce (e.g., paste) the pin in response to one or more additional user inputs. In some embodiments, electronic device 600 copies the pin in response to detecting user input 850*j*. In some such embodiments, electronic device 600 forgoes displaying copy user interface object 826*a* on sharing user interface 826.

At FIG. 8H, electronic device 600 detects user input 850*k* (e.g., a tap gesture) corresponding to selection of second sharing option user interface object 832*b*. In response to detecting user input 850*k*, electronic device 600 displays a messaging user interface corresponding to the first messaging application associated with second sharing option user interface object 832*b*. The messaging user interface enables a user of electronic device 600 to send the pin (and, optionally, a custom message with the pin) to the resident user via an electronic message.

Figure 8I:
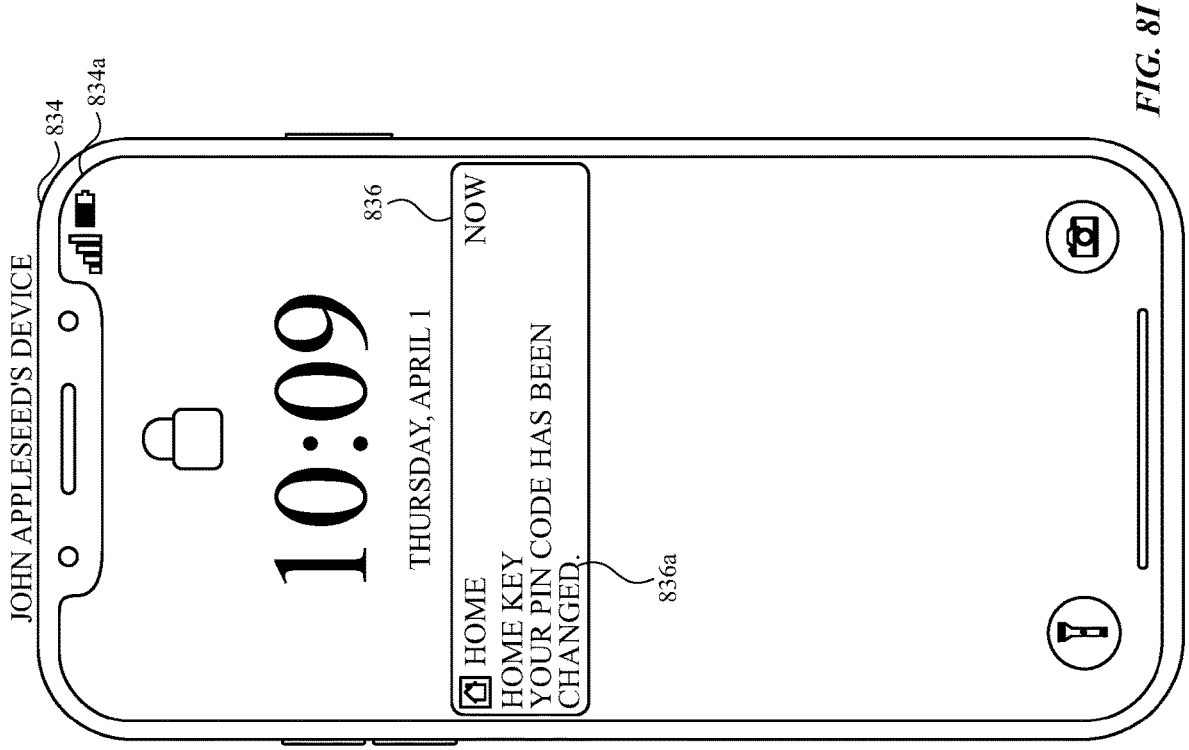

FIG. 8I illustrates electronic device 834 associated with the resident user (e.g., 'John Appleseed') displaying, via display 834*a*, notification 836. Notification 836 includes indicator 836*a*, which provides an indication to the resident user that the pin associated with the resident user has been changed (e.g., by the user of electronic device 600). In some embodiments, electronic device 834 displays notification 836 in response to receiving an indication (e.g., from electronic device 600 and/or from another external device, such as a server) that the pin has been changed regardless of whether electronic device 600 shares the pin with the resident user via sharing user interface 826. In some such embodiments, electronic device 834 displays the new pin (e.g., '6788') in response to detecting user input selecting notification 836, such that the resident user can view the new pin and use the new pin to cause the garage door lock to transition between modes.

As set forth above, in response to detecting user input 850*d* corresponding to selection of add user interface object 806*e* of home settings user interface 804, electronic device 600 displays add user interface 838, as shown at FIG. 8J.

At FIG. 8J, add user interface 838 corresponds to adding a new user to the home automation system, where the user can be granted various levels of access to the accessories of the home automation system via electronic device 600. Add user interface 838 includes administrator user interface object 838*a*, resident user interface object 838*b*, and guest user interface object 838*c*. In some embodiments, a new user designated as an administrator via user input corresponding to administrator user interface object 838*a* is more access as compared to new users designated as a resident (e.g., via user input corresponding to selection of resident user interface object 838*b*) and/or a guest (e.g., via user input corresponding to selection of guest user interface object 838*c*). In some embodiments, a new user designated as a resident via user input corresponding to resident user interface object 838*b* is granted more access than a new user designated as a guest (e.g., via user input corresponding to selection of guest user interface object 838*c*).

Figure 8L:
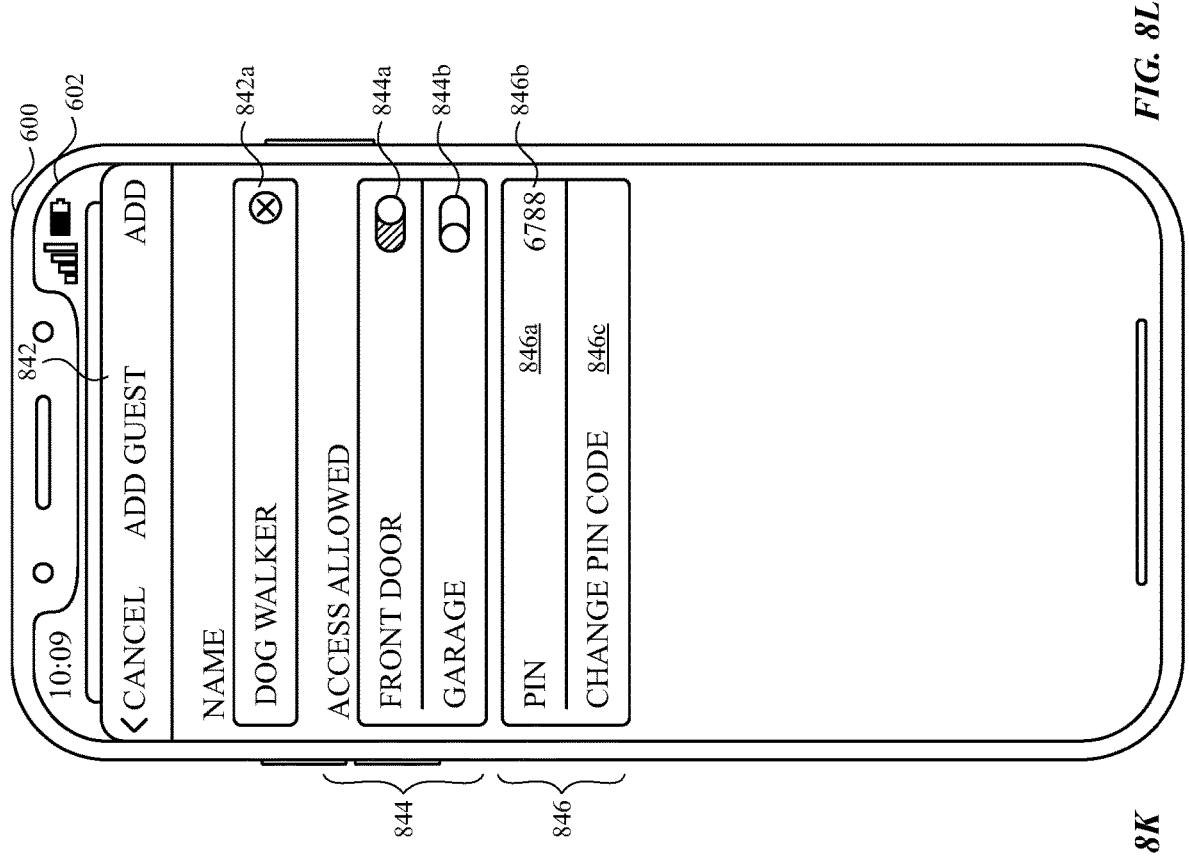
Figure 8K:
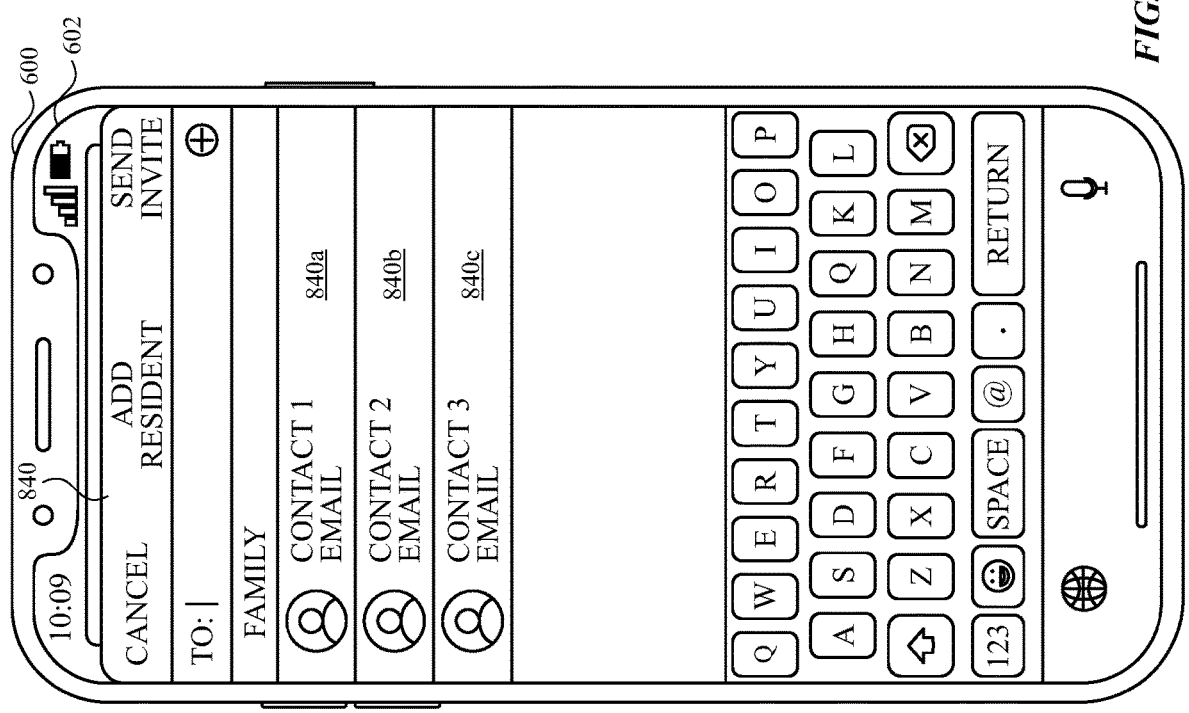
Figure 8N:
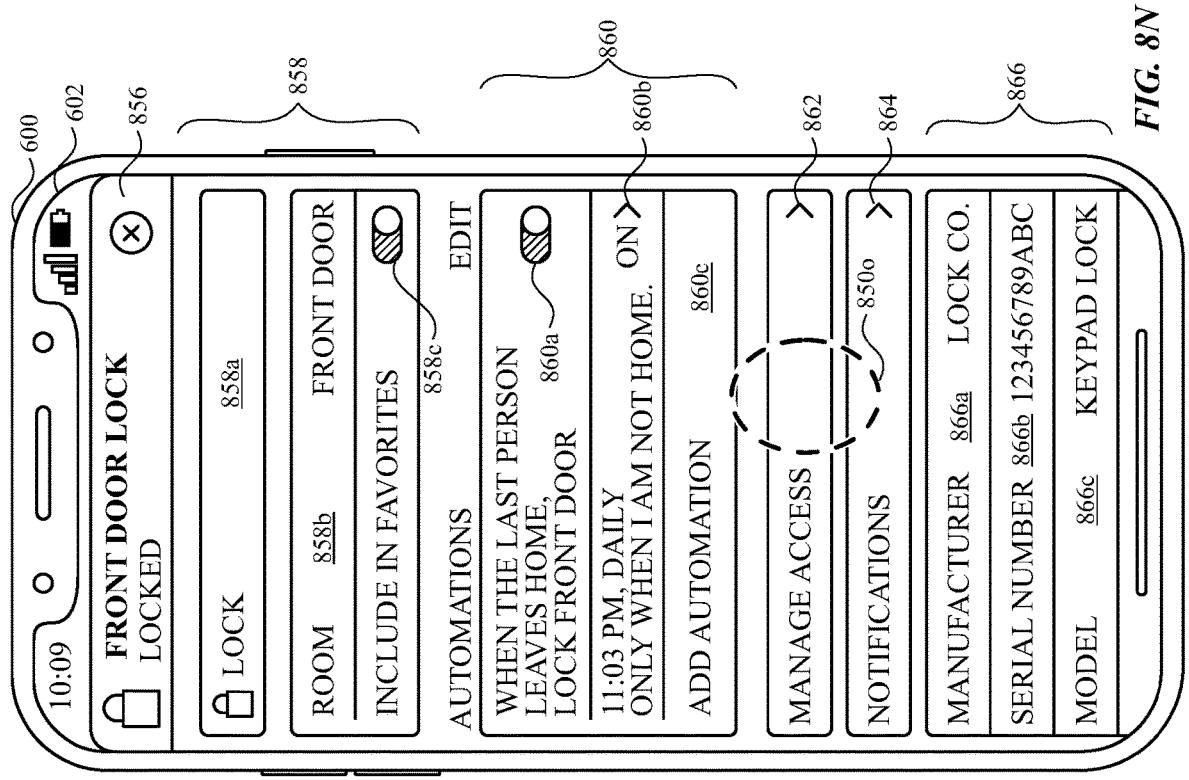

At FIG. 8J, electronic device 600 detects user input 850*l* (e.g., a tap gesture) corresponding to selection of resident user interface object 838*b*. In response to detecting user input 850*l*, electronic device 600 displays add resident user interface 840, as shown at FIG. 8K. Alternatively, at FIG. 8J, electronic device 600 detects user input 850*m* (e.g., a tap gesture) corresponding to selection of guest user interface object 838*c*. In response to detecting user input 850*m*, electronic device 600 displays add guest user interface 842, as shown at FIG. 8L. In some embodiments, in response to detecting user input selecting administrator user interface object 838*a*, electronic device 600 displays add resident user interface 840 and/or a similar user interface to add resident user interface 840.

At FIG. 8K, add resident user interface 840 includes contact user interface objects 840*a*-840*c* corresponding to users designated as family members of a user associated with electronic device 600 (e.g., designated as family members via an account of electronic device 600). In some embodiments, electronic device 600 suggests adding users that are designated as family members because family members are likely to reside in the same home as the user of electronic device 600. In some embodiments, in response to detecting user input selecting one of contact user interface objects 840*a*-840*c*, electronic device 600 displays a second add resident user interface that resembles add guest user interface 842, as shown at FIG. 8L (e.g., the second add resident user interface displays the name of the user corresponding to the selected contact user interface object 840*a*-840*c* and, optionally, indicates the user has access to all lock accessories of the home automation system).

At FIG. 8L, add guest user interface 842 includes name user interface object 842*a*, access region 844, and pin region 846. In some embodiments, in response to detecting user input selecting name user interface object 842*a*, electronic device 600 displays a keyboard (e.g., a virtual keyboard) that enables a user to input (e.g., type) a name associated with the new user. In some embodiments, when electronic device 600 detects user input selecting resident user interface object 838*b* and displays the second add resident user interface, electronic device 600 displays a name in name user interface object 842*a* that corresponds to a selected contact user interface object 840*a*-840*c* (e.g., without detecting user input on the keyboard).

Similar to lock settings user interface 818, access region 844 includes first lock user interface object 844*a* corresponding to the front door lock of the home automation system and second lock user interface object 844*b* corresponding to the garage door lock of the home automation system. At FIG. 8L, first lock user interface object 844*a* is in an enabled and/or on position indicating that the new user currently has and/or will have access to the front door lock of the home automation system. In contrast, second lock user interface object 844*b* is in the disabled and/or off position indicating that the new user currently does not and/or will not have access to the garage door lock of the home automation system. In some embodiments, electronic device 600 is configured to transition first lock user interface object 844*a* and/or second lock user interface object 844*b* between the enabled and disabled positions in response to detecting user input selecting first lock user interface object 844*a* and/or second lock user interface object 844*b*. As such, a user can select particular lock accessories for which to grant the new user access.

Pin region 846 includes pin user interface object 846*a* including pin 846*b* and change pin user interface object 846*c*. As set forth above with reference to FIGS. 8E-8H, in some embodiments, electronic device 600 is configured to share pin 846*b* with the new user and/or change pin 846*b* in response to detecting user input selecting pin user interface object 846*a* and/or change pin user interface object 846*c*, respectively. In some embodiments, when both first lock user interface object 844*a* and second lock user interface object 844*b* are in the enabled and/or on position, the guest user (e.g., 'Dog Walker') can use pin 846*b* to unlock both the front door lock and the garage door lock. At FIG. 8L, the guest user can use pin 846*b* to unlock the front door lock but not the garage door lock because second lock user interface object 844*b* is in the disabled and/or off position.

In some embodiments, pin region 846 includes a scheduling user interface object that, when selected via user input, enables the user of electronic device 600 to set particular times (e.g., time of day, days of the week, days of the month, and/or months of the year) for which pin 846*b* is authorized to cause front door lock (and/or the garage door lock) to transition between modes. In some such embodiments, electronic device 600 communicates with the front door lock, so that the front door lock is configured to accept pin 846*b* at the particular times, but to not accept pin 846*b* at other times. For instance, in some embodiments, electronic device 600 detects one or more user inputs causing electronic device 600 to enable pin 846*b* associated with the guest user (e.g., 'Dog Walker') to be valid for use between 12 pm and 1 pm on Mondays, Wednesdays, and Fridays. When the guest user (e.g., 'Dog Walker') attempts to enter pin 846*b* to cause the front door lock to transition between modes at 3 pm on a Tuesday, the front door lock will not transition between modes (and, optionally, electronic device 600 displays a notification related to the front door lock receiving pin 846*b* associated with the guest user outside of the scheduled time).

Figure 8M:
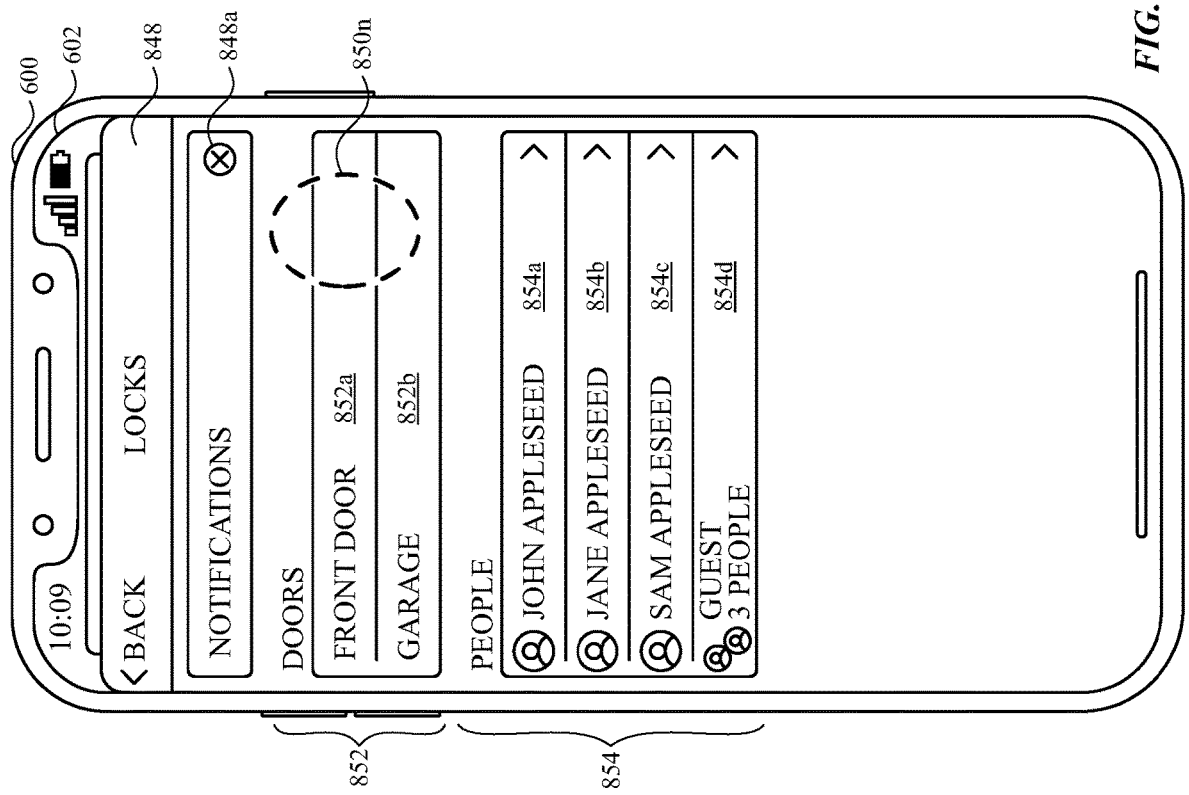

As set forth above, in response to detecting user input 850*c* corresponding to selection of locks user interface object 806*d* of home settings user interface 804, electronic device 600 displays lock settings user interface 848, as shown at FIG. 8M.

At FIG. 8M, lock settings user interface 848 includes notifications user interface object 848*a*, lock region 852 corresponding to lock accessory devices of the home automation system, and user region 854 corresponding to users having access to at least one lock accessory device of the home automation system. In some embodiments, in response to detecting user input selecting notifications user interface object 848*a*, electronic device 600 displays a notification user interface that enables a user of electronic device 600 to adjust one or more notification settings associated with lock accessory devices of the home automation system (e.g., notification settings corresponding to whether electronic device 600 displays notifications in response to detecting and/or receiving an indication associated with an event (e.g., an unlock event, a lock event, and/or a change pin event) of the one or more lock accessory devices).

At FIG. 8M, lock region 852 includes first lock user interface object 852*a* corresponding to the front door lock of the home automation system and second lock user interface object 852*b* corresponding to the garage door lock of the home automation system. As set forth below, in response to detecting user input 850*n* (e.g., a tap gesture) corresponding to selection of first lock user interface object 852*a*, electronic device 600 displays first lock settings user interface 856 corresponding to settings associated with the front door lock (e.g., and not settings associated with the garage door lock). In some embodiments, in response to detecting user input corresponding to selection of second lock user interface object 852*b*, electronic device 600 displays a second lock settings user interface corresponding to settings associated with the garage door lock (e.g., and not settings associated with the front door lock).

At FIG. 8M, user region 854 includes first user interface object 854*a* corresponding to a first resident user of the home automation system (e.g., 'John Appleseed), second user interface object 854*b* corresponding to a second resident user of the home automation system (e.g., 'Jane Appleseed'), third user interface object 854*c* corresponding to a third resident user of the home automation system (e.g., 'Sam Appleseed'), and guest user interface object 854*d* corresponding to three guest users of the home automation system (e.g., as indicate by 'Guest 3 People' on guest user interface object 854*d*). Electronic device 600 displays individual user interface objects for each resident user of the home automation system and a single user interface object corresponding to all of the guest users of the home automation system.

In some embodiments, in response to detecting user input corresponding to selection of first user interface object 854*a*, electronic device 600 displays lock settings user interface

818 corresponding to the first resident user (e.g., 'John Appleseed'). In some embodiments, in response to detecting user input corresponding to selection of one of second user interface object 854*b* and third user interface object 854*c*, electronic device 600 displays a lock settings user interface corresponding to the second resident user and the third resident user, respectively. In some embodiments, in response to detecting user input corresponding to selection of guest user interface object 854*d*, electronic device 600 displays a guest user interface including three guest user interface objects corresponding to each of the three guests. In some embodiments, in response to detecting user input selecting a guest user interface object of the guest settings user interface, electronic device 600 displays a guest settings user interface corresponding to the respective guest associated with the selected guest user interface object.

At FIG. 8M, electronic device 600 detects user input 850*n* (e.g., a tap gesture) corresponding to selection of first lock user interface object 852*a*. In response to detecting user input 850*n*, electronic device displays first lock settings user interface 856, as shown at FIG. 8N.

At FIG. 8N, first lock settings user interface 856 corresponds to settings associated with the front door lock and does not correspond to settings associated with other lock accessories of the home automation system (e.g., the garage door lock). First lock settings user interface 856 includes information region 858 including accessory indicator 858*a* (e.g., 'Lock'), accessory location indicator 858*b* (e.g., 'Front Door'), and accessory designation indicator 858*c*. In some embodiments, in response to detecting user input selecting accessory designation indicator 858*c* (e.g., a user interface object of accessory designation indicator 858*c*), electronic device 600 is configured to designate and/or remove a designation of the front door lock as a favorite accessory (e.g., such that electronic device 600 displays and/or does not display lock accessory user interface object 640 on first user interface 604).

At FIG. 8N, first lock settings user interface 856 includes automations region 860 including automation user interface objects 860*a*-860*c*. In some embodiments, electronic device 600 is configured to enable, disable, and/or add automation settings for the front door lock in response to detecting user input selecting one of automation user interface objects 860*a*-860*c*. For example, in response to detecting user input selecting automation user interface object 860*a*, electronic device 600 disables an automation setting that includes electronic device 600 causing the front door lock to transition to a locked mode when no devices associated with resident users of the home automation system are within a predefined distance from the home.

First lock settings user interface 856 includes manage access user interface object 862, notifications user interface object 864, and lock details region 866. In some embodiments, in response to detecting user input selecting notifications user interface object 864, electronic device 600 displays a front door lock notifications user interface that enables a user to adjust notification settings for the front door lock (e.g., and not adjust notification settings for other lock accessory devices of the home automation system). Lock details region 866 includes manufacturer indicator 866*a*, serial number indicator 866*b*, and model indicator 866*c*, which provide additional details to a user of electronic device 600 about the front door lock.

At FIG. 8N, electronic device 600 detects user input 850*o* (e.g., a tap gesture) corresponding to selection of manage access user interface object 862. In response to detecting user input 850*o*, electronic device 600 displays access user interface 868, which corresponds to access settings for the front door lock (e.g., and not access settings for other lock accessories of the home automation system), as shown at FIG. 8O.

At FIG. 8O, access user interface 868 includes resident region 870 and guest region 872. Resident region 870 includes resident user interface objects 870*a*-870*c* corresponding to resident users of the home automation system and indicating the access for the respective resident users for the front door lock. Similarly, guest region 872 includes guest user interface objects 872*a*-872*c* corresponding to guest users of the home automation system and indicating the access for the respective guest users for the front door lock. At FIG. 8O, guest user interface objects 872*a*-872*c* displayed in guest region 872 include pin indicators 873 corresponding to respective pins for each of the guest users of the home automation system. In contrast, resident user interface objects 870*a*-870*c* do not include pin indicators 873. In some embodiments, electronic device 600 displays pin indicators 873 for guest user interface objects 872*a*-872*c* because guest users of the home automation system do not otherwise have access to their pins. In some such embodiments, electronic device 600 displays pin indicators 873 for guest user interface objects 872*a*-872*c* on access user interface 868 so that a user of electronic device 600 can quickly and efficiently provide a pin to a respective guest user. In some embodiments, electronic devices associated with users of the home automation system that are designated as administrators receive notifications (and/or are configured to receive notifications) when a guest pin (e.g., represented by pin indicators 873) is used to cause a lock accessory device of the home automation system to transition between modes.

At FIG. 8O, each of the resident users and each of the guest users currently have access to the front door lock (e.g., as indicated by resident user interface objects 870*a*-870*c* and guest users interface objects 872*a*-872*c* being in an active and/or on position). In some embodiments, in response to detecting user input corresponding to one of resident user interface objects 870*a*-870*c* and/or one of guest user interface objects 872*a*-872*c*, electronic device 600 initiates a process to revoke access to the front door lock for the respective user (e.g., a resident user and/or a guest user). At FIG. 8O, access user interface 868 includes add guest user interface object 874 in guest region 872, which, when selected via user input, enables electronic device 600 to add a new guest user to the home automation system (e.g., electronic device 600 displays add guest user interface 842, as shown at FIG. 8L).

At FIG. 8O, electronic device 600 detects user input 850*p* (e.g., a tap gesture and/or a long press gesture) corresponding to guest user interface object 872*c* (e.g., 'Dog Walker'). In response to detecting user input 850*p*, electronic device 600 displays guest user interface 876, as shown at FIG. 8P.

At FIG. 8P, guest user interface 876 includes name user interface object 876*a*, access region 878, pin region 880, and remove guest user interface object 876*b*. In some embodiments, in response to detecting user input selecting name user interface object 876*a*, electronic device 600 displays a keyboard (e.g., a virtual keyboard) that enables a user to modify and/or change (e.g., type) a name associated with the guest user. In some embodiments, guest user interface 876 includes a notifications user interface object that enables electronic device 600 to manage notifications that are generated and/or otherwise displayed by electronic device 600 and are related to the guest user. For example, in some embodiments, in response to detecting user input selecting notifications user interface object, electronic device 600 enables notifications to be displayed when pin 880*b* associated with the guest user is used to cause the front door lock (and/or the garage door lock) to transition between modes. Similarly, in some embodiments, in response to detecting user input selecting notifications user interface object, electronic device 600 disables notifications associated with pin 880*b* being used to cause the front door lock (and/or the garage door lock) to transition between modes.

Access region 878 includes first lock user interface object 878*a* corresponding to the front door lock of the home automation system and second lock user interface object 878*b* corresponding to the garage door lock of the home automation system. At FIG. 8P, first lock user interface object 878*a* is in an enabled and/or on position indicating that the guest user currently has access to the front door lock of the home automation system. In contrast, second lock user interface object 878*b* is in the disabled and/or off position indicating that the guest user currently does not have access to the garage door lock of the home automation system. In some embodiments, electronic device 600 is configured to transition first lock user interface object 878*a* and/or second lock user interface object 878*b* between the enabled and disabled positions in response to detecting user input selecting first lock user interface object 878*a* and/or second lock user interface object 878*b*. As such, a user can select particular lock accessory devices for which to grant the guest user access.

Pin region 880 includes pin user interface object 880*a* including pin 880*b* and change pin user interface object 880*c*. As set forth above with reference to FIGS. 8E-8H, in some embodiments, electronic device 600 is configured to share pin 880*b* with the guest user and/or change pin 880*b* in response to detecting user input selecting pin user interface object 880*a* and/or change pin user interface object 880*c*, respectively. In some embodiments, when both first lock user interface object 878*a* and second lock user interface object 878*b* are in the enabled and/or on position, the guest user (e.g., 'Dog Walker') can use pin 880*b* to unlock both the front door lock and the garage door lock. At FIG. 8P, the guest user can use pin 880*b* to unlock the front door lock but not the garage door lock because second lock user interface object 878*b* is in the disabled and/or off position. As set forth above, in some embodiments, pin region 880 includes a scheduling user interface object that, when selected via user input, enables the user of electronic device 600 to set particular times (e.g., time of day, days of the week, days of the month, and/or months of the year) for which pin 880*b* is authorized to cause front door lock (and/or the garage door lock) to transition between modes.

At FIG. 8P, electronic device 600 detects user input 850*q* (e.g., a tap gesture) corresponding to selection of remove guest user interface object 876*b*. In response to detecting user input 850*q*, electronic device 600 initiates a process for removing the guest user (e.g., 'Dog Walker') from the home automation system. In some embodiments, the process for removing the guest user from the home automation system includes revoking the guest user's access to all lock accessory devices of the home automation system and/or all accessory devices of the home automation system. In some embodiments, electronic device 600 displays a confirmation user interface in response to detecting user input 850*q*, such that electronic device 600 removes the guest user from the home automation system in response to additional input corresponding to the confirmation user interface.

Figure 8R:
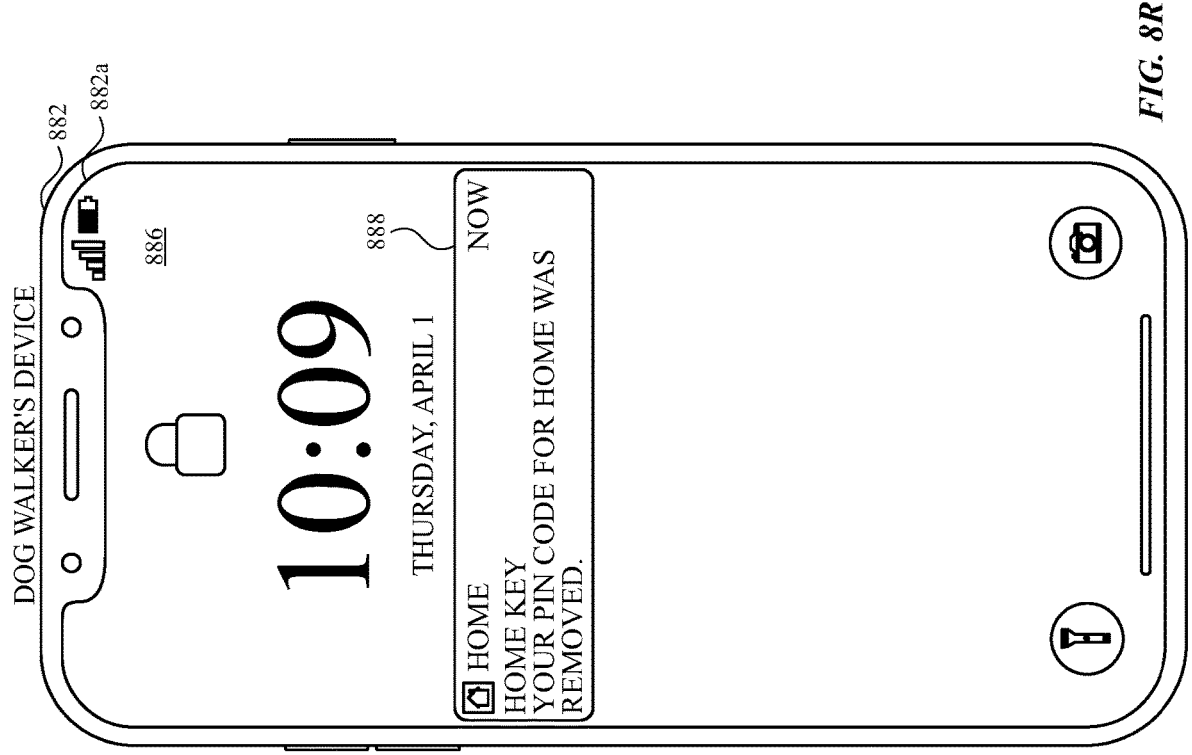
Figure 8Q:
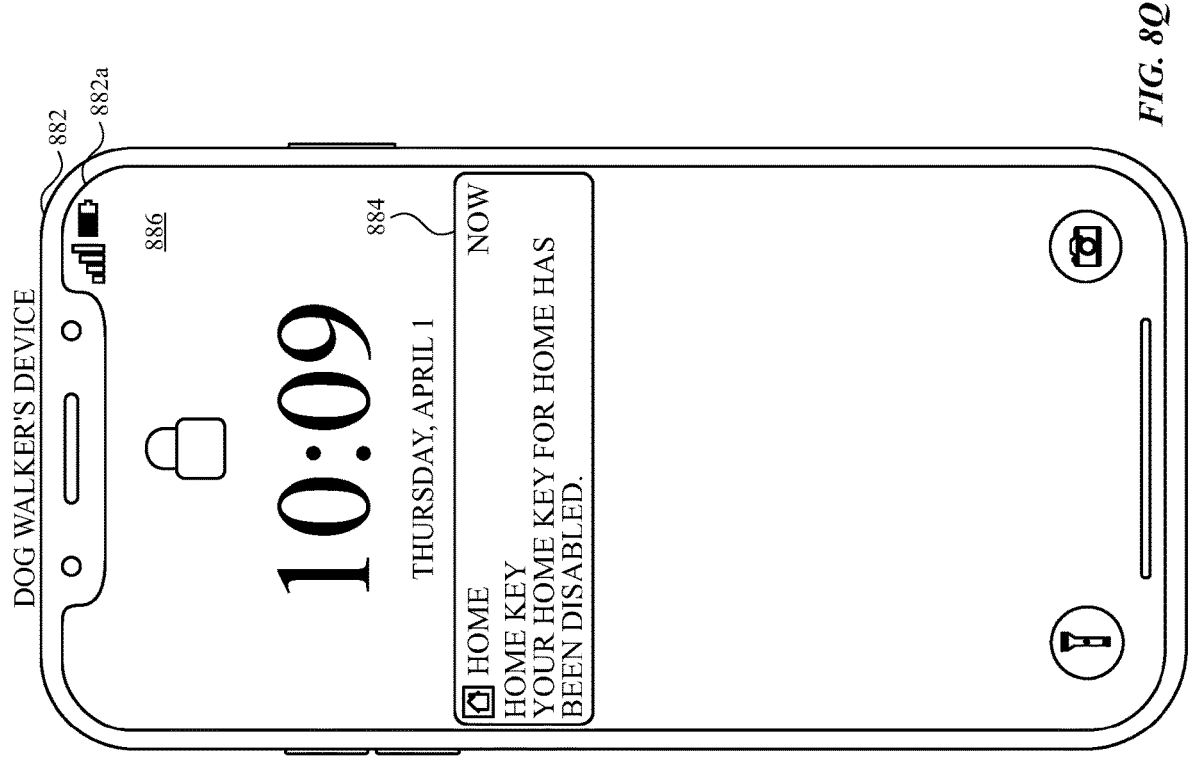
Figure 8S:
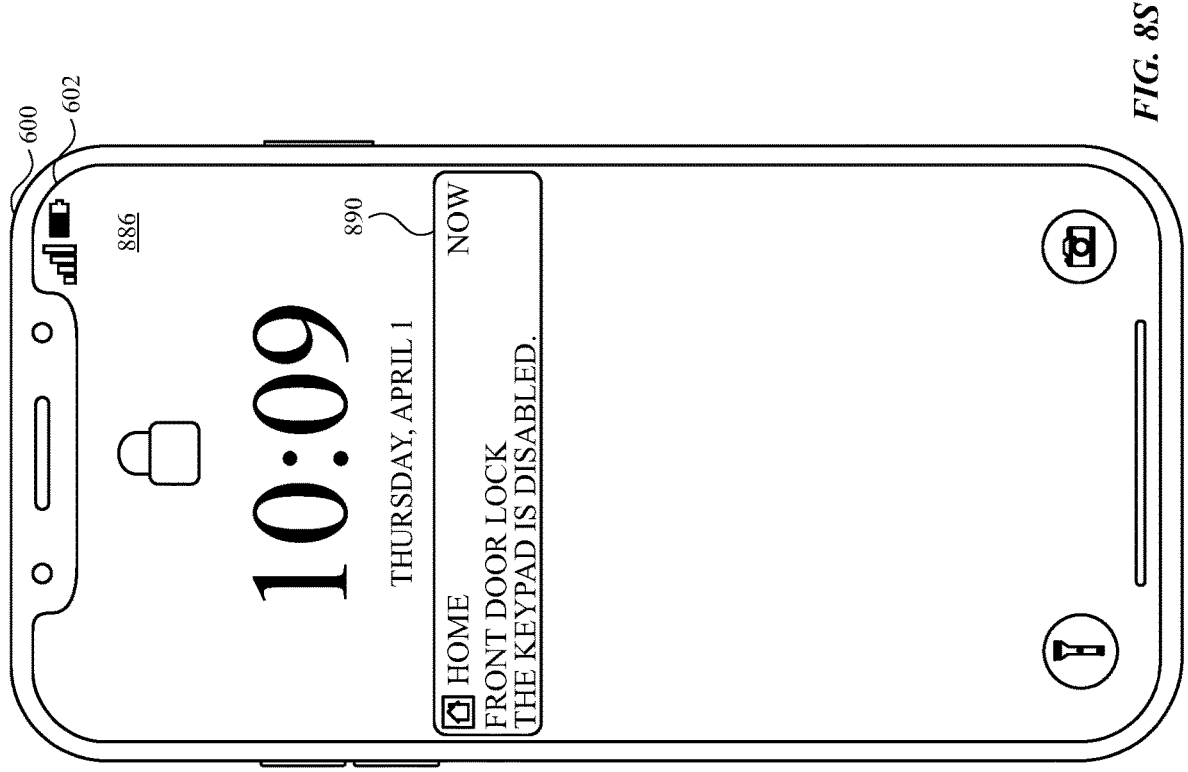

FIGS. 8Q-8S illustrate exemplary user interfaces that include notifications corresponding to one or more lock accessory devices of the home automation system. At FIG. 8Q, electronic device 882 of the guest user (e.g., 'Dog Walker') displays, via display 882*a*, key disabled notification 884 indicating that an electronic key for accessing the front door lock of the home automation system has been disabled and/or revoked (e.g., via user input 850*q* at FIG. 8P). At FIG. 8Q, electronic device 882 displays key disabled notification 884 on lock user interface 886. In some embodiments, electronic device 882 displays key disabled notification 884 while electronic device 882 is in an unlocked state and displaying another user interface.

At FIG. 8R, electronic device 882 displays pin removal notification 888 indicating that pin 880*b* of the guest user (e.g., 'Dog Walker') has been removed. In other words, pin removal notification 888 indicates to the guest that pin 880*b* can no longer be utilized to cause the front door lock (and, optionally, other lock accessory devices of the home automation system) to transition between modes. In some embodiments, electronic device 882 displays pin removal notification 888 in response to receiving an indication that the guest was removed from the home automation system (e.g., via user input 850*q*). In some embodiments, electronic device 882 displays pin removal notification 888 in response to receiving an indication that the guest's access to at least one lock accessory device of the home automation system was revoked (e.g., via user input selecting one of first lock user interface object 878*a* and/or second lock user interface object 878*b*). At FIG. 8R, electronic device 882 displays pin removal notification 888 on lock user interface 886. In some embodiments, electronic device 882 displays pin removal notification 888 while electronic device 882 is in an unlocked state and displaying another user interface. In some embodiments, after displaying pin removal notification 888, when the guest user (e.g., 'Dog Walker') attempts to enter pin 880*b* into a keypad of a lock accessory device of the home automation system, the lock accessory device will not transition between modes because pin 880*b* is no longer valid for use. In some embodiments, in response to detecting and/or receiving an indication that the guest user attempted to use pin 880*b* after the guest user was removed from the home automation system, electronic device 600 displays a notification that alerts the user of electronic device 600 that the guest user attempted to use pin 880*b* without authorization.

At FIG. 8S, electronic device 600 displays keypad disabled notification 890 corresponding to the front door lock of the home automation system. In some embodiments, electronic device 600 detects and/or receives an indication that the keypad for the front door lock has been disabled. For instance, in some embodiments, the front door lock is a battery operated lock. When the batteries of front door lock can no longer supply power to the front door lock, electronic device 600 receives an indication that the keypad of the front door lock cannot be used to cause the front door lock to transition between modes, and electronic device 600 displays keypad disabled notification 890. In some embodiments, electronic device 600 (and/or electronic device 882) displays keypad disabled notification 890 in response to detecting and/or receiving an indication that a communication connection with the front door lock (e.g., via a Wi-Fi connection) has been interrupted. In some embodiments, electronic devices associated with guest users (e.g., electronic device 882) does not display keypad disabled notification 890 and electronic devices associated with resident users (e.g., electronic device 600) do display keypad disabled notification 890. At FIG. 8S, electronic device 600 displays keypad disabled notification 890 on lock user interface 886. In some embodiments, electronic device 600 displays keypad disabled notification 890 while electronic device 600 is in an unlocked state and displaying another user interface.

FIG. 9 is a flow diagram illustrating a method for managing access for one or more lock accessories using a computer system in accordance with some embodiments. Method 900 is performed at a computer system (e.g., a smartphone, a tablet, and/or a smartwatch) that is in communication with (e.g., wirelessly or by wire, and/or integrates or includes) a display generation component (e.g., a display or touch-sensitive display) and one or more input devices (e.g., a touch-sensitive surface and/or a keyboard). Some operations in method 900 are, optionally, combined, the orders of some operations are, optionally, changed, and some operations are, optionally, omitted.

As described below, method 900 provides an intuitive way for managing access for one or more lock accessories. The method reduces the cognitive burden on a user for managing access for one or more lock accessories, thereby creating a more efficient human-machine interface. For battery-operated computing devices, enabling a user to manage access for one or more lock accessories faster and more efficiently conserves power and increases the time between battery charges.

The computer system (e.g., 600) displays (902), via the display generation component, an account user interface (e.g., 810, 838) that includes a user account lock object (e.g., 816*b*, 838*c*).

While displaying the user account lock object (e.g., 816*b*, 838*c*), the computer system (e.g., 600) receives (904), via the one or more input devices, a first input (e.g., 850*f*, 850*m*) (e.g., a tap input, a button press) corresponding to selection of the user account lock object (e.g., 816*b*, 838*c*).

In response to receiving the first input, the computer system (e.g., 600) displays (906) (e.g., by replacing display of the account user interface), via the display generation component, a user account lock user interface (e.g., 818, 842) corresponding to a first account, wherein the user account lock user interface includes concurrent display of: a first electronic lock object (908) (e.g., "FRONT DOOR" of 820 and 844), a first status object (910) (e.g., 820*a*, 844*a*) (e.g., a toggle object) that indicates whether the first electronic lock is configured to unlock using credentials (e.g., a pin code entered at the first electronic lock by a user and/or a credential transmitted to the first electronic lock by the computer system) of the first account, a second electronic lock object (912) (e.g., "GARAGE" of 820 and 846), and a second status object (914) (e.g., 820*b*, 844*b*) that indicates whether the second electronic lock is configured to unlock using credentials of the first account. The first electronic lock object (e.g., 820*a*) corresponds to a first electronic lock (e.g., a home front door lock that includes a short-range communication feature for communicating via short-range wireless communication (e.g., a near field communication (NFC) reader, WiFi, and/or UWB) and a keypad feature (e.g., a numeric and/or alphanumeric keypad and/or is configurable to display a numeric and/or alphanumeric keypad)) that is separate from (e.g., that is not physically integrated into the computer system; that does not power on (or off) when the computer system is powered on (or off)) the computer system. In some embodiments, the computer system is in communication (e.g., wireless communication) with the first electronic lock. The second electronic lock object corresponds to a second electronic lock (e.g., a home side door lock that includes a short-range communication feature for communicating via short-range wireless communication (e.g., a near field communication (NFC) reader, WiFi, and/or UWB) and a keypad feature (e.g., a numeric and/or alphanumeric keypad and/or is configurable to display a numeric and/or alphanumeric keypad)) that is separate (e.g., that is not physically integrated into the computer system; that does not power on (or off) when the computer system is powered on (or off)) from the computer system; and In some embodiments, the computer system is in communication (e.g., wireless communication) with the second electronic lock. Displaying representations of multiple electronic locks and their state provides the user with visual feedback about the locks with which the computer system is in communication and the state of the home automation system.

In some embodiments, the user account lock user interface (e.g., 818, 842) includes a code (e.g., 822*a*, 846*b*) (e.g., a numerical code, an alphabetical code, an alphanumerical code) associated with (e.g., of, corresponding to) the first account, wherein a respective electronic lock (e.g., the first electronic lock and/or the second electronic lock) is configured to unlock, based the respective electronic lock being configured to be operated by (e.g., unlocked by) the first account (e.g., using credentials of the first account, using credentials of the second account), upon receipt of (e.g., entry at a keypad of the respective electronic lock of) the code. In some embodiments, the account lock user interface includes a code that can be used to unlock locks enabled to be controlled by the first account. Displaying a code associated with the first account provides the user with visual feedback about the configuration of the first account.

In some embodiments, the computer system (e.g., 600) detects selection (e.g., 850*j*) of (e.g., a tap gestures on, a press-and-hold gesture on) the code (e.g., 822*a*, 846*b*) associated with the first account. In response to detecting selection of the code associated with the first account, the computer system (e.g., 600) initiates a process (e.g., as shown in FIG. 8H) for transmitting the code (e.g., via instant message and/or email) to a recipient (e.g., to a user corresponding to the first account). In some embodiments, initiating the process for transmitting the code to the recipient includes displaying selectable user interface objects for a plurality of users, including the recipient. The computer system receives selection of a user interface object corresponding to the recipient and, in response, displays a draft instant message that includes the code. In response to detecting a send request (e.g., tap input on a send button of the draft instant message), the computer system transmits the code to the recipient via instant message. Initiating a process for transmitting the code in response to selection of the code enables the computer system to quickly and accurately share the code with a recipient (e.g., without the need for the user to separately access a messaging application and to enter the code).

In some embodiments, the first account corresponds to a user account of the computer system (e.g., 600) (e.g., the first account belongs to the user that is signed into the computer system) and an electronic wallet (e.g., an electronic wallet user interface) of the computer system includes a visual representation (e.g., a card in the electronic wallet and/or representing a key) of the first account. Displaying a visual representation of the first account as part of an electronic wallet provides the user with feedback about the state of the computer system and that it includes the key.

In some embodiments, the computer system (e.g., 600) transmits, to the first electronic lock (and/or a second electronic lock) via short-range communication (e.g., via NFC, WiFi, and/or UWB), credentials of the first account to unlock the first electronic lock (and/or the second electronic lock). In some embodiments, the first account can be used to wirelessly unlock locks of the home automation system configured to be unlocked using credentials of the first account. In some embodiments, communicating via short-range communication includes communicating using a short-range communication protocol.

In some embodiments, while displaying the user account lock user interface (e.g., 818, 842) corresponding to a first account, the computer system (e.g., 600) receives second input (e.g., 850g) (e.g., a tap input). In response to receiving the second input: in accordance with a determination that the second input corresponds to selection of the first status object corresponding to the first electronic lock, the computer system (e.g., 600) changes (e.g., from configured to unlock to not configured to unlock; from not configured to unlock to configured to unlock) whether the first electronic lock is configured to unlock using credentials (e.g., a pin code entered at the first electronic lock by a user and/or a credential transmitted to the first electronic lock by the computer system) of the first account (e.g., without changing whether the second electronic lock is configured to unlock using credentials of the first account) and in accordance with a determination that the second input corresponds to selection of the second status object corresponding to the second electronic lock, the computer system (e.g., 600) changes (e.g., from configured to unlock to not configured to unlock; from not configured to unlock to configured to unlock) whether the second electronic lock is configured to unlock using credentials (e.g., a pin code entered at the second electronic lock by a user and/or a credential transmitted to the second electronic lock by the computer system) of the first account (e.g., without changing whether the first electronic lock is configured to unlock using credentials of the first account). In some embodiments, the first and/or second status object changes to indicated whether the respective electronic lock is configured to be unlocked using credentials of the first account. Receiving user input to change whether the first or second electronic lock is configured to unlock using credentials of the first account enables the computer system control the home automation system, thereby allowing the user to secure particular electronic locks and/or allow certain users access to other electronic locks.

In some embodiments, the user account lock user interface (e.g., 818, 842) includes a code change user interface object. While displaying the user account lock user interface (e.g., 818, 842) corresponding to a first account, the computer system receives third input (e.g., 850h) (e.g., a tap input). In response to receiving the third input and in accordance with a determination that the third input corresponds to selection of the code change user interface object (e.g., 822b), the computer system (e.g., 600) initiates a process to set (e.g., change) the code associated with the first account for operating a plurality of electronic locks. In some embodiments, initiating the process to change the code associated with the first account includes displaying a keypad (e.g., a numerical keypad) for receiving entry of a replacement code. In some embodiments, changing the code associated with the first account changes the code for all electronic locks of the home automation system for the first account. Changing the code for the first account and having that change apply to multiple electronic locks of the home automation system allows the computer system to reconfigure multiple electronic locks for that user without the need to receive user inputs specific to each electronic lock of the home automation system to set the same code, thereby reducing the number of inputs required.

In some embodiments, the first electronic lock and the second electronic lock are a part of a home automation system and wherein one or more users of the home automation system are designated as residents of (e.g., are a resident of a home corresponding to) the home automation system and one or more users of the home automation system are designated as guests of (e.g., are guests in the home corresponding to) the home automation system. In some embodiments, accounts of residents have access to additional and/or more features of the home automation system as compared to accounts of guests. Designating users of the home automation system as residents and guests enables the computer system to configure the home automation system with different levels of access for different types of users, thereby simplifying configuration of the home automation system and making the system more secure.

In some embodiments, the computer system (e.g., 600) concurrently displays, via the display generation component (e.g., as part of the account user interface):
an indication (e.g., 870) (e.g., a group heading, below which residents are listed) that a second user of the home automation system is a resident of (e.g., is a resident of a home corresponding to) the home automation system without displaying a code of a second account associated with the second user, an indication (e.g., 872) (e.g., a group heading, below which guests are listed) that a third user of the home automation system is a guest in (e.g., is a guest in the home corresponding to) the home automation system, and a code (e.g., 873) of a third account associated with the third user. In some embodiments, respective codes of guests are displayed while respective codes of residents are not displayed. In some embodiments, one or more users (e.g., each user) of the home automation system is associated with a respective code (e.g., a numerical code, an alphabetical code, an alphanumerical code), wherein a respective electronic lock (e.g., the first electronic lock and/or the second electronic lock) is configured to unlock, based the respective electronic lock being configured to be operated by (e.g., unlocked by) the respective account (e.g., using credentials of the first/second/third account), upon receipt of (e.g., entry at a keypad of the respective electronic lock of) the code. In some embodiments, the computer system also includes an indication of whether the first account is a resident or guest of the home automation system. Displaying codes for guests without displaying codes for residents enables the computer system to provide the user with visual feedback about the state of the home automation system for guest users who may otherwise have limited access to learning their code while maintaining the security of the home automation system by not displaying codes for residents who may have access (e.g., through their own devices) to their respective codes.

In some embodiments, the computer system (e.g., 600) concurrently displays, via the display generation component (e.g., as part of the account user interface) indications of one or more resident users (e.g., 854a-854c) of the home automation system (e.g., without displaying respective codes of the one or more resident users) and a guest user interface object (e.g., 854d) (e.g., without displaying individual indications for (e.g., names of) guests of the home automation system and/or without displaying respective codes for the guests). The computer system (e.g., 600) receives selection of the guest user interface object. In response to receiving selection of the guest user interface object, the computer system (e.g., 600) concurrently displays, via the display generation component: an indication of a first guest of the home automation system and a code associated with an account of the first guest, and an indication of a second guest of the home automation system and a code associated with an account of the second guest. In some embodiments, guests of the home automation system are each associated with a respective code (e.g., a numerical code, an alphabetical code, an alphanumerical code), wherein a respective electronic lock (e.g., the first electronic lock and/or the second electronic lock) is configured to unlock, based the respective electronic lock being configured to be operated by (e.g., unlocked by) the respective guest account (e.g., using credentials of the guest account), upon receipt of (e.g., entry at a keypad of the respective electronic lock of) the code. In some embodiments, guests of the home automation system are grouped together (e.g., a single UI object to access the list of guests) and residents are grouped together (e.g., displayed as part of a list, in another section of the UI). In some embodiments, displaying a guest user interface object that displays the guests of the home automation network enables the computer system to provide the user with visual feedback about the type of user information being displayed (e.g., whether the users displayed are residents or guests). Displaying the respective codes of the guests provides the user with visual feedback about the state of the home automation system.

In some embodiments, the first electronic lock and the second electronic lock are a part of a home automation system (and, optionally, wherein the account user interface includes indications of a plurality of users (e.g., residents and/or guests) of the home automation system). While displaying, via the display generation component, the account user interface, the computer system (e.g., 600) receives fourth input (e.g., a tap input). In response to receiving the fourth input and in accordance with a determination that the fourth input is directed to a disable object (e.g., 870a-870c, 872a-872c) corresponding to a first user (corresponding to the first account) of the plurality of users, the computer system (e.g., 600) configures the first electronic lock and the second electronic lock to not be operated by (e.g., unlocked by) credentials of the first account associated with the first user (e.g., without configuring the first and second electronic locks to not be operated by credentials of a second account associated with a second user). In some embodiments, in response to receiving the fourth input and in accordance with a determination that the fourth input is directed to a disable object corresponding to a second user of the plurality of users, configuring the first electronic lock and the second electronic lock to not be operated by (e.g., unlocked by) credentials of a second account associated with the second user (e.g., without configuring the first and second electronic locks to not be operated by credentials of the first account associated with the first user). Enabling the computer system to disable an account (e.g., so that the code of the account does not operate the electronic locks of the home automation system and/or so that the account cannot be used to wirelessly (e.g., via NFC, via Bluetooth, via UWB) operate the electronic locks of the home automation system) allows a user of the computer system to secure the home automation system by ending the access provided by the account.

In some embodiments, the user account lock user interface (e.g., 842) includes an option (e.g., 842a) (e.g., a text field) for naming (e.g., entering a name for, changing an existing name of) the first account. In some embodiments, the computer system (e.g., 600) receives one or more inputs (e.g., selection of the text field, entry of a new name, and/or selection of a completion UI object indicating the user has finished entering a new name for the first account). In response to receiving the one or more inputs, naming the first account. Receiving inputs corresponding to a name and associating the first account with the name allows the computer system to more readily provide the user with information about the first account by using the name, thereby improving the man-machine interface.

In some embodiments, subsequent to (e.g., in response to) changing access of the first account (e.g., with respect to the home automation system), causing a notification (e.g., 836) to be sent (e.g., transmitting the notification and/or requesting that an external electronic device transmit the notification) to one or more other computer systems (other than the computer system and/or of a user of the home automation system) (e.g., transmitting the notifications to the one or more other computer systems and/or providing information to a second computer system to transmit the notifications to the one or more other computer system) associated with the first account (e.g., wherein the notification indicates the change in access). Causing a notification to be sent to one or more other computer systems associated with the first account provides the users of the computer systems with the change in the access of the first account.

In some embodiments, the change in access of the first account is a change to the code associated with the first account. In some embodiments, the change in access of the first account is a change to the electronic locks (e.g., lock added and/or lock removed) configured to be operated by (e.g., unlocked by) the first account. In some embodiments, the change in access of the first account is a request to disable the first account (e.g., via selection of disable object corresponding to a first user). In some embodiments, notifications of changes in access are sent when there is a change in access to a resident and are not sent when there is a change in access to a guest.

In some embodiments, notifications of changes in access can be disable (e.g., regardless of whether the user is a guest or resident). In some embodiments, notifications regarding the status (e.g., locked, unlocked) of respective (and/or all) electronic locks can be enabled and disabled. In some embodiments, the computer system configures the home automation system to send a notification to the computer system when credentials of an account (e.g., the first account) are used (e.g., via a code entry at the electronic lock) to unlock an electronic lock (e.g., the notification identifying the corresponding user and the corresponding electronic lock that was unlocked). In some embodiments, the computer system can configured disable the home automation system from sending notifications when credentials of an account (e.g., the first account) are used (e.g., via a code entry at the electronic lock) to unlock an electronic lock.

Note that details of the processes described above with respect to method 900 (e.g., FIG. 9) are also applicable in an analogous manner to the methods described above. For example, method 700 optionally includes one or more of the characteristics of the various methods described above with reference to method 900. For example, the electronic lock of method 700 is the same as the first or second electronic lock of method 900. For another example, the computer system of method 700 is the same as the computer system of method 900. For another example, the first account of method 700 is the same as the first account of method 900.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve a user's ability to manage lock accessory devices of a home automation system. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and/or exercise information), date of birth, or any other identifying or personal information.

The present disclosure recognizes that the use of such personal information data, in the present technology, can be used to the benefit of users. For example, the personal information data can be used to provide access to one or more lock accessory devices. Accordingly, use of such personal information data enables users to have calculated control of other individuals and/or users that have access to the one or more lock accessory devices. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing access to lock accessory devices of a home automation system, the present technology can be configured to allow users to select to "opt in" or "opt out" of participation in the collection of personal information data during registration for services or anytime thereafter. In another example, users can select not to accept authorization for access to one or more lock accessory devices of the home automation system. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an administrator user of the home automation system can provide access to one or more lock accessory devices to users based on non-personal information data or a bare minimum amount of personal information, such as the content being requested by the device associated with a user or publicly available information.

What is claimed is:

1. A computer system configured to communicate with a display generation component and one or more input devices, comprising:
   one or more processors; and
   memory storing one or more programs configured to be executed by the one or more processors, the one or more programs including instructions for:
   after adding an electronic lock to a home automation system, displaying, via the display generation component, a user interface;
   while displaying the user interface, detecting, via the one or more input devices, one or more first user inputs corresponding to a request to display a settings user interface associated with the electronic lock;

in response to detecting the one or more first user inputs, displaying, via the display generation component, the settings user interface associated with the electronic lock, wherein the settings user interface includes a first user interface object corresponding to short-range wireless communication feature of the electronic lock;

while displaying the settings user interface, detecting, via the one or more input devices, a second user input corresponding to selection of the first user interface object; and in response to detecting the second user input corresponding to selection of the first user interface object, transitioning a configuration of the short-range wireless communication feature of the electronic lock from a first state to a second state.

2. The computer system of claim 1, wherein the first state is a disabled state, and wherein the one or more programs further include instructions for:

in response to detecting the second user input corresponding to selection of the first user interface object:
prompting a user of the computer system to provide authentication; and
in response to receiving authentication of the user of the computer system, transitioning the configuration of the short-range wireless communication feature of the electronic lock from the first state to the second state.

3. The computer system of claim 2, wherein receiving authentication of the user of the computer system includes:
receiving, via the one or more input devices, biometric information, and
detecting that the biometric information matches enrolled biometric information.

4. The computer system of claim 1, wherein the settings user interface further includes:
a pin code user interface object;
a notifications user interface object; and
a remove key user interface object.

5. The computer system of claim 1, wherein the short-range wireless communication feature enables the computer system to transmit credentials to the electronic lock via short-range communication without requiring authentication.

6. The computer system of claim 1, wherein the user interface is associated with an electronic wallet of the computer system.

7. The computer system of claim 1, wherein the one or more programs further include instructions for:
after transitioning the configuration of the short-range wireless communication feature of the electronic lock from the first state to the second state, detecting that the computer system is within a predefined distance of the electronic lock;
in response to detecting that the computer system is within the predefined distance of the electronic lock:
in accordance with a determination that the second state is an enabled state, causing the electronic lock to transition from a first mode to a second mode; and
in accordance with a determination that the second state is a disabled state, forgoing causing the electronic lock to transition from the first mode to the second mode.

8. The computer system of claim 7, wherein the one or more programs further include instructions for:
after causing the electronic lock to transition from the first mode to the second mode, displaying, via the display generation component, a lock user interface indicating that the electronic lock is in the second mode.

9. The computer system of claim 7, wherein causing the electronic lock to transition from the first mode to the second mode includes causing the electronic lock to transition from the first mode to the second mode without requiring authentication from a user of the computer system.

10. The computer system of claim 1, wherein the electronic lock is configured with to communicate via short-range communication.

11. The computer system of claim 1, wherein transitioning the configuration of the short-range wireless communication feature of the electronic lock from the first state to the second state includes changing an appearance of the first user interface object.

12. A non-transitory computer-readable storage medium storing one or more programs configured to be executed by one or more processors of a computer system that is in communication with a display generation component and one or more input devices, the one or more programs including instructions for:

after adding an electronic lock to a home automation system, displaying, via the display generation component, a user interface;

while displaying the user interface, detecting, via the one or more input devices, one or more first user inputs corresponding to a request to access a settings user interface associated with the electronic lock;

in response to detecting the one or more first user inputs, displaying, via the display generation component, the settings user interface associated with the electronic lock, wherein the settings user interface includes a first user interface object corresponding to short-range wireless communication feature of the electronic lock;

while displaying the settings user interface, detecting, via the one or more input devices, a second user input corresponding to selection of the first user interface object; and in response to detecting the second user input corresponding to selection of the first user interface object, transitioning a configuration of the short-range wireless communication feature of the electronic lock from a first state to a second state.

13. The non-transitory computer-readable storage medium of claim 12, wherein the first state is a disabled state, and wherein the one or more programs further include instructions for:

in response to detecting the second user input corresponding to selection of the first user interface object:
prompting a user of the computer system to provide authentication; and
in response to receiving authentication of the user of the computer system, transitioning the configuration of the short-range wireless communication feature of the electronic lock from the first state to the second state.

14. The non-transitory computer-readable storage medium of claim 13, wherein receiving authentication of the user of the computer system includes:
receiving, via the one or more input devices, biometric information, and
detecting that the biometric information matches enrolled biometric information.

15. The non-transitory computer-readable storage medium of claim 12, wherein the settings user interface further includes:

a pin code user interface object;
a notifications user interface object; and
a remove key user interface object.

16. The non-transitory computer-readable storage medium of claim 12, wherein the short-range wireless communication feature enables the computer system to transmit credentials to the electronic lock via short-range communication without requiring authentication.

17. The non-transitory computer-readable storage medium of claim 12, wherein the user interface is associated with an electronic wallet of the computer system.

18. The non-transitory computer-readable storage medium of claim 12, wherein the one or more programs further include instructions for:
    after transitioning the configuration of the short-range wireless communication feature of the electronic lock from the first state to the second state, detecting that the computer system is within a predefined distance of the electronic lock;
    in response to detecting that the computer system is within the predefined distance of the electronic lock:
        in accordance with a determination that the second state is an enabled state, causing the electronic lock to transition from a first mode to a second mode; and
        in accordance with a determination that the second state is a disabled state, forgoing causing the electronic lock to transition from the first mode to the second mode.

19. The non-transitory computer-readable storage medium of claim 18, wherein the one or more programs further include instructions for:
    after causing the electronic lock to transition from the first mode to the second mode, displaying, via the display generation component, a lock user interface indicating that the electronic lock is in the second mode.

20. The non-transitory computer-readable storage medium of claim 18, wherein causing the electronic lock to transition from the first mode to the second mode includes causing the electronic lock to transition from the first mode to the second mode without requiring authentication from a user of the computer system.

21. The non-transitory computer-readable storage medium of claim 12, wherein the electronic lock is configured with to communicate via short-range communication.

22. The non-transitory computer-readable storage medium of claim 12, wherein transitioning the configuration of the short-range wireless communication feature of the electronic lock from the first state to the second state includes changing an appearance of the first user interface object.

23. A method, comprising:
    at a computer system that is in communication with a display generation component and one or more input devices:
        after adding an electronic lock to a home automation system, displaying, via the display generation component, a user interface;
        while displaying the user interface, detecting, via the one or more input devices, one or more first user inputs corresponding to a request to access a settings user interface associated with the electronic lock;
        in response to detecting the one or more first user inputs, displaying, via the display generation component, the settings user interface associated with the electronic lock, wherein the settings user interface includes a first user interface object corresponding to short-range wireless communication feature of the electronic lock;
        while displaying the settings user interface, detecting, via the one or more input devices, a second user input corresponding to selection of the first user interface object; and
        in response to detecting the second user input corresponding to selection of the first user interface object, transitioning a configuration of the short-range wireless communication feature of the electronic lock from a first state to a second state.

24. The method of claim 23, wherein the first state is a disabled state, and wherein the method further comprises:
    in response to detecting the second user input corresponding to selection of the first user interface object:
        prompting a user of the computer system to provide authentication; and
    in response to receiving authentication of the user of the computer system, transitioning the configuration of the short-range wireless communication feature of the electronic lock from the first state to the second state.

25. The method of claim 24, wherein receiving authentication of the user of the computer system includes:
    receiving, via the one or more input devices, biometric information, and
    detecting that the biometric information matches enrolled biometric information.

26. The method of claim 23, wherein the settings user interface further includes:
    a pin code user interface object;
    a notifications user interface object; and
    a remove key user interface object.

27. The method of claim 23, wherein the short-range wireless communication feature enables the computer system to transmit credentials to the electronic lock via short-range communication without requiring authentication.

28. The method of claim 23, wherein the user interface is associated with an electronic wallet of the computer system.

29. The method of claim 23, further comprising:
    after transitioning the configuration of the short-range wireless communication feature of the electronic lock from the first state to the second state, detecting that the computer system is within a predefined distance of the electronic lock;
    in response to detecting that the computer system is within the predefined distance of the electronic lock:
        in accordance with a determination that the second state is an enabled state, causing the electronic lock to transition from a first mode to a second mode; and
        in accordance with a determination that the second state is a disabled state, forgoing causing the electronic lock to transition from the first mode to the second mode.

30. The method of claim 29, further comprising:
    after causing the electronic lock to transition from the first mode to the second mode, displaying, via the display generation component, a lock user interface indicating that the electronic lock is in the second mode.

31. The method of claim 29, wherein causing the electronic lock to transition from the first mode to the second mode includes causing the electronic lock to transition from the first mode to the second mode without requiring authentication from a user of the computer system.

32. The method of claim 23, wherein the electronic lock is configured with to communicate via short-range communication.

33. The method of claim 23, wherein transitioning the configuration of the short-range wireless communication feature of the electronic lock from the first state to the second state includes changing an appearance of the first user interface object.

\* \* \* \* \*